US010803754B2

(12) United States Patent
Li et al.

(10) Patent No.: US 10,803,754 B2
(45) Date of Patent: Oct. 13, 2020

(54) DIRECTIONAL BEAM MESH NETWORK FOR AIRCRAFT

(71) Applicant: QUALCOMM Incorporated, San Diego, CA (US)

(72) Inventors: Junyi Li, Chester, NJ (US); Arthur Miller, La Mesa, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/042,599

(22) Filed: Jul. 23, 2018

(65) Prior Publication Data

US 2019/0045348 A1 Feb. 7, 2019

Related U.S. Application Data

(60) Provisional application No. 62/542,719, filed on Aug. 8, 2017, provisional application No. 62/540,495, filed on Aug. 2, 2017.

(51) Int. Cl.
*G08G 5/00* (2006.01)
*H04B 7/185* (2006.01)
(Continued)

(52) U.S. Cl.
CPC ......... *G08G 5/0008* (2013.01); *G08G 5/0021* (2013.01); *G08G 5/0056* (2013.01);
(Continued)

(58) Field of Classification Search
None
See application file for complete search history.

(56) References Cited

U.S. PATENT DOCUMENTS

| 5,875,209 A | 2/1999 | Ogata | |
| 2010/0246492 A1* | 9/2010 | Scarlatti | H04L 45/123 370/328 |

(Continued)

FOREIGN PATENT DOCUMENTS

EP 0837567 A2 4/1998

OTHER PUBLICATIONS

International Search Report and Written Opinion—PCT/US2018/043509—ISA/EPO—dated Dec. 13, 2018.
(Continued)

*Primary Examiner* — Jay L Vogel
(74) *Attorney, Agent, or Firm* — Holland & Hart LLP

(57) ABSTRACT

Techniques are provided herein for procedures for establishing an aircraft-to-aircraft mesh network during flight using high-bandwidth directional communication beams. A first aircraft may be able to utilize flight data about a second aircraft to reduce a computational cost of a beam discovery procedure used to establish directional communication beams in the aircraft-to-aircraft mesh network. For example, the first aircraft may receive flight data (e.g., position information, heading, altitude, etc.) using an air traffic control system. The first aircraft may determine one or more predicted locations of the second aircraft based on the flight data. The first aircraft may use the predicted locations to transmit directional discovery beams to only those locations where the second aircraft is likely to be. Upon receiving at least one of the directional discovery beams, the second aircraft and the first aircraft may establish a communication link of the aircraft-to-aircraft mesh network.

30 Claims, 33 Drawing Sheets

(51) Int. Cl.
*H04W 4/029* (2018.01)
*H04W 4/46* (2018.01)
*H04W 76/14* (2018.01)
*H04W 16/28* (2009.01)
*H04B 7/0413* (2017.01)
*H04B 7/08* (2006.01)
*H04W 4/42* (2018.01)
*H04W 24/08* (2009.01)
*H04W 88/18* (2009.01)
*H04B 7/06* (2006.01)
*H04W 8/00* (2009.01)
*H04W 84/18* (2009.01)

(52) U.S. Cl.
CPC ..... *H04B 7/18504* (2013.01); *H04B 7/18506* (2013.01); *H04W 4/029* (2018.02); *H04W 4/46* (2018.02); *H04W 16/28* (2013.01); *H04W 76/14* (2018.02); *H04B 7/0413* (2013.01); *H04B 7/0617* (2013.01); *H04B 7/086* (2013.01); *H04W 4/42* (2018.02); *H04W 8/005* (2013.01); *H04W 24/08* (2013.01); *H04W 84/18* (2013.01); *H04W 88/18* (2013.01)

(56) References Cited

U.S. PATENT DOCUMENTS

| | | |
|---|---|---|
| 2011/0286325 A1 | 11/2011 | Jalali et al. |
| 2014/0105054 A1* | 4/2014 | Sægrov .................. H01Q 3/267 370/252 |
| 2014/0266896 A1 | 9/2014 | Hyslop et al. |
| 2016/0050013 A1* | 2/2016 | Brownjohn ........... H04W 4/021 370/316 |
| 2016/0285541 A1* | 9/2016 | Liu .................... H04B 7/18506 |
| 2016/0381596 A1* | 12/2016 | Hu .................... H04B 7/18504 370/236 |
| 2017/0092139 A1* | 3/2017 | Wang .................... G01S 5/0027 |
| 2017/0141839 A1 | 5/2017 | Chiodini et al. |
| 2017/0323573 A1* | 11/2017 | Decker .................. B64D 31/02 |
| 2019/0043369 A1 | 2/2019 | Miller et al. |
| 2019/0053106 A1* | 2/2019 | Russell ............. H04W 36/0027 |

OTHER PUBLICATIONS

Partial International Search Report—PCT/US2018/043509—ISA/EPO—dated Oct. 15, 2018.

* cited by examiner

DIRECTIONAL BEAM MESH NETWORK FOR AIRCRAFT

CROSS REFERENCES

The present application for patent claims the benefit of U.S. Provisional Patent Application No. 62/540,495 by Li, et al., entitled "DIRECTIONAL BEAM MESH NETWORK FOR AIRCRAFT," filed Aug. 2, 2017, and to U.S. Provisional Patent Application No. 62/542,719 by Miller, et al., entitled "SHARING CRITICAL FLIGHT INFORMATION USING MESH NETWORK" filed Aug. 8, 2017, and assigned to the assignee hereof, and expressly incorporated herein.

BACKGROUND

The following relates generally to wireless communication, and more specifically to directional beam mesh networking for aircraft.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Ad hoc mesh networks may be employed in a number of different scenarios. Depending on the scenario, different procedures may be used to establish or maintain the network. Some mesh networks may use directional communication beams in a millimeter wave spectrum band to establish high-capacity communication links between nodes.

SUMMARY

The described techniques relate to improved methods, systems, devices, or apparatuses that support a directional beam mesh network for aircraft. Generally, the described techniques provide for procedures for mesh networking of aircraft using high-bandwidth directional communication beams. The procedures of an aircraft-to-aircraft mesh network may be configured to take advantage of specific advantages related to the flight of aircraft. In aviation, air traffic control systems track flights of aircraft to ensure safety and the proper sharing of air resources. A first aircraft may be able to utilize flight data about a second aircraft to reduce a computational cost of some procedures in the mesh network. For example, the first aircraft may receive flight data (e.g., position information, heading, altitude, etc.) and determine one or more predicted locations of a second aircraft based on the flight data. The first aircraft may use the information to transmit directional discovery beams to those locations where the second aircraft is likely to be. Such a procedure may use fewer computational resources than a blind discovery procedure and thus may have distinct advantages.

A method of wireless communication is described. The method may include receiving, at a first aircraft using a first communication link of a first wireless network, flight data for a second aircraft, determining a discovery pattern having at least one beam direction to be used for discovery of the second aircraft based at least in part on the flight data, transmitting at least one directional transmission beam in at least one beam direction of the discovery pattern, and establishing a second communication link of a second wireless network directly between the first aircraft and the second aircraft based at least in part on the at least one transmitted directional transmission beam.

An apparatus for wireless communication is described. The apparatus may include means for receiving, at a first aircraft using a first communication link of a first wireless network, flight data for a second aircraft, means for determining a discovery pattern having at least one beam direction to be used for discovery of the second aircraft based at least in part on the flight data, means for transmitting at least one directional transmission beam in at least one beam direction of the discovery pattern, and means for establishing a second communication link of a second wireless network directly between the first aircraft and the second aircraft based at least in part on the at least one transmitted directional transmission beam.

Another apparatus for wireless communication is described. The apparatus may include a processor, memory in electronic communication with the processor, and instructions stored in the memory. The instructions may be operable to cause the processor to receive, at a first aircraft using a first communication link of a first wireless network, flight data for a second aircraft, determine a discovery pattern having at least one beam direction to be used for discovery of the second aircraft based at least in part on the flight data, transmit at least one directional transmission beam in at least one beam direction of the discovery pattern, and establish a second communication link of a second wireless network directly between the first aircraft and the second aircraft based at least in part on the at least one transmitted directional transmission beam.

A non-transitory computer readable medium for wireless communication is described. The non-transitory computer-readable medium may include instructions operable to cause a processor to receive, at a first aircraft using a first communication link of a first wireless network, flight data for a second aircraft, determine a discovery pattern having at least one beam direction to be used for discovery of the second aircraft based at least in part on the flight data, transmit at least one directional transmission beam in at least one beam direction of the discovery pattern, and establish a second communication link of a second wireless network directly between the first aircraft and the second aircraft based at least in part on the at least one transmitted directional transmission beam.

In some examples of the method, apparatus, and non-transitory computer-readable medium described above, the second wireless network may be a wireless mesh network.

In some examples of the method, apparatus, and non-transitory computer-readable medium described above, a first radio frequency spectrum band used in the first wireless network may be different from a second radio frequency spectrum band used in the second wireless network.

Some examples of the method, apparatus, and non-transitory computer-readable medium described above may further include processes, features, means, or instructions for determining a plurality of predicted locations for the second aircraft based at least in part on the flight data of the second aircraft, wherein determining the discovery pattern may be based at least in part determining the plurality of predicted locations.

Some examples of the method, apparatus, and non-transitory computer-readable medium described above may further include processes, features, means, or instructions for determining a current position and a current vector for the first aircraft, wherein determining the discovery pattern may be based at least in part on the current position and the current vector of the first aircraft.

Some examples of the method, apparatus, and non-transitory computer-readable medium described above may further include processes, features, means, or instructions for receiving environmental condition information associated with the second aircraft, wherein determining the discovery pattern may be based at least in part on the environmental condition information.

In some examples of the method, apparatus, and non-transitory computer-readable medium described above, the flight data includes position information and vector information for the second aircraft, wherein determining the discovery pattern may be based at least in part on the position information and the vector information.

In some examples of the method, apparatus, and non-transitory computer-readable medium described above, the flight data includes future flight path information for the second aircraft, wherein determining the discovery pattern may be based at least in part on the future flight path information.

Some examples of the method, apparatus, and non-transitory computer-readable medium described above may further include processes, features, means, or instructions for receiving data from a third aircraft using a third communication link, the third communication link being part of a wireless mesh network. Some examples of the method, apparatus, and non-transitory computer-readable medium described above may further include processes, features, means, or instructions for identifying the second aircraft as an intended recipient of the data. Some examples of the method, apparatus, and non-transitory computer-readable medium described above may further include processes, features, means, or instructions for transmitting the data to the second aircraft using the second communication link based at least in part on identifying the second aircraft as the intended recipient of the data.

Some examples of the method, apparatus, and non-transitory computer-readable medium described above may further include processes, features, means, or instructions for transmitting a message to the second aircraft indicating that the first aircraft may be a node in a communication path of the second wireless network.

Some examples of the method, apparatus, and non-transitory computer-readable medium described above may further include processes, features, means, or instructions for receiving routing information from a terrestrial server using the first communication link of the first wireless network, the routing information indicating one or more communication paths using the second wireless network between the first aircraft and other aircraft that may be outside of a coverage area of the first aircraft. Some examples of the method, apparatus, and non-transitory computer-readable medium described above may further include processes, features, means, or instructions for transmitting data to one of the other aircraft based at least in part on the routing information.

Some examples of the method, apparatus, and non-transitory computer-readable medium described above may further include processes, features, means, or instructions for receiving updated flight data for the second aircraft from the second aircraft using the second communication link. Some examples of the method, apparatus, and non-transitory computer-readable medium described above may further include processes, features, means, or instructions for initiating a beam refinement procedure based at least in part on the updated flight data received from the second aircraft.

Some examples of the method, apparatus, and non-transitory computer-readable medium described above may further include processes, features, means, or instructions for receiving a directional transmission beam transmitted by the second aircraft using at least one directional reception beam pointed in at least one beam direction of a listening pattern having at least one beam direction, wherein establishing the second communication link directly between the first aircraft and the second aircraft may be based at least in part on receiving the directional transmission beam from the second aircraft.

Some examples of the method, apparatus, and non-transitory computer-readable medium described above may further include processes, features, means, or instructions for determining the listening pattern based at least in part on the flight data for the second aircraft, wherein receiving the directional transmission beam from the second aircraft may be based at least in part on the listening pattern.

Some examples of the method, apparatus, and non-transitory computer-readable medium described above may further include processes, features, means, or instructions for identifying a plurality of communication resources of the second wireless network to use during a discovery procedure, wherein a first set of the communication resources may be used to transmit directional transmission beams and a second set of the communication resources may be used to listen for transmission beams, and wherein transmitting the at least one directional transmission beam may be done during the first set of the communication resources.

Some examples of the method, apparatus, and non-transitory computer-readable medium described above may further include processes, features, means, or instructions for receiving an indication of the plurality of communication resources from a terrestrial server using the first communication link, wherein identifying the plurality of communication resources may be based at least in part on receiving the indication.

Some examples of the method, apparatus, and non-transitory computer-readable medium described above may further include processes, features, means, or instructions for transmitting a burst of directional transmission beams towards the second aircraft as part of a discovery procedure, at least one directional transmission beam of the burst of directional transmission beams being associated with one beam direction of a plurality of beam directions in the discovery pattern.

Some examples of the method, apparatus, and non-transitory computer-readable medium described above may further include processes, features, means, or instructions for transmitting bursts of directional transmission beams as part of the discovery procedure, wherein establishing the second communication link directly may be based at least in part on the bursts of directional transmission beams.

Some examples of the method, apparatus, and non-transitory computer-readable medium described above may further include processes, features, means, or instructions for receiving a distress signal from the second aircraft using the second communication link. Some examples of the method, apparatus, and non-transitory computer-readable medium described above may further include processes, features, means, or instructions for prioritizing a receipt of critical flight information from the second aircraft above communications with other aircraft through the second wireless network based at least in part on receiving the distress signal.

Some examples of the method, apparatus, and non-transitory computer-readable medium described above may further include processes, features, means, or instructions for receiving flight data for a plurality of aircrafts using the first communication link. Some examples of the method, apparatus, and non-transitory computer-readable medium described above may further include processes, features, means, or instructions for selecting a subset of the plurality of aircrafts to attempt to communicate with using the second communication link based at least in part on a proximity of the first aircraft to each of the plurality of aircrafts.

Some examples of the method, apparatus, and non-transitory computer-readable medium described above may further include processes, features, means, or instructions for transmitting a current position and a current vector for the first aircraft to a terrestrial server using the first communication link.

In some examples of the method, apparatus, and non-transitory computer-readable medium described above, the first communication link of the first aircraft may be a ground-aircraft communication link with a ground unit. Or the first communication link of the first aircraft may be a satellite-aircraft communication link with a satellite.

A method of wireless communication is described. The method may include receiving, at a first aircraft using a first communication link of a first wireless network, flight data for a second aircraft, determining a listening pattern having at least one beam direction based at least in part on the flight data for the second aircraft, receiving a directional transmission beam transmitted by the second aircraft using at least one directional reception beam pointed in at least one beam direction of the listening pattern, and establishing a second communication link of a second wireless network directly between the first aircraft and the second aircraft based at least in part on receiving the directional transmission beam from the second aircraft.

An apparatus for wireless communication is described. The apparatus may include means for receiving, at a first aircraft using a first communication link of a first wireless network, flight data for a second aircraft, means for determining a listening pattern having at least one beam direction based at least in part on the flight data for the second aircraft, means for receiving a directional transmission beam transmitted by the second aircraft using at least one directional reception beam pointed in at least one beam direction of the listening pattern, and means for establishing a second communication link of a second wireless network directly between the first aircraft and the second aircraft based at least in part on receiving the directional transmission beam from the second aircraft.

Another apparatus for wireless communication is described. The apparatus may include a processor, memory in electronic communication with the processor, and instructions stored in the memory. The instructions may be operable to cause the processor to receive, at a first aircraft using a first communication link of a first wireless network, flight data for a second aircraft, determine a listening pattern having at least one beam direction based at least in part on the flight data for the second aircraft, receive a directional transmission beam transmitted by the second aircraft using at least one directional reception beam pointed in at least one beam direction of the listening pattern, and establish a second communication link of a second wireless network directly between the first aircraft and the second aircraft based at least in part on receiving the directional transmission beam from the second aircraft.

A non-transitory computer readable medium for wireless communication is described. The non-transitory computer-readable medium may include instructions operable to cause a processor to receive, at a first aircraft using a first communication link of a first wireless network, flight data for a second aircraft, determine a listening pattern having at least one beam direction based at least in part on the flight data for the second aircraft, receive a directional transmission beam transmitted by the second aircraft using at least one directional reception beam pointed in at least one beam direction of the listening pattern, and establish a second communication link of a second wireless network directly between the first aircraft and the second aircraft based at least in part on receiving the directional transmission beam from the second aircraft.

In some examples of the method, apparatus, and non-transitory computer-readable medium described above, the second wireless network may be a wireless mesh network.

In some examples of the method, apparatus, and non-transitory computer-readable medium described above, a first radio frequency spectrum band used in the first wireless network may be different from a second radio frequency spectrum band used in the second wireless network.

Some examples of the method, apparatus, and non-transitory computer-readable medium described above may further include processes, features, means, or instructions for determining a beam characteristic of the at least one directional reception beam based at least in part on the listening pattern.

Some examples of the method, apparatus, and non-transitory computer-readable medium described above may further include processes, features, means, or instructions for determining a plurality of predicted locations for the second aircraft based at least in part on the flight data of the second aircraft, wherein determining the listening pattern may be based at least in part determining the plurality of predicted locations.

Some examples of the method, apparatus, and non-transitory computer-readable medium described above may further include processes, features, means, or instructions for determining a current position and a current vector for the first aircraft, wherein determining the listening pattern may be based at least in part on the current position and the current vector of the first aircraft.

Some examples of the method, apparatus, and non-transitory computer-readable medium described above may further include processes, features, means, or instructions for receiving environmental condition information associated with the second aircraft, wherein determining the listening pattern may be based at least in part on the environmental condition information.

In some examples of the method, apparatus, and non-transitory computer-readable medium described above, the flight data includes position information and vector information for the second aircraft, wherein determining the listening pattern may be based at least in part on the position information and the vector information.

In some examples of the method, apparatus, and non-transitory computer-readable medium described above, the flight data includes future flight path information for the second aircraft, wherein determining the listening pattern may be based at least in part on the future flight path information.

Some examples of the method, apparatus, and non-transitory computer-readable medium described above may further include processes, features, means, or instructions for transmitting a current position and a current vector for the first aircraft to a terrestrial server using the first communication link.

In some examples of the method, apparatus, and non-transitory computer-readable medium described above, the first communication link of the first aircraft may be a ground-aircraft communication link with a ground unit. Or the first communication link of the first aircraft may be a satellite-aircraft communication link with a satellite.

A method of wireless communication is described. The method may include receiving air traffic information from a plurality of aircraft using a wireless network, identifying a first aircraft from the plurality of aircraft as a node to establish one or more second communication links of a second wireless network directly with at least one of the plurality of aircraft, identifying a second aircraft from the plurality of aircraft for the first aircraft to attempt to communicate with based at least in part on a position of the first aircraft and the second aircraft, and transmitting flight data of the second aircraft to the first aircraft using a first communication link of the first wireless network.

An apparatus for wireless communication is described. The apparatus may include means for receiving air traffic information from a plurality of aircraft using a wireless network, means for identifying a first aircraft from the plurality of aircraft as a node to establish one or more second communication links of a second wireless network directly with at least one of the plurality of aircraft, means for identifying a second aircraft from the plurality of aircraft for the first aircraft to attempt to communicate with based at least in part on a position of the first aircraft and the second aircraft, and means for transmitting flight data of the second aircraft to the first aircraft using a first communication link of the first wireless network.

Another apparatus for wireless communication is described. The apparatus may include a processor, memory in electronic communication with the processor, and instructions stored in the memory. The instructions may be operable to cause the processor to receive air traffic information from a plurality of aircraft using a wireless network, identify a first aircraft from the plurality of aircraft as a node to establish one or more second communication links of a second wireless network directly with at least one of the plurality of aircraft, identify a second aircraft from the plurality of aircraft for the first aircraft to attempt to communicate with based at least in part on a position of the first aircraft and the second aircraft, and transmit flight data of the second aircraft to the first aircraft using a first communication link of the first wireless network.

A non-transitory computer readable medium for wireless communication is described. The non-transitory computer-readable medium may include instructions operable to cause a processor to receive air traffic information from a plurality of aircraft using a wireless network, identify a first aircraft from the plurality of aircraft as a node to establish one or more second communication links of a second wireless network directly with at least one of the plurality of aircraft, identify a second aircraft from the plurality of aircraft for the first aircraft to attempt to communicate with based at least in part on a position of the first aircraft and the second aircraft, and transmit flight data of the second aircraft to the first aircraft using a first communication link of the first wireless network.

In some examples of the method, apparatus, and non-transitory computer-readable medium described above, the second wireless network may be a wireless mesh network.

In some examples of the method, apparatus, and non-transitory computer-readable medium described above, a first radio frequency spectrum band used in the first wireless network may be different from a second radio frequency spectrum band used in the second wireless network.

Some examples of the method, apparatus, and non-transitory computer-readable medium described above may further include processes, features, means, or instructions for receiving a message from the first aircraft that includes data originating from the second aircraft, wherein the data originating from the second aircraft was transmitted to the first aircraft using a second communication link.

Some examples of the method, apparatus, and non-transitory computer-readable medium described above may further include processes, features, means, or instructions for transmitting routing information to the first aircraft using the first communication link of the first wireless network, the routing information configured to be used by the first aircraft to communicate with other aircraft that may be outside of a coverage area of the second wireless network for the first aircraft.

Some examples of the method, apparatus, and non-transitory computer-readable medium described above may further include processes, features, means, or instructions for determining a discovery pattern for the first aircraft having a first plurality of beam directions based at least in part on the flight data for the first aircraft and the second aircraft. Some examples of the method, apparatus, and non-transitory computer-readable medium described above may further include processes, features, means, or instructions for transmitting a message that indicates the discovery pattern to the first aircraft using the first communication link of the first wireless network.

Some examples of the method, apparatus, and non-transitory computer-readable medium described above may further include processes, features, means, or instructions for determining a listening pattern for the first aircraft having a second plurality of beam directions based at least in part on the flight data for the first aircraft and the second aircraft, wherein the message indicates the listening pattern to the first aircraft using the first communication link of the first wireless network.

Some examples of the method, apparatus, and non-transitory computer-readable medium described above may further include processes, features, means, or instructions for determining a listening pattern having a first plurality of beam directions based at least in part on the flight data for the first aircraft and the second aircraft. Some examples of the method, apparatus, and non-transitory computer-readable medium described above may further include processes, features, means, or instructions for transmitting a message that indicates the listening pattern to the second aircraft using a second communication link of the first wireless network.

Some examples of the method, apparatus, and non-transitory computer-readable medium described above may further include processes, features, means, or instructions for determining a discovery pattern for the second aircraft having a second plurality of beam directions based at least in part on the flight data for the first aircraft and the second aircraft, wherein the message indicates the discovery pattern to the second aircraft using the second communication link of the first wireless network.

Some examples of the method, apparatus, and non-transitory computer-readable medium described above may further include processes, features, means, or instructions for identifying communication resources of the second wireless network for the first aircraft and the second aircraft to use to perform a beam discovery procedure. Some examples of the method, apparatus, and non-transitory computer-readable medium described above may further include processes, features, means, or instructions for transmitting a message that indicates the identified communication resources to the first aircraft and the second aircraft using the first and second communication links of the first wireless network.

DETAILED DESCRIPTION

An aircraft-to-aircraft mesh network may be used to communicate information between aircraft during flight. When two aircraft are in flight, line-of-sight communication is frequently possible due to a lack of interference sources at some altitudes. In addition, information about aircraft in flight is already managed and communicated using an air traffic control system. Procedures of the aircraft-to-aircraft mesh network may be configured to take advantage of specific characteristics related to the flight of aircraft.

Techniques are provided herein for procedures for establishing an aircraft-to-aircraft mesh network during flight using high-bandwidth directional communication beams. A first aircraft may be able to utilize flight data about a second aircraft to reduce a computational cost of a beam discovery procedure used to establish directional communication beams in the aircraft-to-aircraft mesh network. For example, the first aircraft may receive flight data (e.g., position information, heading, altitude, etc.) using an air traffic control system. The first aircraft may determine one or more predicted locations of the second aircraft based on the flight data. The first aircraft may use the information, such as the predicted locations, to transmit directional discovery beams to those locations where the second aircraft is likely to be. Upon receiving at least one of the directional discovery beams, the second aircraft and the first aircraft may establish a communication link of the aircraft-to-aircraft mesh network. This mesh network may have advantages over other lower-throughput networks used in some alternative applications. In some examples, the communication link between an aircraft and a terrestrial server may use a different frequency band from a mesh communication link between aircraft or between an aircraft and one or more other devices. In some cases, the communication link between an aircraft and a terrestrial server may be of lower capacity than the mesh communication links.

Aspects of the disclosure are initially described in the context of a wireless communications system. Aspects of the disclosure are described in the context of networks, procedures, and communication schemes. Aspects of the disclosure are further illustrated by and described with reference to apparatus diagrams, system diagrams, and flowcharts that relate to directional beam mesh network for aircraft.

Figure 1:
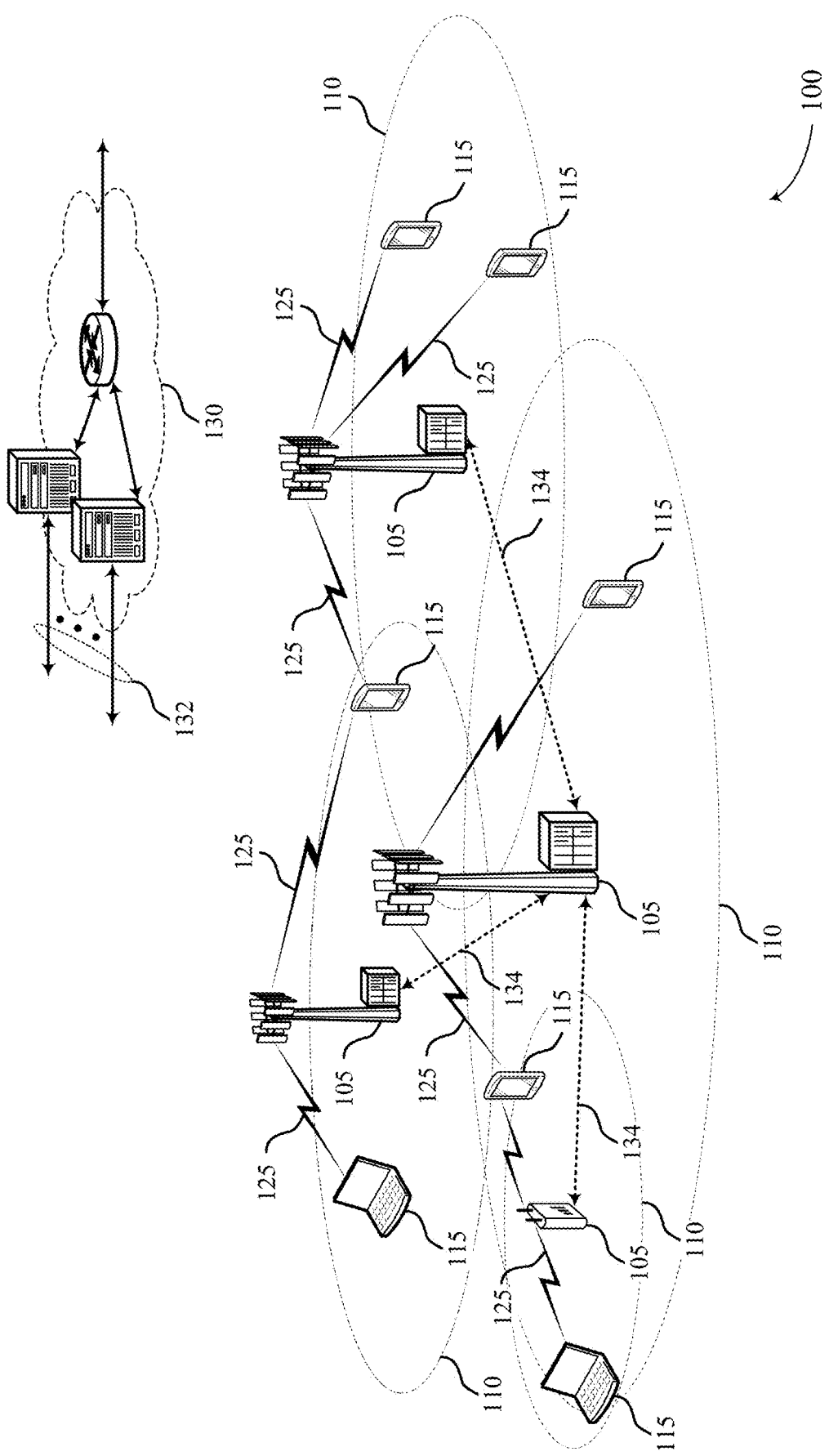
FIG. 1 illustrates an example of a wireless communications system that supports directional beam mesh network for aircraft in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115).

In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (e.g., the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Techniques are provided herein for procedures for establishing an aircraft-to-aircraft mesh network, in some examples during flight, using high-bandwidth directional communication beams. A first aircraft may be able to utilize flight data about a second aircraft to reduce the computational cost of a beam discovery procedure used to establish directional communication beams in the aircraft-to-aircraft mesh network. For example, the first aircraft may receive flight data (e.g., position information, heading, altitude, etc.) using an air traffic control system. The first aircraft may determine one or more predicted locations of the second aircraft based on the flight data. The first aircraft may use the predicted locations to transmit directional discovery beams to one or more of those locations related to where the second aircraft or is likely to be at a designated time. Upon receiving at least one of the directional discovery beams, the second aircraft and the first aircraft may establish a communication link of the aircraft-to-aircraft mesh network.

Figure 2:
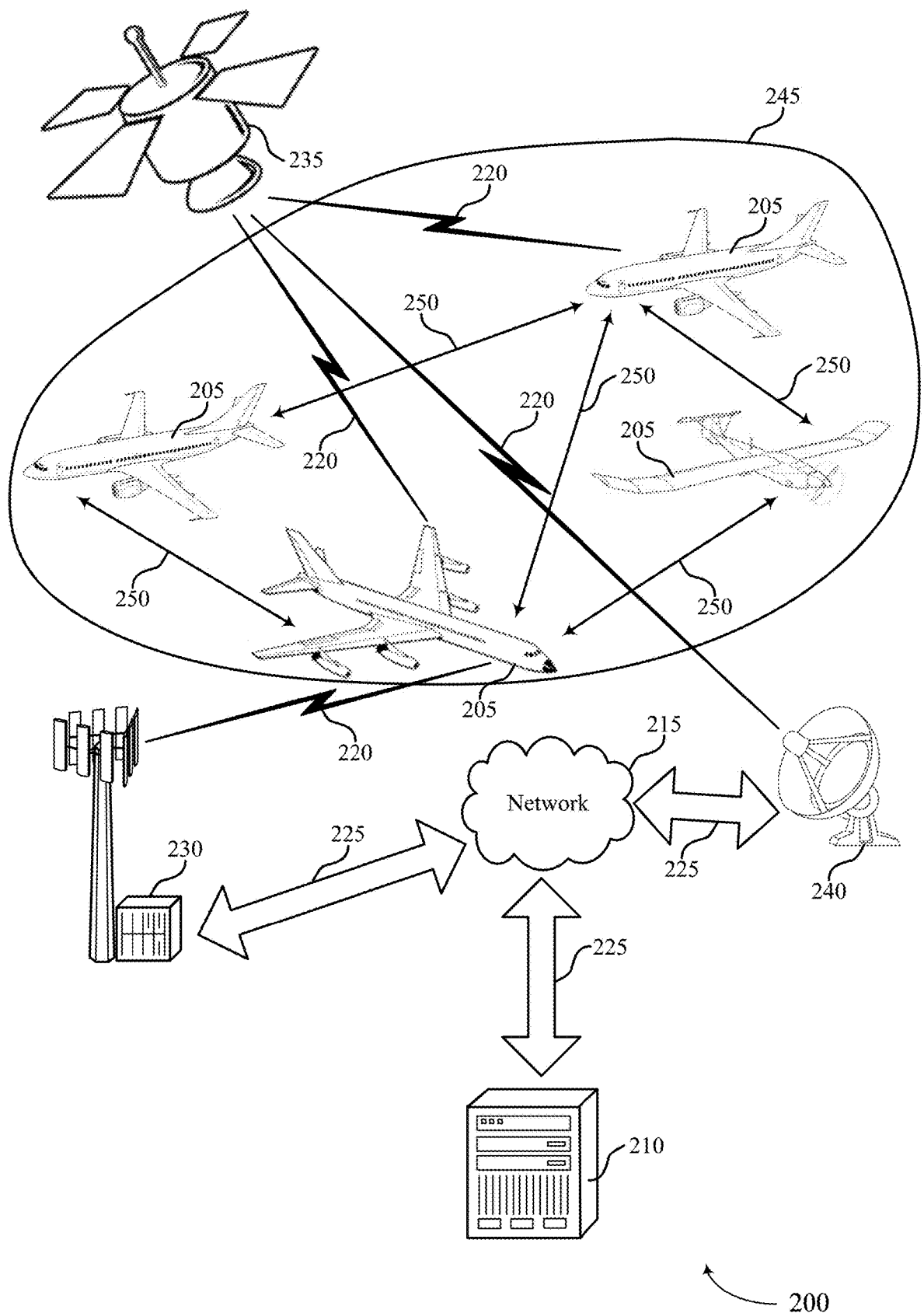
FIG. 2 illustrates an example of a wireless communication system that supports directional beam mesh network for aircraft in accordance with aspects of the present disclosure.

FIG. 2 illustrates an example of a wireless communication system 200 that supports directional beam mesh networking for aircraft in accordance with various aspects of the present disclosure. In some examples, the wireless communication system 200 may implement aspects of wireless communications system 100.

The wireless communication system 200 may be configured to connect an aircraft 205 to one or more terrestrial servers 210 and/or to other aircraft using both a managed network 215 and an aircraft-to-aircraft millimeter wave (mmW) mesh network 245. The mesh network 245 may include high-bandwidth directional communication links 250 directly between different aircraft 205. Such communication links 250 may be used to exchange large amounts of information between aircraft 205, including critical flight information such as flight recorder data, cockpit voice data, aircraft diagnostic data, and/or internet traffic.

An aircraft 205 may include any vehicle designed for flight in the air. Examples of aircraft 205 may include manned vehicles, unmanned air vehicles (UAVs), drones, single-engine piston craft, jets, commercial liners, floatplanes, helicopters, tiltrotors, ultralights, multiengine piston craft, turboprops, biplanes, gliders, gyroplanes, blimps, dirigibles, hot air balloons, personal jet packs, gliders, powered parachutes, or other types of aircraft. In some cases, the aircraft 205 may be referred to as a UE 115 and may include many of the same features of a UE 115. A wireless device may be integrated directly into the aircraft 205 or may be used by the aircraft 205 to communicate with one or more networks.

The aircraft 205 may collect and store data about any given flight the aircraft 205 takes. In some examples, the collected data is stored in a flight recorder (e.g., a black box device). The types of data collected and stored may include flight data, voice data, or aircraft operations data, among others. Flight data may include the position, heading, air speed, altitude, and/or other information of the aircraft 205 relative to the flight of aircraft 205. Voice data may include voice recordings of pilots, people in the cockpit, other members of a flight crew, passengers on the aircraft 205, other operations (e.g., mechanical systems) of the aircraft 205. Aircraft operations data may include information about how the aircraft 205 is functioning, sensor data about various functions of the aircraft, aircraft diagnostics data, fuel readings, and/or other information. Internet traffic may include data communicated by the aircraft 205 or people in the aircraft with an external network, such as the internet. Such internet traffic may include surfing the web, streaming multimedia content, sending/receiving emails, and/or other activity.

The terrestrial server 210 may, in some examples, be part of a larger air traffic control system. The terrestrial server 210 may track the flights of various aircraft 205 in the air and store data relative to those various aircraft 205. Terrestrial server 210 may be ground-based in most examples, but, in some examples, the server may be part of an airborne air traffic control system.

The terrestrial server 210 may be configured to assist aircraft 205 in establishing aircraft-to-aircraft directional communication links 250 of the mesh network 245. One of the challenges with mmW networks is that directional signals serve a relatively limited geographical area. Such characteristics may make discovering other devices in a directional mesh network more difficult. In addition, when UEs in the mesh network 245 move (e.g., aircraft 205 flying around), directional beams may become misaligned and radio link failure or other problems may occur.

To address some of these issues, the terrestrial server 210 may be configured to communicate flight data about other aircrafts to a discovering aircraft 205. For example, a discovering aircraft 205 may attempt to establish directional communication links 250 with other aircraft 205. The terrestrial server 210 may provide to the first aircraft 205 position information and/or vector information about other aircraft 205 to the discovering aircraft 205. Using this information and/or information about its own position and vector, the discovering aircraft 205 may generate a discovery pattern of one or more directional beams tailored to find a specific aircraft 205, rather than looking for other aircraft in all directions.

The terrestrial server 210 and the aircraft 205 may communicate such flight data and other data using the managed network 215. The managed network 215 may be an example of existing air traffic control networks or data networks. For example, the managed network 215 may be a wireless network that uses the airband, or the radio frequency spectrum band allocated for radio communication in civil aviation. The managed network 215 may also be other types networks such as LTE, 3G, or Wi-Fi. The managed network 215 may also include aspects of satellite communication and may use radio frequency spectrum bands associated with satellite communication. The managed network 215 may use contention-based or contention free radio access technologies (RATs) to communicate with aircraft and other devices.

The managed network 215 may include wireless communication links and/or wired communication links. The wireless communication links 220 may be used to convey information between a base station 230 associated with the terrestrial server 210 and an aircraft 205 (e.g., ground-aircraft communication link). The wireless communication links 220 may be used to convey information between a satellite 235 associated with the terrestrial server 210 and an aircraft (e.g., satellite-aircraft communication link). In some examples of the satellite communication, the terrestrial server 210 may use a ground-based satellite dish 240 or other antenna to establish a wireless backhaul link to the satellite 235. Such a backhaul link may be a high-capacity link. The terrestrial server 210 may communicate with base station 230 or the satellite dish 240 using backhaul links 225. The backhaul links 225 may be wired or wireless. The base station 230 may be an example of the base station 105 described with reference to FIG. 1. The backhaul links 225 may be examples of the backhaul links 134 described with reference to FIG. 1.

The mesh network 245 may be formed of a plurality of aircraft-to-aircraft directional communication links 250. The directional communication links 250 may provide a high-bandwidth or high-capacity connection between aircraft 205. Directional beams may minimize interference with other signals in a geographic area, thus allowing more devices to use the same frequency spectrum band. As such, the capacity of each radio frequency spectrum band increases because the number of devices competing for the same resources is reduced. In some cases, the mesh network 245 may use a radio frequency spectrum band different from the radio frequency spectrum band used by the managed network 215.

The mesh network 245 may be used to communicate critical flight information of an aircraft 205 during flight. Other aircraft 205 may store that critical flight information. Such sharing of data provides an additional redundancy in case of an emergency or other scenario. When an aircraft crashes, investigators cannot always immediately locate the flight recorder and recover critical information to investigate the crash. If portions of the critical flight information are stored on other aircraft 205, those distributed pieces of critical flight information may be collected and aggregated to aid in the investigation of a crash or other problem.

In some examples, the communication link between an aircraft and a terrestrial server (e.g., directly, through a satellite or other intermediate point) may use a different frequency band from a mesh communication link between aircraft (or between an aircraft and one or more other devices). In some cases, the communication link between an aircraft and a terrestrial server may be of lower capacity than the mesh communication links. Therefore, the communication links with the terrestrial server may be used for a first type of transmission (e.g., control messages) while the mesh communication links may be used for a second type of transmission (e.g., data traffic).

In some examples, a number of different operations are needed to establish and maintain the mesh network 245. For example, a beam discovery procedure may be configured so that a first aircraft may discovery a second aircraft and a directional communication link may be established. A routing procedure may be configured to inform an aircraft about communication paths to other aircraft and to gateway aircraft (e.g., aircraft with a reliable connection to outside networks sometimes using a backhaul link) that are not directly linked to the first aircraft. A beam refinement procedure may be configured to adjust beam parameters to avoid a radio link failure event. In addition, data sharing procedures may be configured to share and distribute of critical flight information both during distress situations and normal situations.

Figure 3:
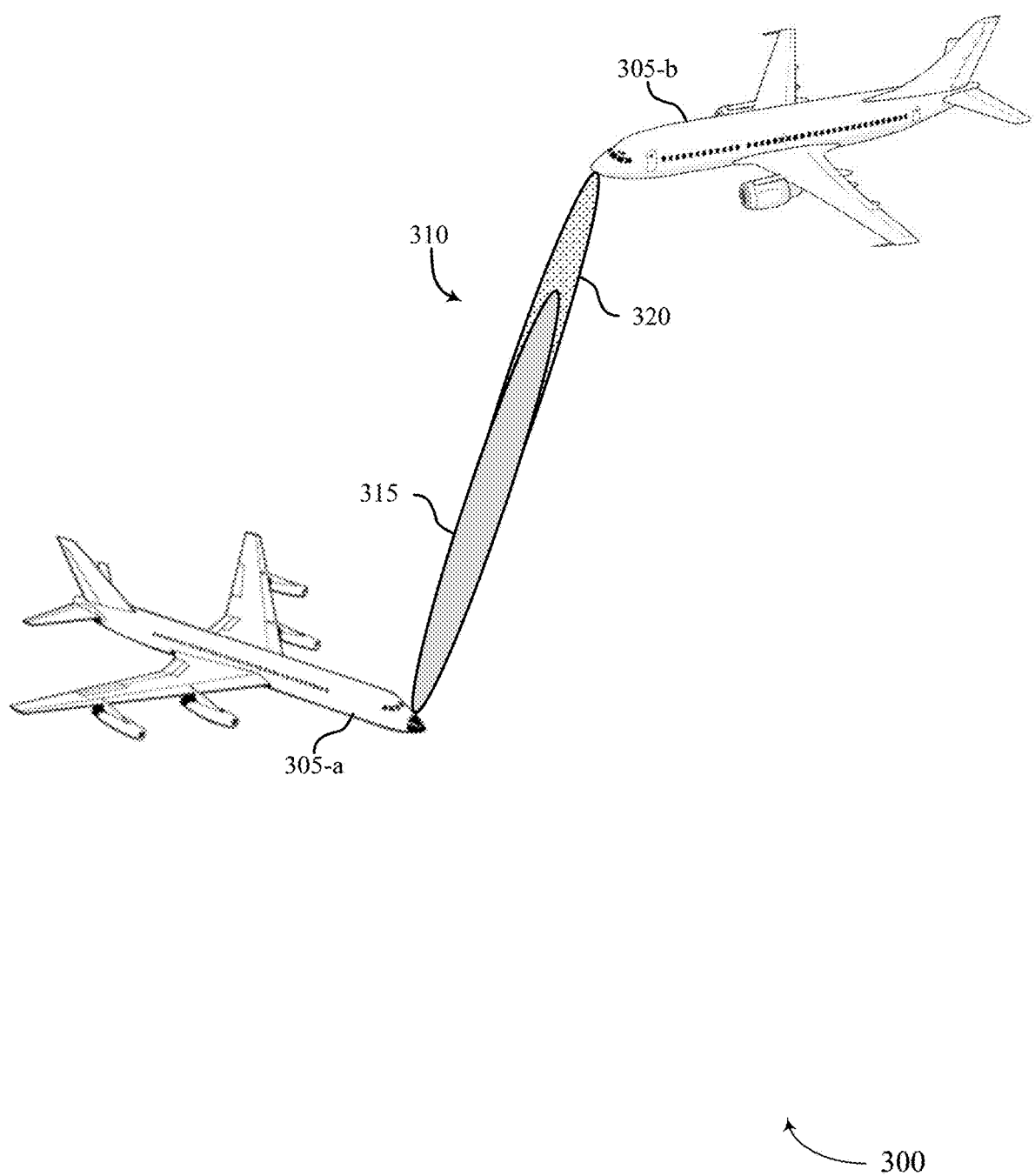
FIG. 3 illustrates an example of a directional mesh network that supports directional beam mesh network for aircraft in accordance with aspects of the present disclosure.

FIG. 3 illustrates an example of a directional mesh network 300 that supports directional beam mesh network for aircraft in accordance with various aspects of the present disclosure. In some examples, directional mesh network 300 may implement aspects of the wireless communications systems 100 or 200.

The directional mesh network 300 illustrates an example of a directional communication link 310 established between a transmitting aircraft 305-*a* and a receiving aircraft 305-*b*. The aircraft 305 may be examples of the aircraft 205 described with reference to FIG. 2. The directional communication link 310 may be an example of the communication links 250 described with reference to FIG. 2.

The directional communication link 310 may include a directional transmission beam 315 and a directional reception beam 320. In the mesh network 245, the transmitting aircraft 305-*a* may use beamforming techniques to form a directional transmission beam. Similarly, the receiving aircraft 305-*b* may use beamforming techniques to form a directional reception beam. In some examples, directional listening may include activating some elements of a phased array antenna and not others. In some examples, the receiving aircraft 305-*b* may use omni-directional listening or wide-area listening and still receive the directional transmission beam 315.

Both the directional transmission beam 315 and the directional reception beam 320 may include a number of beam characteristics. Such beam characteristics may include a beam target, a beam width, a beam power, or a combination thereof. The beam target may refer to the direction the directional beam is pointed. In the aircraft-to-aircraft mesh network 245, the beam target will include directional parameters (compass directions) and altitude parameters. The beam width may refer to a distance in a horizontal plane having useful transmission characteristics. In some examples, the beam width may be the angle between the half-power (−3 dB) points of the main lobe, when referenced to the peak effective radiated power of the main lobe. Beam width may be expressed in degrees for a horizontal plane.

Figure 4:
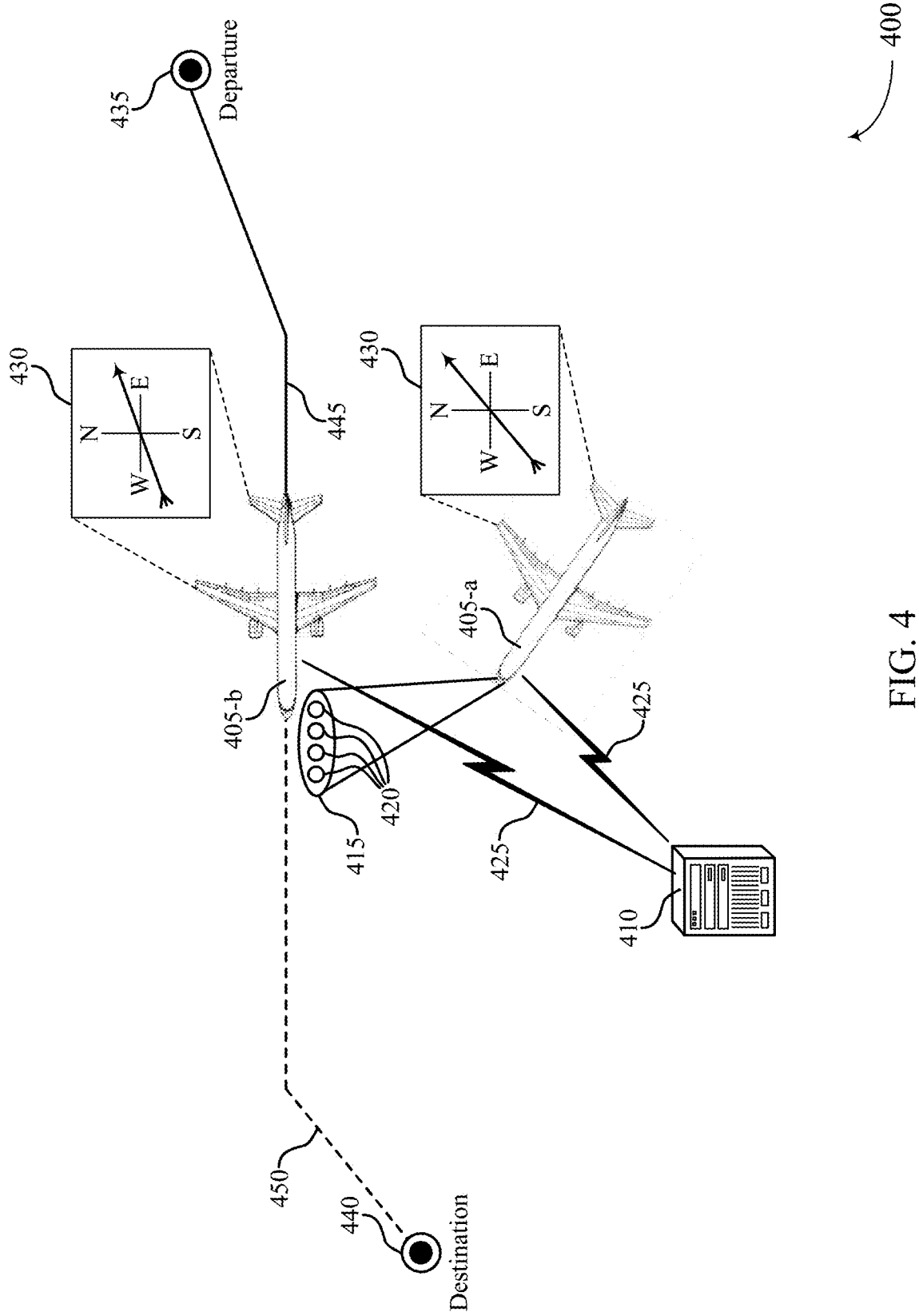
FIG. 4 illustrates an example of a discovery procedure in a directional mesh network that supports directional beam mesh network for aircraft in accordance with aspects of the present disclosure.

FIG. 4 illustrates an example of a discovery procedure 400 in a directional mesh network that supports directional beam mesh network for aircraft in accordance with various aspects of the present disclosure. In some examples, discovery procedure 400 may implement aspects of the wireless communications systems 100 or 200.

The discovery procedure 400 illustrates a number of different factors that may be used by nodes or devices (e.g., aircraft 405) of the mesh network 245 to establish directional communication links with other aircraft 405. Such factors may include flight data for the aircraft 405 involved in the discovery procedure, environmental data for the aircraft 405 involved in the discovery procedure, and/or predictive data for the aircraft 405 involved in the discovery procedure. The aircraft 405 may be examples of the aircraft 205, 305 described with reference to FIGS. 2 and 3.

During the discovery procedure 400, the discovering aircraft 405-*a* may narrow its search pattern for the target aircraft 405-*b* based on information obtained from a terrestrial server 410. When flying, an aircraft-to-aircraft mesh network 245 has a number of advantages over other mesh networks. Terrestrial mesh networks must contend with lots of changing interference sources. For example, buildings are built and torn down, trees grow, entities disturb the ground units, nodes of the mesh network are moveable, line-of-sight between nodes becomes disrupted due to movement or change, etc. In contrast, when in flight, aircraft 405 have unobstructed lines-of-sight to other nodes (e.g., target aircraft 405-*b*) in the mesh network 245. Furthermore, the travel of aircraft 405 is more regimented and predictable than in a vehicle-to-everything mesh network that leads to more sporadic movement patterns. In the aircraft-to-aircraft mesh network 245, the discovery procedure 400 may be configured to leverage line-of-sight communications and predictable movement patterns to reduce the complexity of procedures of the mesh network 245, when compared to other mesh networks.

The terrestrial server 410 may receive air traffic data from the aircraft 405. The air traffic data may include flight data, but may also include other data that is used by the air traffic control system. The terrestrial server 410 may identify a discovering aircraft 405-*a* to perform a beam discovery procedure. The terrestrial server 410 may identify other aircraft (e.g., target aircraft 405-*b*) with which the discovering aircraft 405-*a* is to attempt to establish a communication. The terrestrial server 410 may transmit flight data about the target aircraft 405-*b* to the discovering aircraft 405-*a* using a wireless communication link 425. The terrestrial server 410 may be an example of the terrestrial server 210 described with reference to FIG. 2. The wireless communication link 425 may be an example of the communication links 220, 225 described with reference to FIG. 2.

The discovering aircraft 405-*a* may use the flight data of the target aircraft 405-*b* and its own flight data (which is already known to the discovering aircraft 405-*a*) to determine a discovery pattern 415. The discovery pattern 415 may include a plurality of beam directions 420 arranged in a particular manner. The beam directions 420 are configured to increase a likelihood that the target aircraft 405-*b* receives at least one directional transmission beam from the discovering aircraft 405-*a*. To achieve some of these results, the discovering aircraft 405-*a* may take into account position and velocity information about the discovering aircraft 405-*a* and the target aircraft 405-*b* to determine one or more predicted locations of the target aircraft 405-*b*. The beam directions 420 may be based on the one more predicted locations and/or a current location of the target aircraft 405-*b*.

The discovery pattern 415 may include other pattern characteristics such as an order of beam transmissions in particular directions, how many times a beam will be transmitted in a particular beam direction, a beam sweep where the discovering aircraft 405-*a* transmits a single beam in each beam direction 420 of the discovery pattern 415, a number of times a beam sweep may be performed, or other factors.

The discovering aircraft 405-*a* may use a variety of different factors to determine the pattern characteristics of the discovery pattern 415. The discovering aircraft 405-*a* may use position information (e.g., latitude, longitude, altitude) of one or both of the aircraft 405. The discovering aircraft 405-*a* may use vector information (e.g., heading, velocity, airspeed, ground speed) of one or both of the aircraft 405. The discovering aircraft 405-*a* may use environmental information (e.g., wind speed 430, storms, precipitation, cloud cover) associated with one or both of the aircraft 405. The discovering aircraft 405-*a* may use departure airport 435 information and/or destination airport 440 associated with one or both of the aircraft 405. The discovering aircraft 405-*a* may use flight path information. A flight path may include one or more legs. The discovering aircraft 405-*a* may use information about a current leg 445 of a flight path of one or both of the aircraft 405. The discovering aircraft 405-*a* may use information about a future leg 450 of a flight path of one or both of the aircraft 405.

Similarly, the discovering aircraft 405-*a* may use these same factors to determine whether the discovering aircraft 405-*a* even wants to attempt to communicate with a target aircraft 405-*b*. In some examples, divergent flight paths of the two aircraft 405 may make establishing a communication link impractical. For example, the discovering aircraft 405-*a* may determine a predicted contact time based on these factors. The predicted contact time may refer to a duration during which reliable communication between the two aircraft 405 can be maintained (e.g., radio link failure events being unlikely). If the predicted contact time does not satisfy a threshold, the discovering aircraft 405-*a* may determine not to establish contact. If the predicted contact does satisfy the threshold, however, the discovering aircraft 405-*a* may initiate a beam discovery procedure for the target aircraft 405-*b*.

During a discovery procedure, the discovering aircraft 405-*a* may transmit at least one directional transmission beam in each of the beam directions 420 indicated by the discovery pattern 415. In some examples, the discovering aircraft 405-*a* may transmit a burst of directional transmission beams. A burst of directional transmission beams may include transmitting a set number of directional transmission beams during a finite period of communication resources. A discovery procedure may include multiple bursts of directional transmission beams. In some cases, a burst of directional transmission beams may include transmitting a single beam in each direction. In other cases, a burst of directional transmission beams may include transmitting beams for specified time period. In some cases, the discovering aircraft 405-*a* may transmit bursts of directional transmission beams until either an acknowledgment is received from the target aircraft 405-*b* or a timer expires.

The directional transmission beams may be discovery beams that include information related to the beam discovery procedure. For example, the directional transmissions may include flight data of the discovering aircraft 405-*a*, a request to establish a communication link, other data related to the communication link, or a combination thereof.

In some examples of the discovery procedure 400, the target aircraft 405-*b* may receive information from the terrestrial server 410 related to the beam discovery procedure. For example, the target aircraft 405-*b* may receive flight data of the discovering aircraft 405-*a*. Using this flight data and/or its own flight data, the target aircraft 405-*b* may determine a listening pattern with a plurality of pattern characteristics (including listening directions) in a similar manner to how the discovery pattern is formed. In addition, the target aircraft 405-*b* may decide to refrain from (e.g., not attempt to) communicating with the discovering aircraft 405-*a* based on a predicted contact time parameter.

In some examples, to establish a bi-directional communication link each aircraft 405 may need to discover the other aircraft. As such, the discovery procedure 400 may include allocating some communication resources for transmitting and listening to both the discovering aircraft 405-*a* and the target aircraft 405-*b*. In such a discovery procedure 400 each aircraft at differing times may be a discovering aircraft or a target aircraft. The arrangement of the communication resources may be configured such that there will at least be one period of time where aircraft 405-*a* is a transmitter and aircraft 405-*b* is a receiver and at least one period of time where aircraft 405-*a* is a receiver and aircraft 405-*b* is a transmitter.

In some examples, a bi-directional communication link may be established based on a single successful transmission between the two aircraft. In such examples, upon receiving a directional transmission beam, the target aircraft 405-*b* may be capable of establishing a directional communication link with the discovering aircraft 405-*a*. In some examples, upon receiving a directional transmission beam, the target aircraft 405-*b* may initiate its own beam discovery procedure and roles of the two aircraft may be reversed. In such an example, communication resources of the mesh network 245 may not be coordinated for listening and receiving. Rather, once one discovery procedure is successful, another beam discovery procedure may begin. In some examples, the communication link between the two aircraft 405 may be unidirectional where one of the aircraft 405 either failed to discover the other aircraft or decided not communicate with the other aircraft.

In some examples, the terrestrial server 410 may coordinate the use of communication resources of the mesh network 245 with the aircraft 405. The terrestrial server 410 may indicate to one or both of the aircraft 405 a start time of the discovery procedure, the aircraft's role in the discovery procedure (e.g., discoverer or target), communication resources to be used in the discovery procedure (e.g., frequency resources and/or time resources), a pattern for listening and/or discovering by the two aircraft 405, a listening pattern, a discovery pattern, or a combination thereof. In some cases, the terrestrial server 410 may determine which aircraft 405 are to be involved in the discovery procedure. In some cases, the aircraft 405 may communicate desired targets for a beam discovery procedure and the terrestrial server 410 may initiate the beam discovery procedures based on those messages. The terrestrial server 410 may transmit one or more messages to the aircraft 405 with any information relevant to the discovery procedure.

Figure 5:
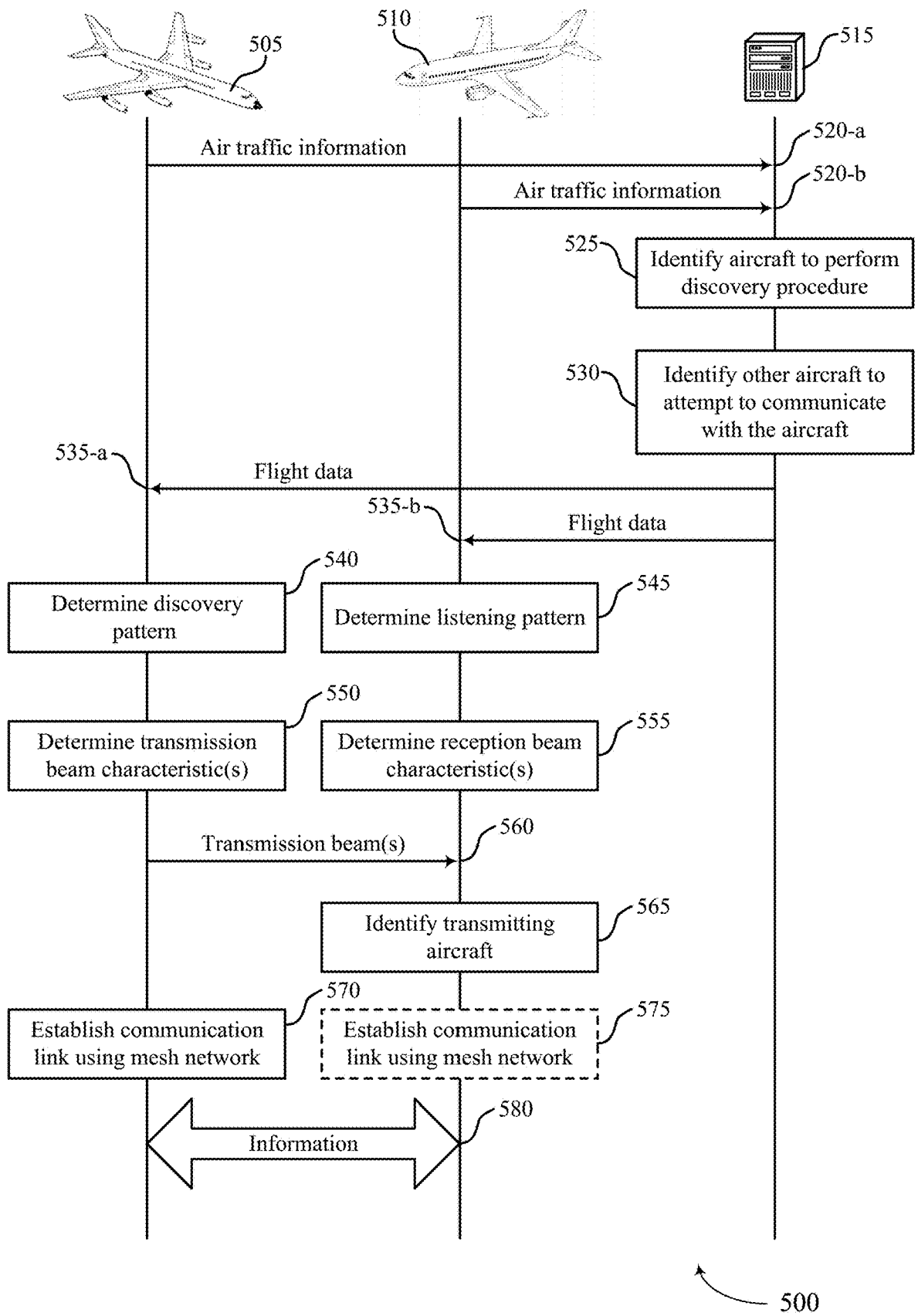
FIG. 5 illustrates an example of a communication scheme that supports directional beam mesh network for aircraft in accordance with aspects of the present disclosure.

FIG. 5 illustrates an example of a communication scheme 500 that supports directional beam mesh network for aircraft in accordance with various aspects of the present disclosure. In some examples, communication scheme 500 may implement aspects of the wireless communications systems 100 or 200.

The communication scheme 500 may illustrate an example relating to a beam discovery procedure. The communication scheme 500 may be an example of the discovery procedure 400 described with reference to FIG. 4. As such, the communication scheme 500 may include features and functions described with reference to FIG. 4. The communication scheme 500 illustrates functions and communications of a discovering aircraft 505, a target aircraft 510, and a terrestrial server 515. The discovering aircraft 505 may be an example of aircraft 205, 305, 405 described with reference to FIGS. 2-4. The target aircraft 510 may be an example of aircraft 205, 305, 405 described with reference to FIGS. 2-4. The terrestrial server 515 may be an example of terrestrial servers 210 and 410 described with references to FIGS. 2 and 4.

The terrestrial server 515 may receive air traffic information 520 from one or both of the aircraft 505, 510. The air traffic information 520 may include may include flight data such as position information, vector information, environment information, flight path information, or a combination thereof. The air traffic information 520 may also include other types of data relevant to air traffic control systems. For example, air traffic information may also include voice communication exchanges between a pilot and a controller, aircraft operation data, or other types of data.

At block 525, the terrestrial server 515 may identify an aircraft from a plurality of aircraft to perform a discovery procedure and establish directional communication links with some of the other aircraft using an aircraft-to-aircraft mesh network (e.g., mesh network 245). In some cases, the terrestrial server 515 identifies the aircraft based on a request received from the discovering aircraft 505 (sometimes included in the air traffic information 520). In some cases, the terrestrial server 515 may identify the aircraft based on a predetermined discovery procedure schedule, where aircraft periodically perform discovery procedures because the topology of the mesh network is always changing.

At block 530, the terrestrial server 515 may identify a target aircraft 510 that may attempt to communicate with the discovering aircraft 505. The terrestrial server 515 may identify a set of target aircraft for the discovering aircraft 505 based on the proximity of the target aircraft to the discovering aircraft 505. The terrestrial server 515 may compare the positions of each of the aircraft 505, 510. The terrestrial server 515 may compare the distance between the positions of each of the aircraft 505, 510 to a threshold. If the threshold is satisfied, the terrestrial server 515 may identify the aircraft as a target aircraft 510.

In some cases, the terrestrial server 515 may determine one or more parameters of a discovery procedure or any other procedure to executed by the aircraft 505, 510. For example, the terrestrial server 515 may determine one or more discovery patterns, one or more listening patterns, one or more communication resources to be used during the procedure, a transmitting/listening schedule for the aircraft, other information described herein, or a combination thereof.

The terrestrial server 515 may transmit flight data 535 to a first aircraft, the flight data 535 being associated with the other aircraft. For example, the terrestrial server 515 may transmit flight data 535-*a* associated with the target aircraft 510 to the discovering aircraft 505. The terrestrial server 515 may transmit flight data 535-*b* associated with the discovering aircraft 505 to the target aircraft 510. The terrestrial server 515 may also transmit data associated with the one or more parameters of the mesh network procedure to the aircraft 505, 510. The flight data 535 may be examples of the other flight data described with reference to FIGS. 2-4.

At block 540, the discovering aircraft 505 may determine a discovery pattern (e.g., discovery pattern 415) based on the flight data 535-*a* received from the terrestrial server 515. As part of determining the discovery pattern, the discovering aircraft 505 may determine a predicted location of the target aircraft 510, determine a predicted contact time with the target aircraft 510, determine environmental conditions associated with the target aircraft 510, determine current flight data for the discovering aircraft, determine flight path information for the target aircraft 510, or a combination thereof. The discovery pattern may be based on any combination of these determinations. The discovering aircraft 505 may determine one or more pattern characteristics of the discovery pattern. One of the pattern characteristics may include a plurality of beam directions for which directional transmission beams may be transmitted by the discovering aircraft 505 during the beam discovery procedure. In some cases, the discovering aircraft 505 may identify communication resources of the aircraft-to-aircraft mesh network to use for transmitting directional transmission beams during a discovery procedure.

At block 545, the target aircraft 510 may determine a listening pattern based on the flight data 535-*b* received from the terrestrial server 515. As part of determining the listening pattern, the target aircraft 510 may determine a predicted location of the discovering aircraft 505, determine a predicted contact time with the discovering aircraft 505, determine environmental conditions associated with the discovering aircraft 505, determine current flight data for the discovering aircraft, determine flight path information for the discovering aircraft 505, or a combination thereof. The listening pattern may be based on any combination of these determinations. The target aircraft 510 may determine one or more pattern characteristics of the listening pattern. One of the pattern characteristics may include a plurality of beam directions for which directional reception beams may be formed by the target aircraft 510 during the beam discovery procedure. In some cases, the target aircraft 510 may identify communication resources of the aircraft-to-aircraft mesh network to use for forming directional reception beams during a discovery procedure.

At block 550, the discovering aircraft 505 may determine transmission beam characteristics of directional transmission beams to be transmitted during the beam discovery procedure. The beam characteristics may include beam direction, beam width, and/or beam power.

At block 555, the target aircraft 510 may determine reception beam characteristics of directional reception beams to be formed during the beam discovery procedure. The beam characteristics may include beam direction, beam width, and/or beam power, among other characteristics.

The discovering aircraft 505 may transmit one or more directional transmission beams 560 in each beam direction of the discovery pattern during the discovery procedure. In some cases, the discovering aircraft 505 may transmit bursts of directional transmission beams 560 or sweeps of directional transmission beams 560. In some cases, the discovering aircraft 505 may transmit multiple bursts or sweeps of the directional transmission beams 560.

The target aircraft 510 may form one or more directional reception beams in each beam direction of the listening pattern during the discovery procedure. In some cases, the target aircraft 510 may form bursts of directional reception beams or sweeps of directional reception beams. In some cases, the target aircraft 510 may transmit multiple bursts or sweeps of the directional reception beams.

At block 565, upon successfully decoding at least one directional transmission beam 560 from the discovering aircraft 505, the target aircraft 510 may identify the discovering aircraft 505. The directional transmission beams 560 may include information identifying the transmitting node or device. The directional transmission beams 560 may also include flight data associated with the discovering aircraft 505.

At blocks 570, 575, the discovering aircraft 505 and the target aircraft 510 may establish a directional communication link of the aircraft-to-aircraft mesh network (e.g., mesh network 245). Establishing a communication link may include syncing the timing of the devices, exchanging device specific information and control information, periodically executing beam refinement procedures to avoid a radio link failure event due to the relative movement of the two aircraft, other functions associated with establishing a communication link, or a combination thereof. In some cases, the target aircraft 510 may not establish a communication link and the link may be unidirectional. In some cases, the target aircraft 510 may execute its own beam discovery procedure upon successfully decoding a directional transmission beam 560. In such cases, the target aircraft 510 may change roles to become the discovering aircraft and the discovering aircraft 505 may change roles to become the target aircraft. In such procedures, the target aircraft 510 may use flight data found in the directional transmission beam 560 to determine a discovery pattern.

Once the directional communication link is established, the discovering aircraft 505 and/or the target aircraft 510 may communicate information with one another. Some of the information that may be communicated is critical flight information. For example, the target aircraft 510 may store critical flight information shared by the discovering aircraft 505 as a redundant back-up for the critical flight information being stored in the flight recorder of the discovering aircraft 505. In this manner, recovering a flight recorder may not be as critical to an investigation of an aircraft crash or other incident.

In some cases, once the communication link is established, the aircraft 505, 510 may periodically initiate beam refinement procedures. As aircraft move through space, the directional beams of the aircraft-to-aircraft mesh network may become misaligned. A beam refinement procedure may be configured to adjust one or more characteristics of the directional beams of the communication link to prevent a radio link failure event. In some cases, the aircraft 505, 510 may exchange updated flight data using the directional communication link to adjust beams. In some cases, the beam refinement procedure may include transmitting one or more directional transmission beams to empirically determine based on received power which new beam direction should be used.

Figure 6:
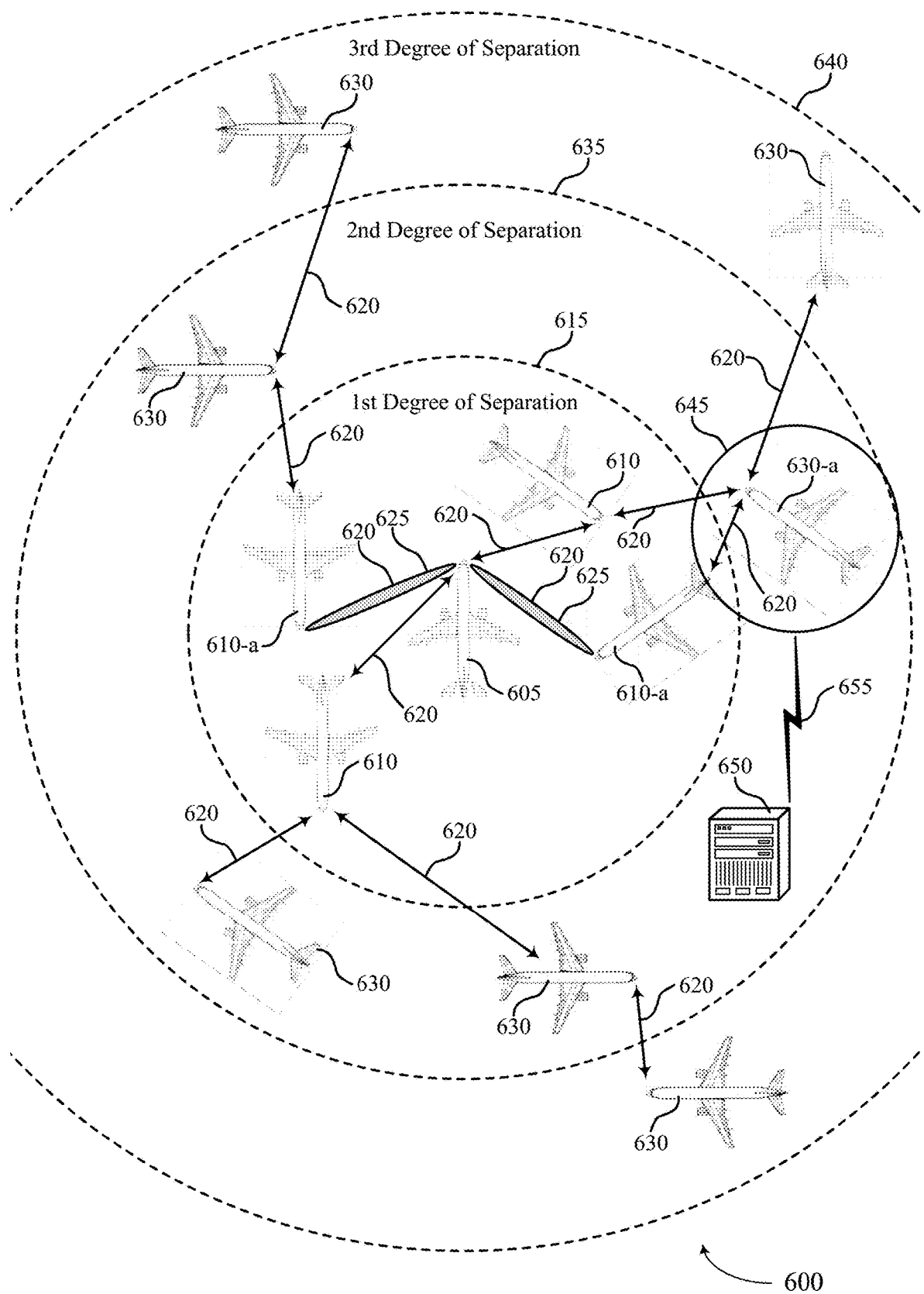
FIG. 6 illustrates an example of a network topology of a directional mesh network that supports directional beam mesh network for aircraft in accordance with aspects of the present disclosure.

FIG. 6 illustrates an example of a network topology 600 of a directional mesh network that supports directional beam mesh network for aircraft in accordance with various aspects of the present disclosure. In some examples, network topology 600 may implement aspects of the wireless communications systems 100 or 200.

The network topology 600 may illustrate characteristics of an aircraft-to-aircraft mesh network (e.g., mesh network 245) that has been established using a plurality of directional communication links. The network topology 600, in some examples, may use a transmitting aircraft 605 as a reference point from which to define other nodes, entities, device, and aircraft. For example, connected aircraft 610 are aircraft with a direct communication link with the transmitting aircraft 605 and other communicating aircraft 630 are aircraft with indirect communication paths (e.g., through multiple mesh network communication links) to the transmitting aircraft 605. The network topology 600 also shows degrees of separation 615, 635, 640 which may illustrate the number of directional communication links need for an aircraft to communicate with the transmitting aircraft 605. For example, in the first degree of separation 615 each connected aircraft 610 uses a single mesh network communication link (e.g., communication link 620) to communicate with the transmitting aircraft 605. In the Nth degree of separation (e.g., second 635, third 640, etc.) each other communicating aircraft 630 uses two or more mesh network communication links (e.g., communication links 620) to communicate with the transmitting aircraft 605. The degrees of separation 615, 635, 640 may, in some examples, relate to network dynamics and not physical locations. In other examples, the network topology 600 may be more or less complex than what is illustrated here.

The transmitting aircraft 605, the connected aircraft 610, and the other communicating aircraft 630 may be examples of the aircraft 205, 305, 405, 505, 510 described with reference to FIGS. 2-5. The communication links 620 may be examples of the communication links 125, 250, 310 described with reference to FIGS. 1-5.

The network topology 600 shows that the transmitting aircraft 605 may be communicating with a subset of the connected aircraft 610. For example, the transmitting aircraft 605 may be exchanging messages with a set of connected aircraft 610-*a*. As such, the transmitting aircraft 605 and the set of connected aircraft 610-*a* may be exchanging information (e.g., information 580) using one or more directional communication links 620 (e.g., transmission beams or reception beams). The transmitting aircraft 605 may select which of the connected aircraft 610 to communicate with. The transmitting aircraft 605 may be transmitting portions of its critical flight information to the set of connected aircraft 610-*a*, in some examples. The transmitting aircraft 605 may also be receiving portions of an aircraft's 610-*a* critical flight information to store in its memory or in its flight recorder.

The transmitting aircraft 605 may also communicate with some of the other communicating aircraft 630 using communication paths that include multiple communication links 620 and use aircraft 610, 630 as intermediate nodes. In some examples, the transmitting aircraft's 605 critical flight information may include instructions that a receiving aircraft (e.g., connected aircraft 610-a) is to retransmit the critical flight information to one or more of the other communicating aircraft 630. In this manner, the critical flight information may have additional redundancy by being stored on additional aircraft.

The network topology 600 may also indicate which aircraft may be acting as a gateway node 645. Some aircraft have robust communication links to outside networks (e.g., the Internet) sometime referred to as backhaul links. For example, one of the other communicating aircraft 630-a may have a high-bandwidth communication link to a terrestrial server 650 or some other server. The network topology 600 may indicate which aircraft are serving as gateway nodes 645 and which outside networks can be accessed by a particular gateway node 645.

A transmitting aircraft 605 may execute a routing information procedure to determine aircraft with direct and indirect communication links with the transmitting aircraft 605. In some examples, the transmitting aircraft 605 may maintain a table of aircraft known to the transmitting aircraft (both connected aircraft 610 and other communicating aircraft 630), the hops that are part of the communication path, and the intermediate nodes (other aircraft) that are part of the communication. In some cases, path messages are percolated through the aircraft-to-aircraft mesh network tracing their paths through the network. Any aircraft that receives the path messages may identify various communication paths that may be useful and may retransmit the path messages.

Using the routing information, a transmitting aircraft 605 may be capable of communicating with one of the other communicating aircraft 630, such as the gateway node aircraft 645. There are two independent communication paths through which the transmitting aircraft 605 can communicate with the gateway node aircraft 645. Both paths use a single connected aircraft 610 as an intermediate node. A message transmitted by a transmitting device may include information indicating that the connected aircraft 610 that receives the message is not the intended recipient and that the connected aircraft 610 is to retransmit the message to a node that is close (in terms of network topology) to the intended recipient. In some cases, the intermediate node may (e.g., for critical flight information) store the transmitted message before retransmitting the message. In some cases, an aircraft (e.g., aircraft 630-a) may retransmit a received message (e.g., critical flight information) to a terrestrial server (e.g., 650) to provide a further redundancy for the message.

Although the network topology shows the transmitting aircraft 605 as the center of the network, in other cases the transmitting aircraft 605 may serve as an intermediate node. The aircraft-to-aircraft mesh network may be configured to provide redundancies for critical flight information. This way, information that in typically stored on only the flight recorder of the transmitting aircraft 605 may be stored on memory devices of other aircraft 610, 630 and/or terrestrial servers 650.

Figure 7:
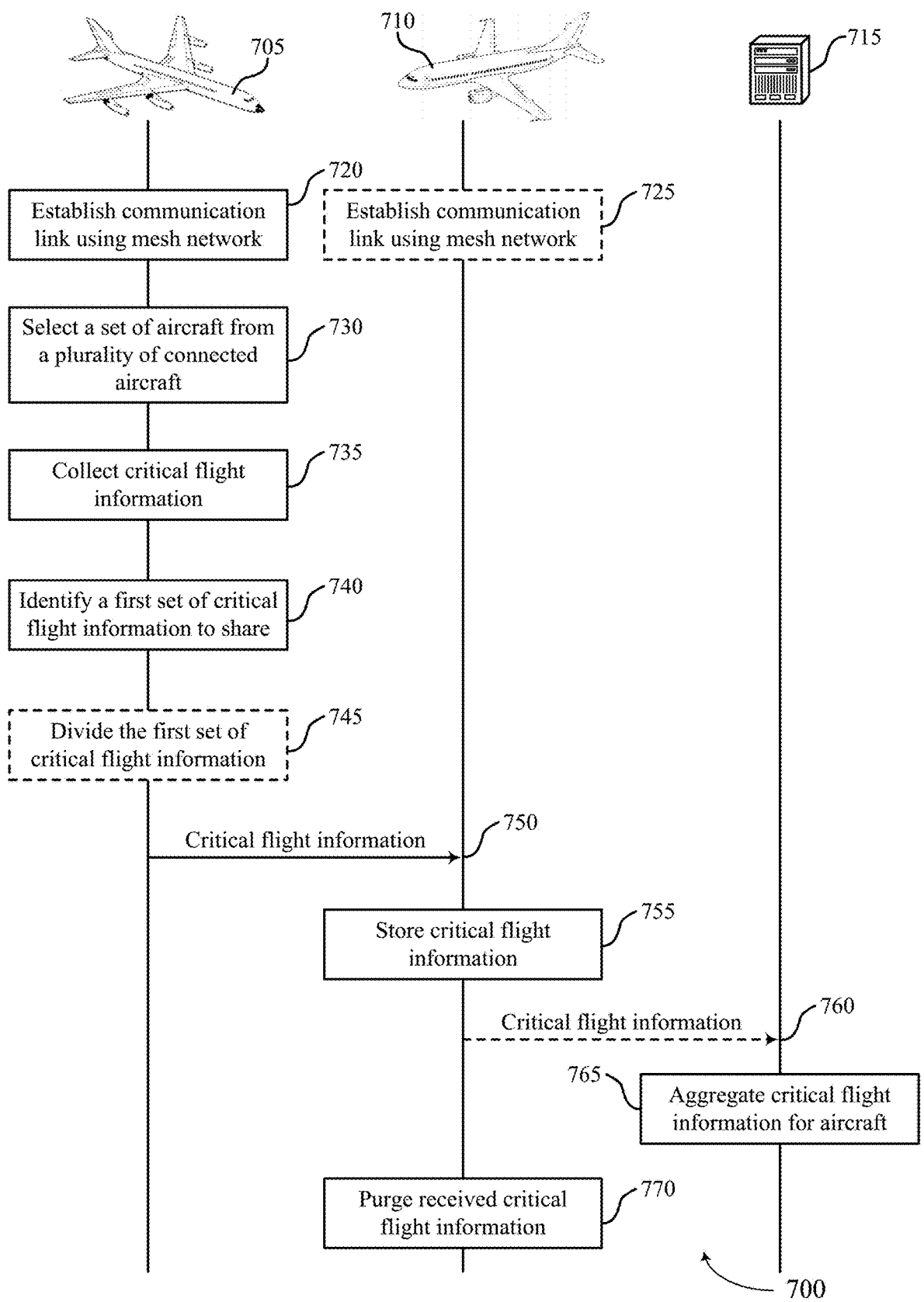
FIG. 7 illustrates an example of a communication scheme that supports directional beam mesh network for aircraft in accordance with aspects of the present disclosure.

FIG. 7 illustrates an example of a communication scheme 700 that supports directional beam mesh network for aircraft in accordance with various aspects of the present disclosure. In some examples, communication scheme 700 may implement aspects of the wireless communications systems 100 or 200.

The communication scheme 700 illustrates features and functions related to communicating critical flight information for a transmitting aircraft 705 across an aircraft-to-aircraft mesh network to one or more receiving aircraft 710 or a terrestrial server 715. The transmitting aircraft 705 and the receiving aircraft 710 may be examples of the aircraft 205, 305, 405, 505, 510, 605, 610, 630 described with reference to FIGS. 2-6. The terrestrial server 715 may be an example of the terrestrial servers 210, 410, 515, 650 described with reference to FIGS. 2 and 4-6.

Critical flight information may refer to any information that may indicate reasons for a problem with an aircraft. Critical flight information may include flight recorder data, voice recorder data, aircraft operation data, flight data, voice data, position data, heading data, air speed data, altitude data, ground speed data, voice recordings of pilots, voice recordings of people in the cockpit, voice recordings of other members of a flight crew, passengers on the transmitting aircraft 705, sound recordings of other operations (e.g., mechanical systems) of the transmitting aircraft 705, sound recordings of the cockpit, passenger compartment, or cargo compartment, information about how the transmitting aircraft 705 is functioning, sensor data about various functions of the transmitting aircraft 705, aircraft diagnostics data, fuel readings, other information, or a combination thereof.

At blocks 720 and 725, the transmitting aircraft 705 and the receiving aircraft 710 may establish a directional communication link of the aircraft-to-aircraft mesh network (e.g., mesh network 245). Establishing a communication link may include syncing the timing of the devices, exchanging device specific information and control information, periodically executing beam refinement procedures to avoid a radio link failure event due to the relative movement of the two aircraft, other functions associated with establishing a communication link, or a combination thereof. A unidirectional or bidirectional communication link may be established using a beam discovery procedure discussed herein.

At block 730, the transmitting aircraft 705 may select a set of aircraft from a plurality of connected aircraft to communicate with. As shown in FIG. 6, a transmitting aircraft 705 may communicate with less than all of the aircraft it is connected with via a directional communication link of an aircraft-to-aircraft mesh network. The transmitting aircraft 705 may analyze a number of factors before selecting an aircraft to receive its critical flight information.

The transmitting aircraft 705 may identify an available bandwidth of each of the established wireless communication links of the plurality of connected aircraft and select the receiving aircraft 710 based on the available bandwidth of each established wireless communication link. For example, the transmitting aircraft 705 may apply a relative criteria and may select a number of the aircraft with best bandwidth connection. In another example, the transmitting aircraft 705 may determine whether the available bandwidth satisfies a threshold and communicate critical flight information with all craft that satisfy the threshold.

The transmitting aircraft 705 may identify the available bandwidth of each of the plurality of connected aircraft with a terrestrial server 715 and select the receiving aircraft 710 based on the available bandwidth the receiving aircraft 710 has with the terrestrial server 715. The transmitting aircraft 705 may apply a relative criteria and may select a number of the aircraft with best bandwidth connection with the terrestrial server 715. In some examples, the transmitting aircraft 705 may determine whether the available bandwidth with the terrestrial server 715 satisfies a threshold and communicate critical flight information with all craft that satisfy the threshold.

The transmitting aircraft 705 may transmit a query to the set of connected aircraft inquiring whether each aircraft is capable of storing the critical flight information of the transmitting aircraft 705. The transmitting aircraft 705 may select the receiving aircraft 710 based on the responses received from the connected aircraft.

The transmitting aircraft 705 may select the receiving aircraft 710 based on a number of aircraft connected to each aircraft of the plurality of connected aircraft, the storage capacity of each aircraft of the plurality of connected aircraft, the destination of each aircraft of the plurality of connected aircraft, the flight path of each aircraft of the plurality of connected aircraft, the direction of travel relative to the first aircraft of each aircraft of the plurality of connected aircraft, the predicated contact time between the first aircraft and each aircraft of the plurality of connected aircraft, or a combination thereof.

At block 735, the transmitting aircraft 705 may collect critical flight information using one or more sensors. The critical flight information may be stored in the flight recorder. The critical flight information may, in some examples, be stored in a different memory that is more accessible than a flight recorder. In some cases, the critical flight information is stored in a flight recorder and/or in another memory. In some cases, the receiving aircraft 710 may be unavailable for an indefinite amount of time (e.g., the communication link is disrupted). During such times, the transmitting aircraft 705 may buffer the critical flight information and transmit the buffered data after the communication link to the receiving aircraft 710 has been restored. In some examples, the transmitting aircraft 705 may evaluate a quality parameter of the wireless communication link. If the quality parameter fails to satisfy a quality threshold, the transmitting aircraft 705 may suspend any transmission using the wireless communication link. Upon determining that the quality parameter for the wireless communication link satisfies the quality threshold, the transmitting aircraft 705 may initiate transmissions again, including transmitting the buffered data. The collection of critical flight information may be done before, during, after, continuously, or at discrete times relative to the network functions. In some cases, the transmitting aircraft 705 is always collecting critical flight information while in flight.

In some examples, the transmitting aircraft 705 may maintain a buffer of critical flight information going back a certain amount of time during the flight. The buffered critical flight information may be transmitted upon the transmitting aircraft 705 identifying a distress condition. This way, if the transmitting aircraft 705 crashes or experiences an incident one or more receiving aircraft 710 may have stored the critical flight information leading up to the occurrence of the incident.

At block 740, the transmitting aircraft 705 may identify a first set of critical flight information to transmit to one or more receiving aircraft 710. If all of the critical flight information collected by the transmitting aircraft 705 were transmitted, it may overwhelm a capacity for data transfer of any wireless communication system asked to carry it. The transmitting aircraft 705 may be configured to transmit different levels or different sets of critical flight information to the receiving aircraft 710 based on the situation. For example, the transmitting aircraft 705 may transmit a first level of critical flight information if the flight is normal or a second level of critical flight information if the flight goes through a storm, where the second level may include more information than the first level. The different levels or different amounts of critical information transmitted may be based on the situation. Such situations may be based on weather (fair or stormy), aircraft operations (normal, warnings about potential conditions, alarms about existing conditions), fuel levels, distress conditions, manual actuations of a state of emergency, other factors, or a combination thereof. It should be appreciated that any level of the amount of critical flight information may be used during any combination of situational factors.

The transmitting aircraft 705 may identify the first set of critical flight information based on the situational factors. When the situation is 'normal' (e.g., when there are no indications of flight concerns, environmental concerns, aircraft operation concerns, etc.), the first set of critical flight information may include relatively little information. When the situation is 'critical' (e.g., when there are indications of concerns), the first set of critical flight information may include more information. In some examples, a level of least concern may indicate that no critical flight information is to be transmitted (e.g., the first set includes zero information). In some examples, a level of extreme concern may indicate that all of the critical information is to be transmitted (e.g., the first set includes all of the critical flight information).

In some examples, the different levels of critical flight information sharing may also indicate the number of times a receiving aircraft 710 should retransmit the critical flight information. In this way, the critical flight information is stored on more aircraft and aircraft that are farther away (in a network topology, for example three degrees of separate instead of two degrees of separation).

At block 745, the transmitting aircraft 705 may divide the first set of critical flight information into portions to be transmitted to multiple receiving aircraft 710. In some cases, the transmitting aircraft 705 may communicate critical flight information with multiple receiving aircraft 710. In such cases, the transmitting aircraft 705 may transmit a first portion of the first set of critical flight information to a first receiving aircraft and a second portion to a second receiving aircraft. The information may be divided into any number of portions and may be transmitted to any number of receiving aircraft. The portions may be mutually exclusive or the portions may have information that overlaps with other portions. The first set of critical flight information may be divided using any methods available.

The transmitting aircraft 705 may transmit the first set of critical flight information to one or more receiving aircraft 710. In some examples, the transmitting aircraft 705 may transmit the first set of critical flight information to a terrestrial server 715.

At block 755, the receiving aircraft 710 may store the critical flight information in its flight recorder and/or in a separate memory device (e.g., in a local storage space) of the receiving aircraft. In some cases, the receiving aircraft 710 may also retransmit the critical flight information 760 to the terrestrial server 715 or other receiving aircraft.

In some cases, the receiving aircraft 710 may transmit the critical flight information to the terrestrial server 715 after landing at an airport. Upon arriving at an airport, the receiving aircraft 710 may transfer all of its data about other aircraft (e.g., the transmitting aircraft 705) to the terrestrial server 715.

At block 765, the terrestrial server 715 may aggregate the critical flight information for each aircraft from a number of different sources. The critical flight information may be tagged with information about the originating aircraft. The terrestrial server 715 may use that tag information to compile the disparate information into a single record.

At block 770, the receiving aircraft 710 may purge the critical flight information about the transmitting aircraft 705 from its memory devices. The receiving aircraft 710 may purge the data based on an message from the terrestrial server 715 that the data was successfully received.

In some cases, the receiving aircraft 710 may query whether there are any incidents with the flight of the transmitting aircraft 705. If there were no incidents, the receiving aircraft 710 may purge the critical flight information without transmitting it to any servers. In some cases the critical information may be purged after a certain amount of time has elapsed.

Figure 8:
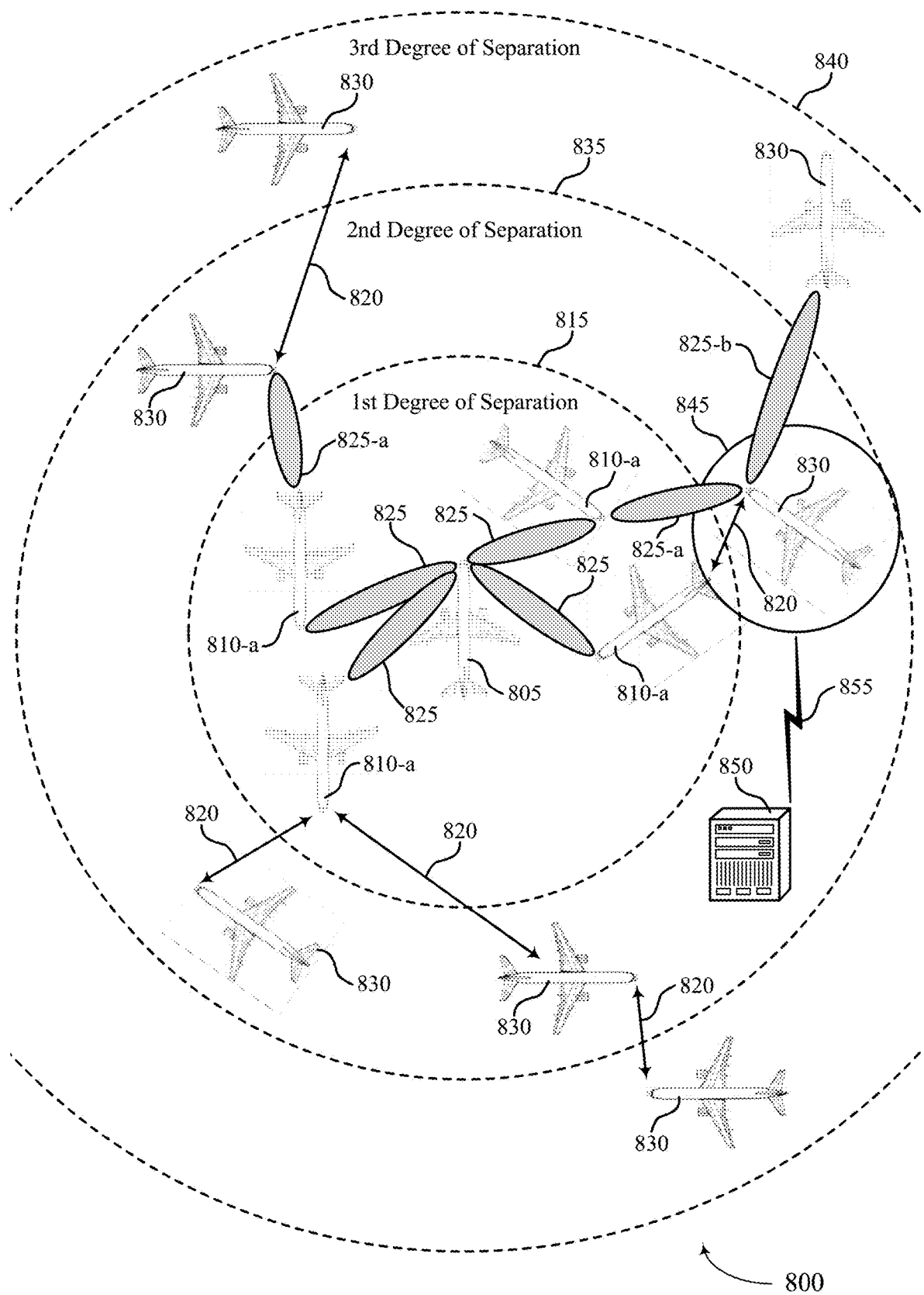
FIG. 8 illustrates an example of a network topology that supports directional beam mesh network for aircraft in accordance with aspects of the present disclosure.

FIG. 8 illustrates an example of a network topology 800 of a directional mesh network that supports directional beam mesh network for aircraft in accordance with various aspects of the present disclosure. In some examples, network topology 800 may implement aspects of the wireless communications systems 100 or 200.

The network topology 800 illustrates what may occur when the level of critical flight information is greater than a level of least concern. For example, the network topology 800 may illustrate what occurs when the transmitting aircraft 805 detects a distress condition. The network topology 800 may be an example of the network topology 600 described with reference to FIG. 6. As such, descriptions of many of the features of the network topology 800 are not repeated here. Differences between the sharing of critical flight information may recognized by comparing the network topology 800 to the network topology 600.

The transmitting aircraft 805 may detect a distress condition. The distress condition may be based on weather (fair or stormy), aircraft operations (normal, warnings about potential conditions, alarms about existing conditions), fuel levels, distress conditions, manual actuations of a state of emergency, other factors, or a combination thereof. When the distress condition is detected, the transmitting aircraft 805 may increase the amount of critical flight information being transmitted, increase the number of receiving aircraft, attempt to increase the number of connected aircraft, increase the number of retransmissions of the shared critical information, or a combination thereof. By sharing additional critical flight information, the transmitting aircraft 805 is making additional redundant copies of the information in case an incident does occur.

Upon detecting the distress condition, the transmitting aircraft 805 may transmit an indication of the distress condition to one or more aircraft using a directional transmission 825 of a communication link 820 of the aircraft-to-aircraft mesh network. The indication may be an example of a distress message or distress signal. The indication may be embedded in a transmission of other information (e.g., the transmission of critical flight information).

Upon detecting the distress condition, the transmitting aircraft 805 may identify a second set of critical information that includes more information than the first set of critical flight information. The set of critical flight information selected to be transmitted may be based on a predicted likelihood of an incident occurring. When an aircraft incident or a failure is not likely, less information may be shared. When an aircraft incident or a failure is more likely, more information may be shared.

Upon detecting the distress condition, the transmitting aircraft 805 may also transmit some buffered data. The transmission of the buffered data may provide more context as to how the distress condition occurred.

In some cases, upon detecting the distress condition, the transmitting aircraft 805 may attempt to increase the number of direct communication links between it and other aircraft 830. Thereby changing other communicating aircraft 830 into connected aircraft 810. In some cases, upon detecting the distress condition, the transmitting aircraft 805 may attempt to select additional aircraft as receiving aircraft. In some cases, upon detecting the distress condition, the transmitting aircraft 805 may attempt to communicate with the terrestrial server 850 using a communication link 855 or a gateway node 845. In some cases, upon detecting the distress condition, the transmitting aircraft 805 may attempt to discover additional communication paths to additional other aircraft 830 not currently known to the transmitting aircraft 805. In some cases, upon detecting the distress condition, the transmitting aircraft 805 may indicate an Nth degree of separation 815, 835, 840 that should receive the critical flight information. In some cases, upon detecting the distress condition, the transmitting aircraft 805 may include instructions in the second set of critical flight information for a receiving aircraft 810-*a* to retransmit the second set of critical flight information. In some cases, the instructions include a maximum number of hops for the second set to be retransmitted.

Figure 9:
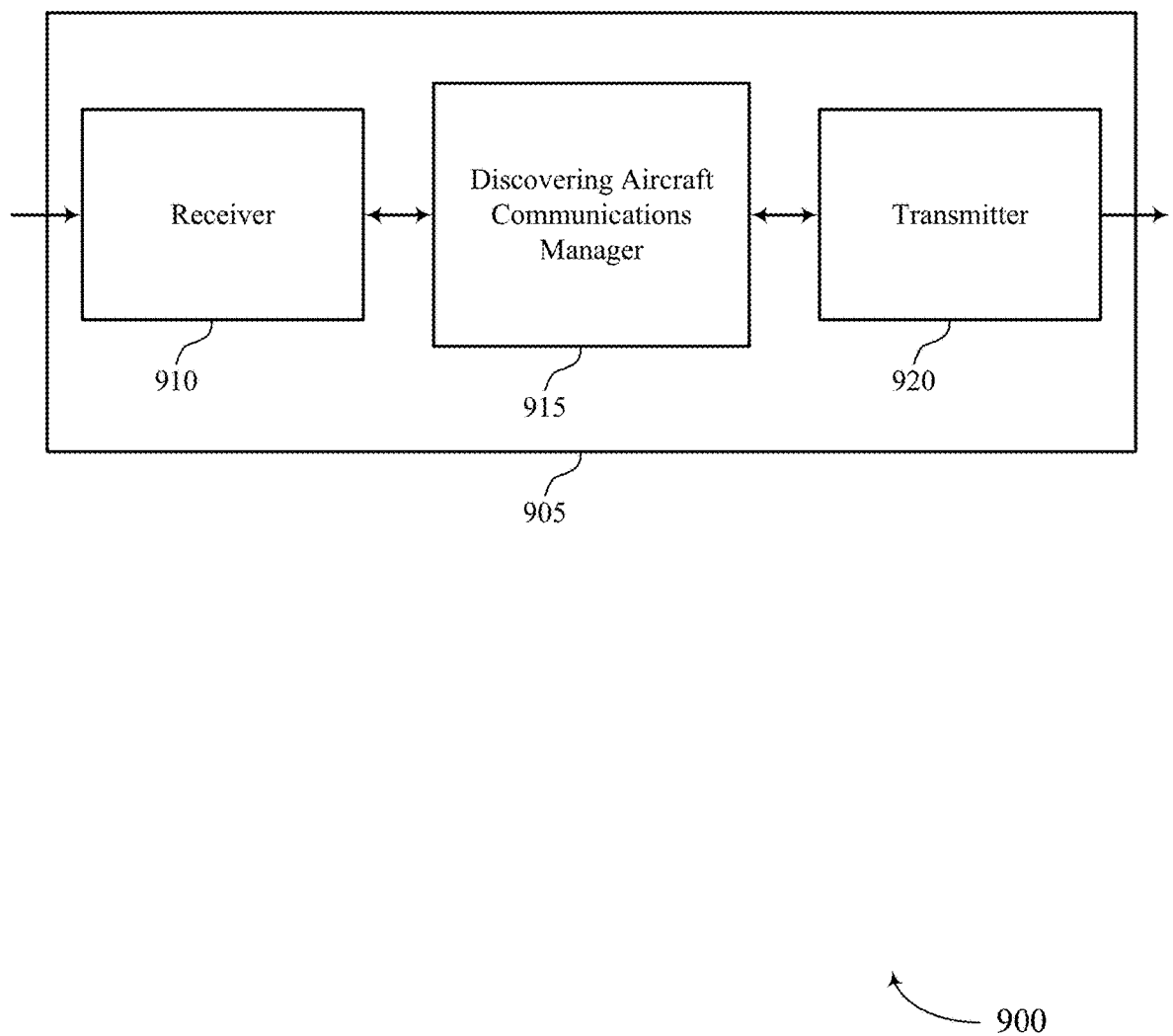
FIGS. 9 through 11 show block diagrams of a wireless device that supports directional beam mesh network for aircraft in accordance with aspects of the present disclosure.

FIG. 9 shows a block diagram 900 of a wireless device 905 that supports directional beam mesh network for aircraft in accordance with aspects of the present disclosure. Wireless device 905 may be an example of aspects of a UE 115 as described herein. Wireless device 905 may be an example of aspects of a discovering aircraft 405, 505 as described herein. In some cases, the wireless device 905 may be integrated with an aircraft 205. Wireless device 905 may include receiver 910, discovering aircraft communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to directional beam mesh network for aircraft, etc.). Information may be passed on to other components of the device. The receiver 910 may be an example of aspects of the transceiver 1235 described with reference to FIG. 12. The receiver 910 may utilize a single antenna or a set of antennas.

Discovering aircraft communications manager 915 may be an example of aspects of the discovering aircraft communications manager 1215 described with reference to FIG. 12. Discovering aircraft communications manager 915 and/or at least some of its various sub-components may be implemented in hardware, software executed by a processor, firmware, or any combination thereof. If implemented in software executed by a processor, the functions of the discovering aircraft communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The discovering aircraft communications manager 915 and/or at least some of its various sub-components may be physically located at various positions, including being distributed such that portions of functions are implemented at different physical locations by one or more physical devices. In some examples, discovering aircraft communications manager 915 and/or at least some of its various sub-components may be a separate and distinct component in accordance with various aspects of the present disclosure. In other examples, discovering aircraft communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Discovering aircraft communications manager 915 may be part of a first aircraft using a first communication link of a first wireless network. Discovering aircraft communications manager 915 may receive flight data for a second aircraft, determine a discovery pattern having at least one beam direction to be used for discovery of the second aircraft based on the flight data, and establish a second communication link of a second wireless network directly between the first aircraft and the second aircraft based on the at least one transmitted directional transmission beam.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas. Transmitter 920 may transmit at least one directional transmission beam in at least one beam direction of the discovery pattern.

Figure 10:
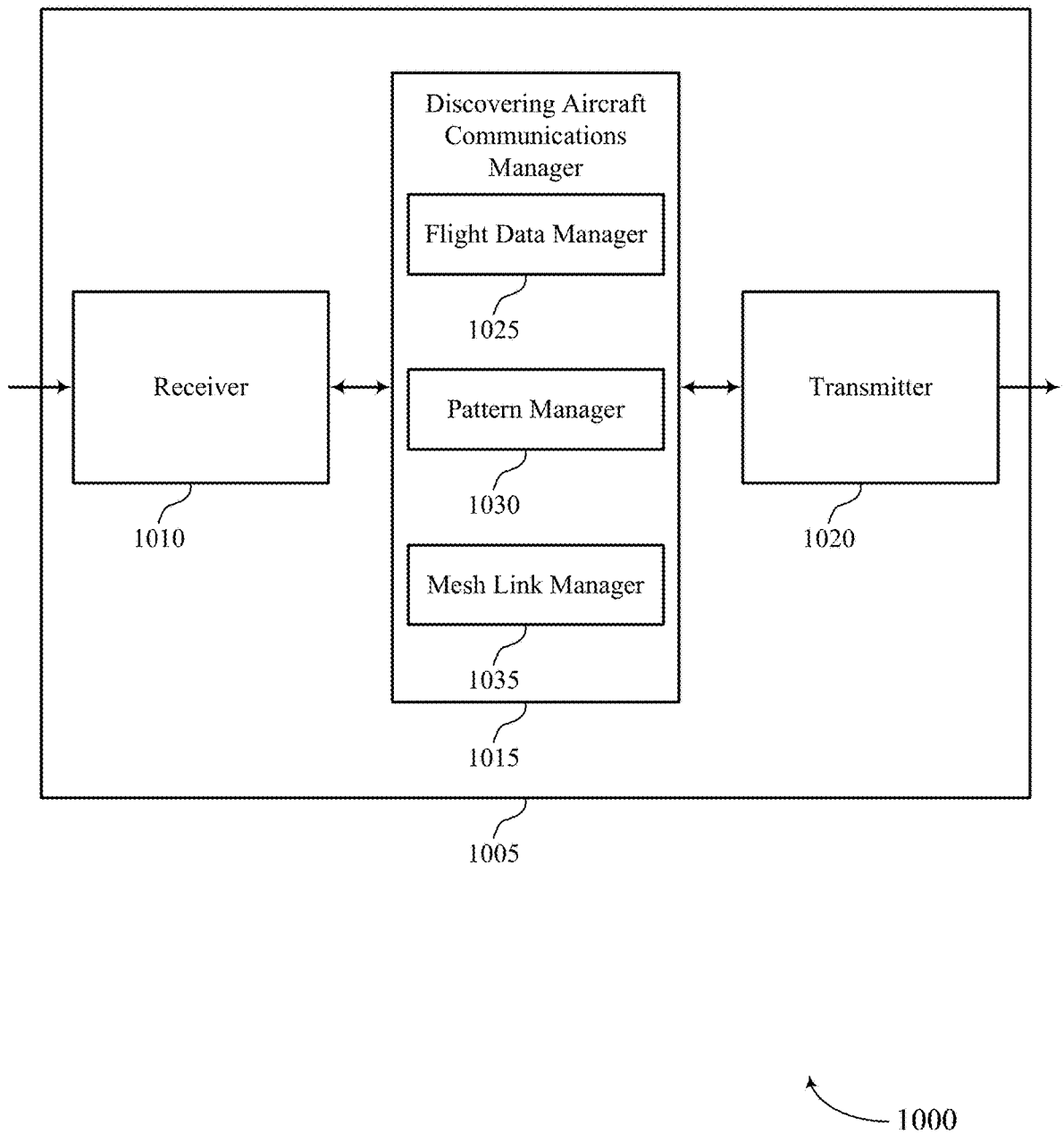

FIG. 10 shows a block diagram 1000 of a wireless device 1005 that supports directional beam mesh network for aircraft in accordance with aspects of the present disclosure. Wireless device 1005 may be an example of aspects of a wireless device 905, a discovering aircraft 405, 505, an aircraft 205, or a UE 115 as described with reference to FIG. 9. Wireless device 1005 may include receiver 1010, discovering aircraft communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to directional beam mesh network for aircraft, etc.). Information may be passed on to other components of the device. The receiver 1010 may be an example of aspects of the transceiver 1235 described with reference to FIG. 12. The receiver 1010 may utilize a single antenna or a set of antennas.

Discovering aircraft communications manager 1015 may be an example of aspects of the discovering aircraft communications manager 1215 described with reference to FIG. 12. Discovering aircraft communications manager 1015 may also include flight data manager 1025, pattern manager 1030, and mesh link manager 1035. Discovering aircraft communications manager 1015 may be part of or included in a first aircraft using a first communication link of a first wireless network. The first communication link of the first aircraft may be a satellite-aircraft communication link with a satellite. Or the first communication link of the first aircraft may be a ground-aircraft communication link with a ground unit.

Flight data manager 1025 may receive flight data for a second aircraft. In some cases, the flight data includes position information and vector information for the second aircraft. In such cases, determining the discovery pattern is based on the position information and the vector information. In some cases, the flight data includes future flight path information for the second aircraft. In such cases, determining the discovery pattern is based on the future flight path information.

Pattern manager 1030 may determine a discovery pattern having at least one beam direction to be used for discovery of the second aircraft based on the flight data. Pattern manager 1030 may determine the listening pattern based on the flight data for the second aircraft. Receiving the directional transmission beam from the second aircraft may be based on the listening pattern.

Mesh link manager 1035 may establish a second communication link of a second wireless network directly between the first aircraft and the second aircraft based on the at least one transmitted directional transmission beam. Mesh link manager 1035 may identify a set of communication resources of the second wireless network to use during a discovery procedure. A first set of the communication resources may be used to transmit directional transmission beams and a second set of the communication resources may be used to listen for transmission beams. Transmitting the at least one directional transmission beam may be done during the first set of the communication resources. In some cases, mesh link manager 1035 may receive an indication of the set of communication resources from a terrestrial server using the first communication link. In such cases, identifying the set of communication resources may be based on receiving the indication. In some cases, the second wireless network is a wireless mesh network. In some cases, a first radio frequency spectrum band used in the first wireless network is different from a second radio frequency spectrum band used in the second wireless network.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
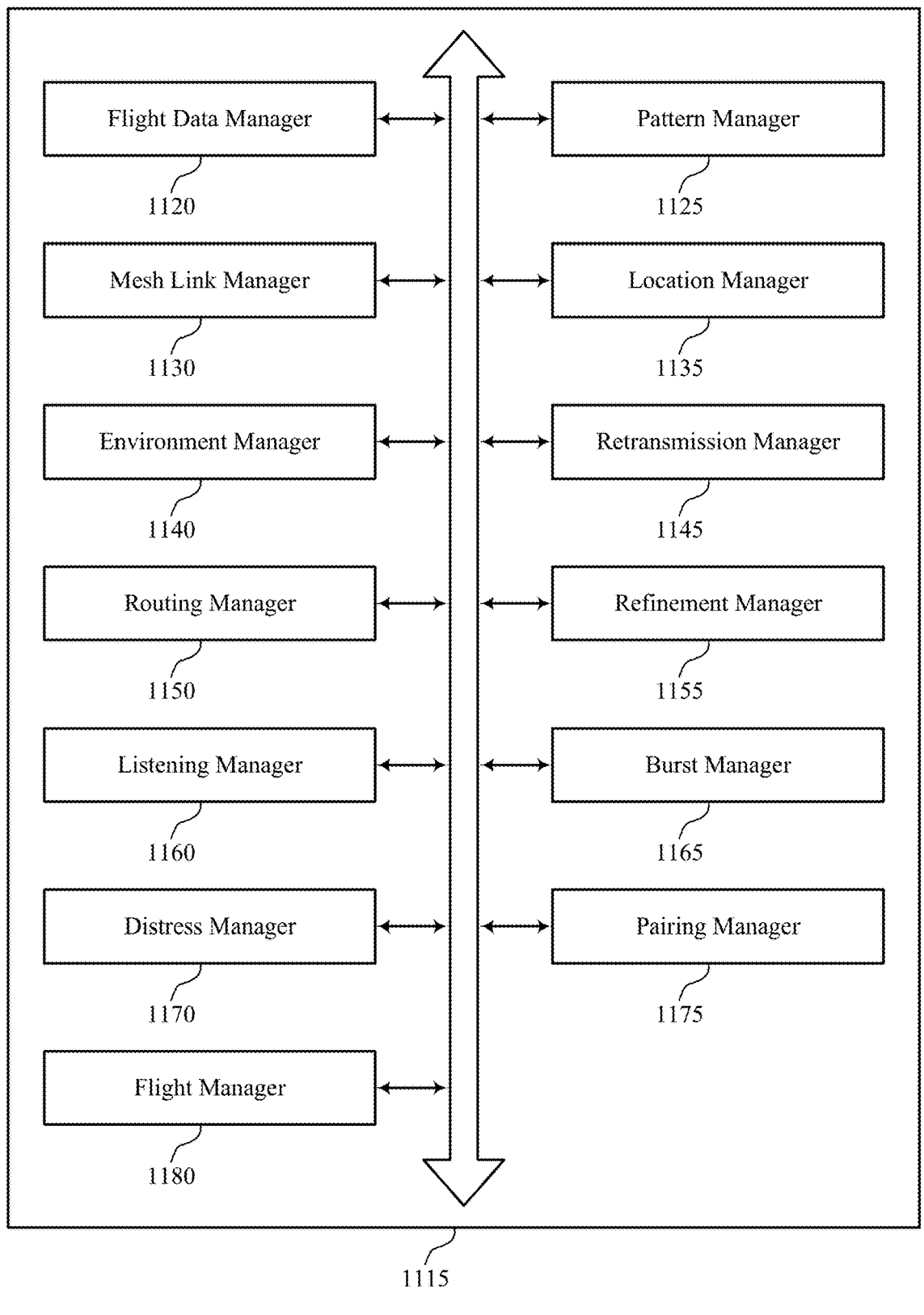

FIG. 11 shows a block diagram 1100 of a discovering aircraft communications manager 1115 that supports directional beam mesh network for aircraft in accordance with aspects of the present disclosure. The discovering aircraft communications manager 1115 may be an example of aspects of a discovering aircraft communications manager 915, a discovering aircraft communications manager 1015, or a discovering aircraft communications manager 1215 described with reference to FIGS. 9, 10, and 12. The discovering aircraft communications manager 1115 may include flight data manager 1120, pattern manager 1125, mesh link manager 1130, location manager 1135, environment manager 1140, retransmission manager 1145, routing manager 1150, refinement manager 1155, listening manager 1160, burst manager 1165, distress manager 1170, pairing manager 1175, and flight manager 1180. Each of these modules may communicate, directly or indirectly, with one another (e.g., via one or more buses).

Flight data manager 1120 may receive (e.g., at a first aircraft using a first communication link of a first wireless network) flight data for a second aircraft. In some cases, the first communication link of the first aircraft is a ground-aircraft communication link with a ground unit. Or the first communication link of the first aircraft may be a satellite-aircraft communication link with a satellite. In some cases, the flight data includes position information and vector information for the second aircraft. In such cases, determining the discovery pattern may be based on the position information and the vector information. In some cases, the flight data includes future flight path information for the second aircraft. In such cases, determining the discovery pattern may be based on the future flight path information.

Pattern manager 1125 may determine a discovery pattern having at least one beam direction to be used for discovery of the second aircraft based on the flight data. Pattern manager 1125 may determine the listening pattern based on the flight data for the second aircraft. Receiving the directional transmission beam from the second aircraft may be based on the listening pattern.

Mesh link manager 1130 may establish a second communication link of a second wireless network directly between the first aircraft and the second aircraft based on the at least one transmitted directional transmission beam. In some cases, the second wireless network is a wireless mesh network. Mesh link manager 1130 may identify a set of communication resources of the second wireless network to use during a discovery procedure. A first set of the communication resources may be used to transmit directional transmission beams and a second set of the communication resources may be used to listen for transmission beams. In some cases, transmitting the at least one directional transmission beam is done during the first set of the communication resources. In some cases, mesh link manager 1130 may receive an indication of the set of communication resources from a terrestrial server using the first communication link. In such cases, identifying the set of communication resources is based on receiving the indication. In some cases, a first radio frequency spectrum band used in the first wireless network is different from a second radio frequency spectrum band used in the second wireless network.

Location manager 1135 may determine a set of predicted locations for the second aircraft based on the flight data of the second aircraft. Determining the discovery pattern may be based at least in part determining the set of predicted locations. Location manager 1135 may determine a current position and a current vector for the first aircraft. Determining the discovery pattern may be based on the current position and the current vector of the first aircraft.

Environment manager 1140 may receive environmental condition information associated with the second aircraft. Determining the discovery pattern may be based on the environmental condition information.

Retransmission manager 1145 may receive data from a third aircraft using a third communication link, the third communication link being part of a wireless mesh network. Retransmission manager 1145 may identify the second aircraft as an intended recipient of the data. Retransmission manager 1145 may transmit the data to the second aircraft using the second communication link based on identifying the second aircraft as the intended recipient of the data.

Routing manager 1150 may transmit a message to the second aircraft indicating that the first aircraft is a node in a communication path of the second wireless network. Routing manager 1150 may receive routing information from a terrestrial server using the first communication link of the first wireless network. The routing information may indicate one or more communication paths using the second wireless network between the first aircraft and other aircraft that are outside of a coverage area of the first aircraft. Routing manager 1150 may transmit data to one of the other aircraft based on the routing information.

Refinement manager 1155 may receive updated flight data for the second aircraft from the second aircraft using the second communication link and initiate a beam refinement procedure based on the updated flight data received from the second aircraft.

Listening manager 1160 may receive a directional transmission beam transmitted by the second aircraft using at least one directional reception beam pointed in at least one beam direction of a listening pattern having at least one beam direction. Establishing the second communication link directly between the first aircraft and the second aircraft may be based on receiving the directional transmission beam from the second aircraft.

Burst manager 1165 may transmit a burst of directional transmission beams towards the second aircraft as part of a discovery procedure, at least one directional transmission beam of the burst of directional transmission beams being associated with one beam direction of a set of beam directions in the discovery pattern and transmit bursts of directional transmission beams as part of the discovery procedure. Establishing the second communication link directly may be based on the bursts of directional transmission beams.

Distress manager 1170 may receive a distress signal from the second aircraft using the second communication link and prioritize a receipt of critical flight information from the second aircraft above communications with other aircraft through the second wireless network based on receiving the distress signal.

Pairing manager 1175 may receive flight data for a set of aircrafts using the first communication link and select a subset of the set of aircrafts to attempt to communicate with using the second communication link based on a proximity of the first aircraft to each of the set of aircrafts.

Flight manager 1180 may transmit a current position and a current vector for the first aircraft to a terrestrial server using the first communication link.

Figure 12:
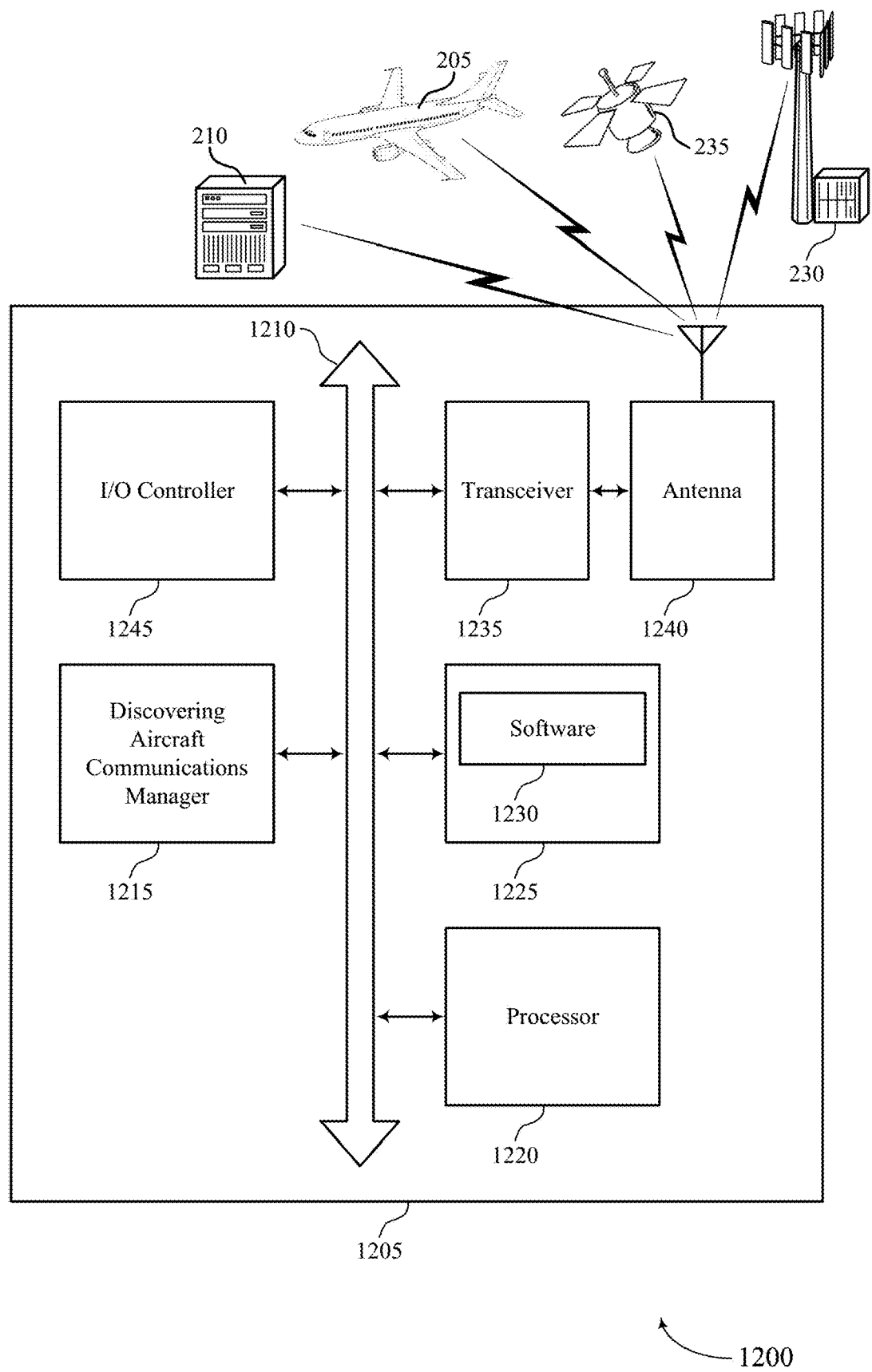
FIG. 12 illustrates a block diagram of a system including a device that supports directional beam mesh network for aircraft in accordance with aspects of the present disclosure.

FIG. 12 shows a diagram of a system 1200 including a device 1205 that supports directional beam mesh network for aircraft in accordance with aspects of the present disclosure. Device 1205 may be an example of or include the components of wireless device 905, wireless device 1005, a discovering aircraft 405, 505, or a UE 115 as described above. Device 1205 may include components for bi-directional voice and data communications including components for transmitting and receiving communications, including discovering aircraft communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more aircraft 205, one or more terrestrial servers 210, one or more base stations 230, and/or one or more satellites 235.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting directional beam mesh network for aircraft).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support directional beam mesh network for aircraft. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
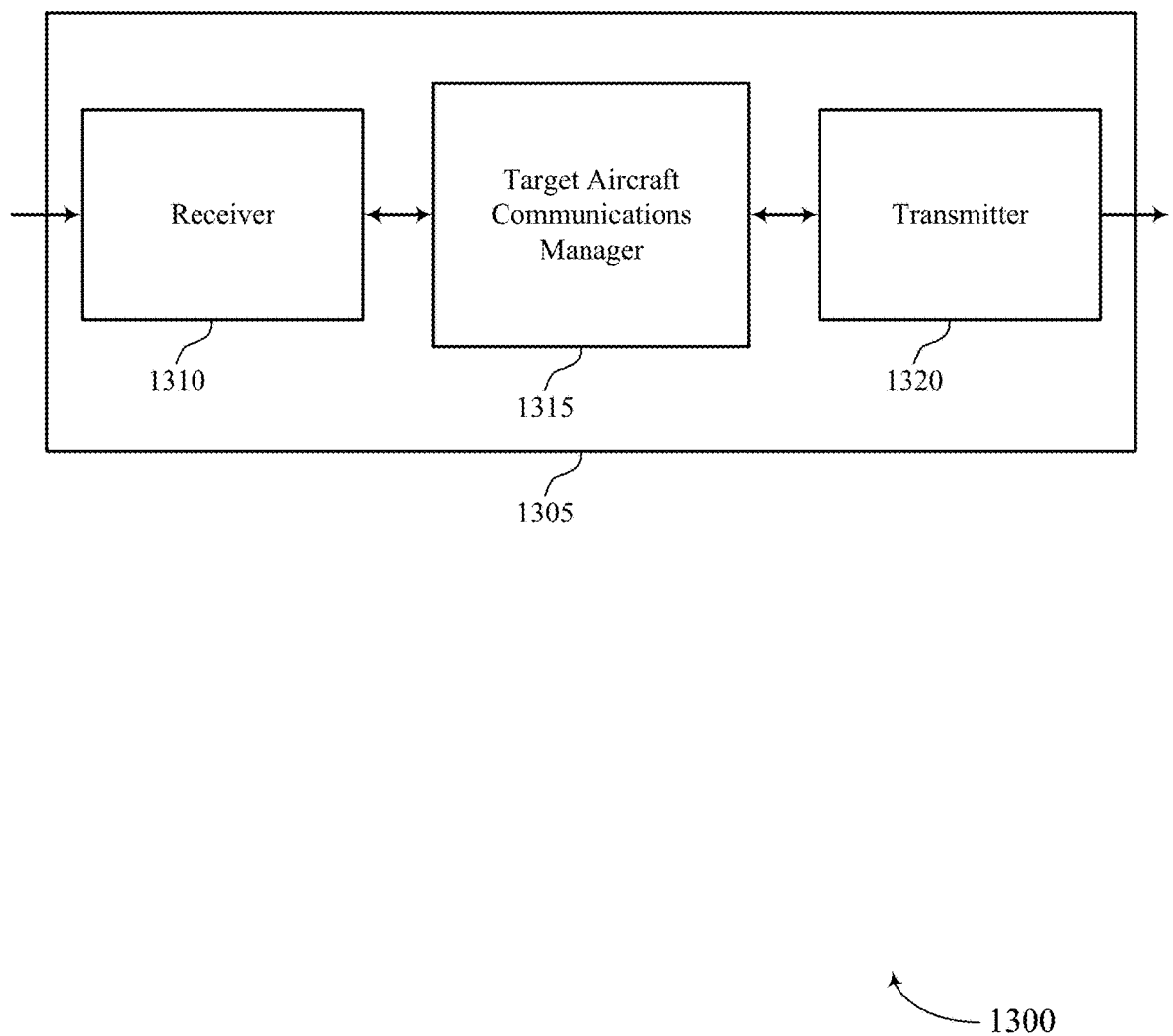
FIGS. 13 through 15 show block diagrams of a wireless device that supports directional beam mesh network for aircraft in accordance with aspects of the present disclosure.

FIG. 13 shows a block diagram 1300 of a wireless device 1305 that supports directional beam mesh network for aircraft in accordance with aspects of the present disclosure. Wireless device 1305 may be an example of aspects of a UE 115 as described herein. Wireless device 1305 may be an example of aspects of a target aircraft 405, 510 as described herein. In some cases, the wireless device 1305 may be integrated with an aircraft 205. Wireless device 1305 may include receiver 1310, target aircraft communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to directional beam mesh network for aircraft, etc.). Information may be passed on to other components of the device. The receiver 1310 may be an example of aspects of the transceiver 1635 described with reference to FIG. 16. The receiver 1310 may utilize a single antenna or a set of antennas.

In some cases, receiver 1310 may receive a directional transmission beam transmitted by the second aircraft using at least one directional reception beam pointed in at least one beam direction of the listening pattern.

Target aircraft communications manager 1315 may be an example of aspects of the target aircraft communications manager 1615 described with reference to FIG. 16. Target aircraft communications manager 1315 and/or at least some of its various sub-components may be implemented in hardware, software executed by a processor, firmware, or any combination thereof. If implemented in software executed by a processor, the functions of the target aircraft communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The target aircraft communications manager 1315 and/or at least some of its various sub-components may be physically located at various positions, including being distributed such that portions of functions are implemented at different physical locations by one or more physical devices. In some examples, target aircraft communications manager 1315 and/or at least some of its various sub-components may be a separate and distinct component in accordance with various aspects of the present disclosure. In other examples, target aircraft communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Target aircraft communications manager 1315 may receive, at a first aircraft using a first communication link of a first wireless network, flight data for a second aircraft. Target aircraft communications manager 1315 may determine a listening pattern having at least one beam direction based on the flight data for the second aircraft. Target aircraft communications manager 1315 may establish a second communication link of a second wireless network directly between the first aircraft and the second aircraft based on receiving the directional transmission beam from the second aircraft.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas. Transmitter 1320 may transmit a current position and a current vector for the first aircraft to a terrestrial server using the first communication link.

Figure 14:
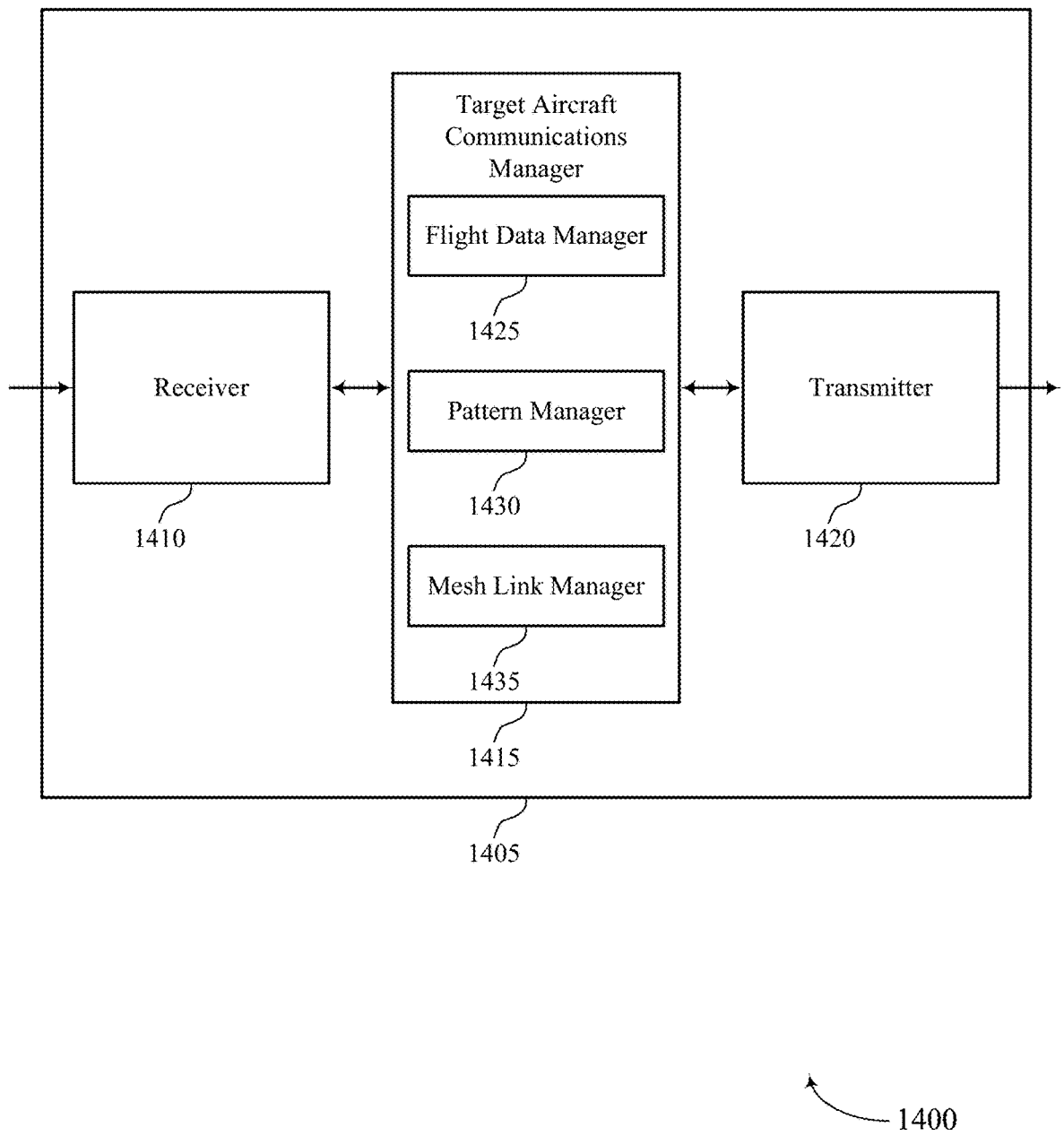

FIG. 14 shows a block diagram 1400 of a wireless device 1405 that supports directional beam mesh network for aircraft in accordance with aspects of the present disclosure. Wireless device 1405 may be an example of aspects of a wireless device 1305, a target aircraft 405, 510, an aircraft 205, or a UE 115 as described herein. Wireless device 1405 may include receiver 1410, target aircraft communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to directional beam mesh network for aircraft, etc.). Information may be passed on to other components of the device. The receiver 1410 may be an example of aspects of the transceiver 1635 described with reference to FIG. 16. The receiver 1410 may utilize a single antenna or a set of antennas.

Target aircraft communications manager 1415 may be an example of aspects of the target aircraft communications manager 1615 described with reference to FIG. 16. Target aircraft communications manager 1415 may also include flight data manager 1425, pattern manager 1430, and mesh link manager 1435.

Flight data manager 1425 may receive, at a first aircraft using a first communication link of a first wireless network, flight data for a second aircraft. In some cases, the first communication link of the first aircraft is a ground-aircraft communication link with a ground unit. In some cases, the first communication link of the first aircraft is a satellite-aircraft communication link with a satellite. In some cases, the flight data includes position information and vector information for the second aircraft. In such cases, determining the listening pattern may be based on the position information and the vector information. In some cases, the flight data includes future flight path information for the second aircraft. In such cases, determining the listening pattern is based on the future flight path information.

Pattern manager 1430 may determine a listening pattern having at least one beam direction based on the flight data for the second aircraft.

Mesh link manager 1435 may establish a second communication link of a second wireless network directly between the first aircraft and the second aircraft based on receiving the directional transmission beam from the second aircraft. In some cases, the second wireless network is a wireless mesh network. In some cases, a first radio frequency spectrum band used in the first wireless network is different from a second radio frequency spectrum band used in the second wireless network.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
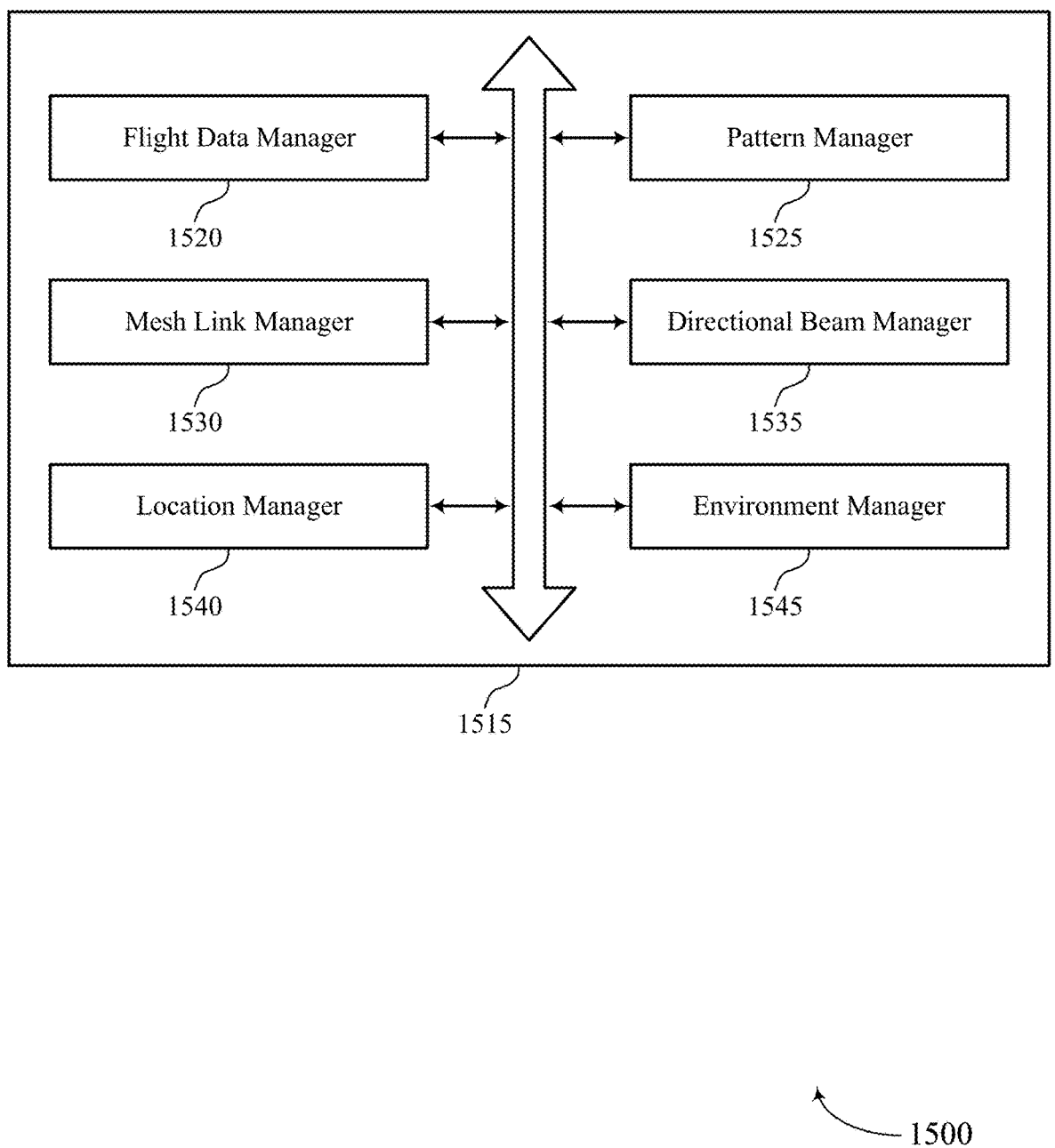

FIG. 15 shows a block diagram 1500 of a target aircraft communications manager 1515 that supports directional beam mesh network for aircraft in accordance with aspects of the present disclosure. The target aircraft communications manager 1515 may be an example of aspects of a target aircraft communications manager 1615 described with reference to FIGS. 13, 14, and 16. The target aircraft communications manager 1515 may include flight data manager 1520, pattern manager 1525, mesh link manager 1530, directional beam manager 1535, location manager 1540, and environment manager 1545. Each of these modules may communicate, directly or indirectly, with one another (e.g., via one or more buses).

Flight data manager 1520 may receive, at a first aircraft using a first communication link of a first wireless network, flight data for a second aircraft or the first communication link of the first aircraft is a satellite-aircraft communication link with a satellite. In some cases, the flight data includes position information and vector information for the second aircraft. In such cases, determining the listening pattern may be based on the position information and the vector information. In some cases, the flight data includes future flight path information for the second aircraft. In such cases, determining the listening pattern may be based on the future flight path information. In some cases, the first communication link of the first aircraft is a ground-aircraft communication link with a ground unit.

Pattern manager 1525 may determine a listening pattern having at least one beam direction based on the flight data for the second aircraft. Determining the listening pattern may be based at least in part determining the set of predicted locations. Determining the listening pattern may be based on the current position and the current vector of the first aircraft. Determining the listening pattern may be based on the environmental condition information.

Mesh link manager 1530 may establish a second communication link of a second wireless network directly between the first aircraft and the second aircraft based on receiving the directional transmission beam from the second aircraft. In some cases, the second wireless network is a wireless mesh network. In some cases, a first radio frequency spectrum band used in the first wireless network is different from a second radio frequency spectrum band used in the second wireless network.

Directional beam manager 1535 may determine a beam characteristic of the at least one directional reception beam based on the listening pattern.

Location manager 1540 may determine a set of predicted locations for the second aircraft based on the flight data of the second aircraft. Location manager 1540 may determine a current position and a current vector for the first aircraft.

Environment manager 1545 may receive environmental condition information associated with the second aircraft.

Figure 16:
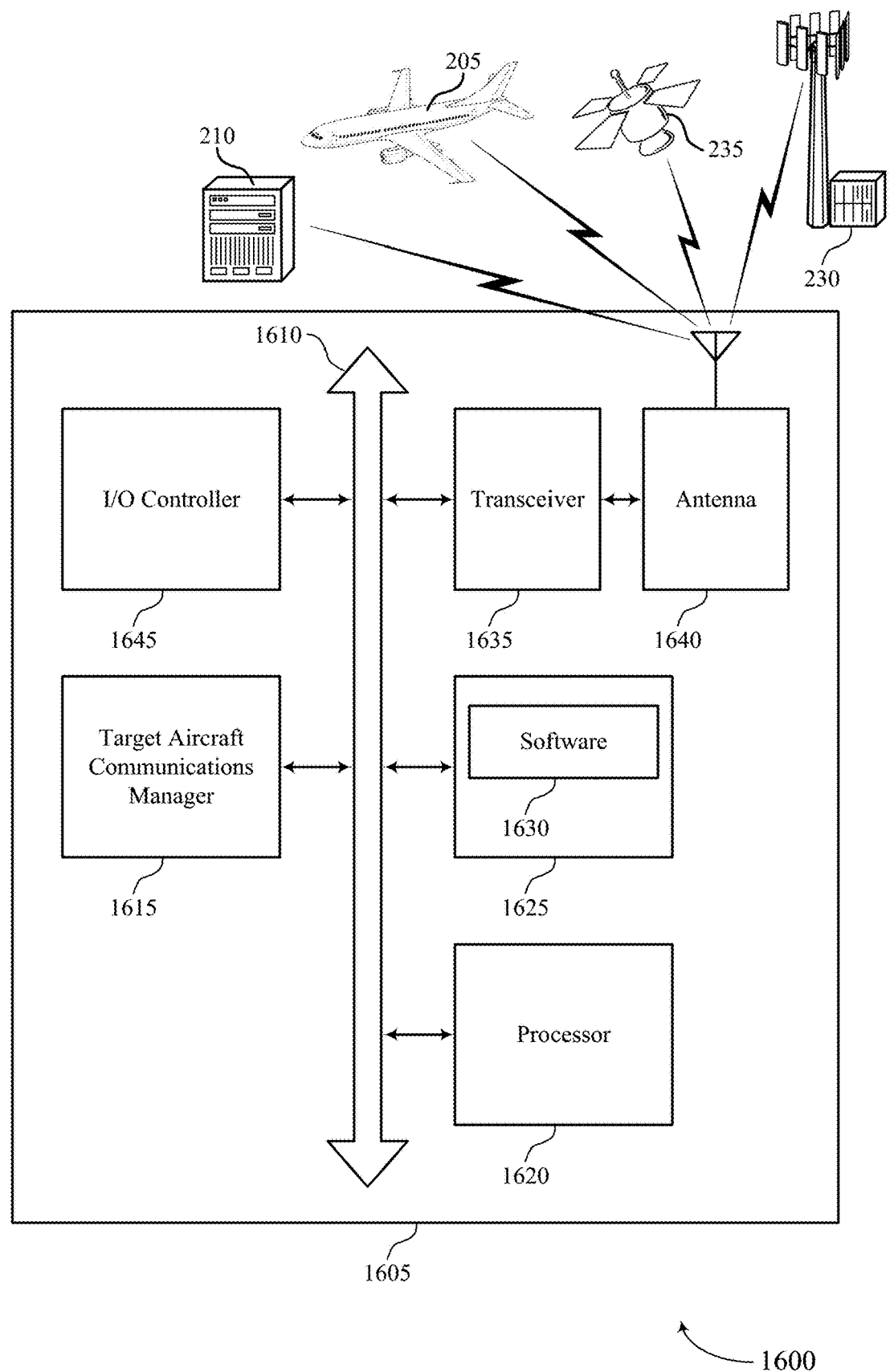
FIG. 16 illustrates a block diagram of a system including a device that supports directional beam mesh network for aircraft in accordance with aspects of the present disclosure.

FIG. 16 shows a diagram of a system 1600 including a device 1605 that supports directional beam mesh network for aircraft in accordance with aspects of the present disclosure. Device 1605 may be an example of or include the components of target aircraft 405, 510 or a UE 115 as described above. Device 1605 may include components for bi-directional voice and data communications including components for transmitting and receiving communications, including target aircraft communications manager 1615, processor 1620, memory 1625, software 1630, transceiver 1635, and I/O controller 1645. These components may be in electronic communication via one or more buses (e.g., bus 1610). Device 1605 may communicate wirelessly with one or more aircraft 205, one or more terrestrial servers 210, one or more base stations 230, and/or one or more satellites 235.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting directional beam mesh network for aircraft).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support directional beam mesh network for aircraft. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
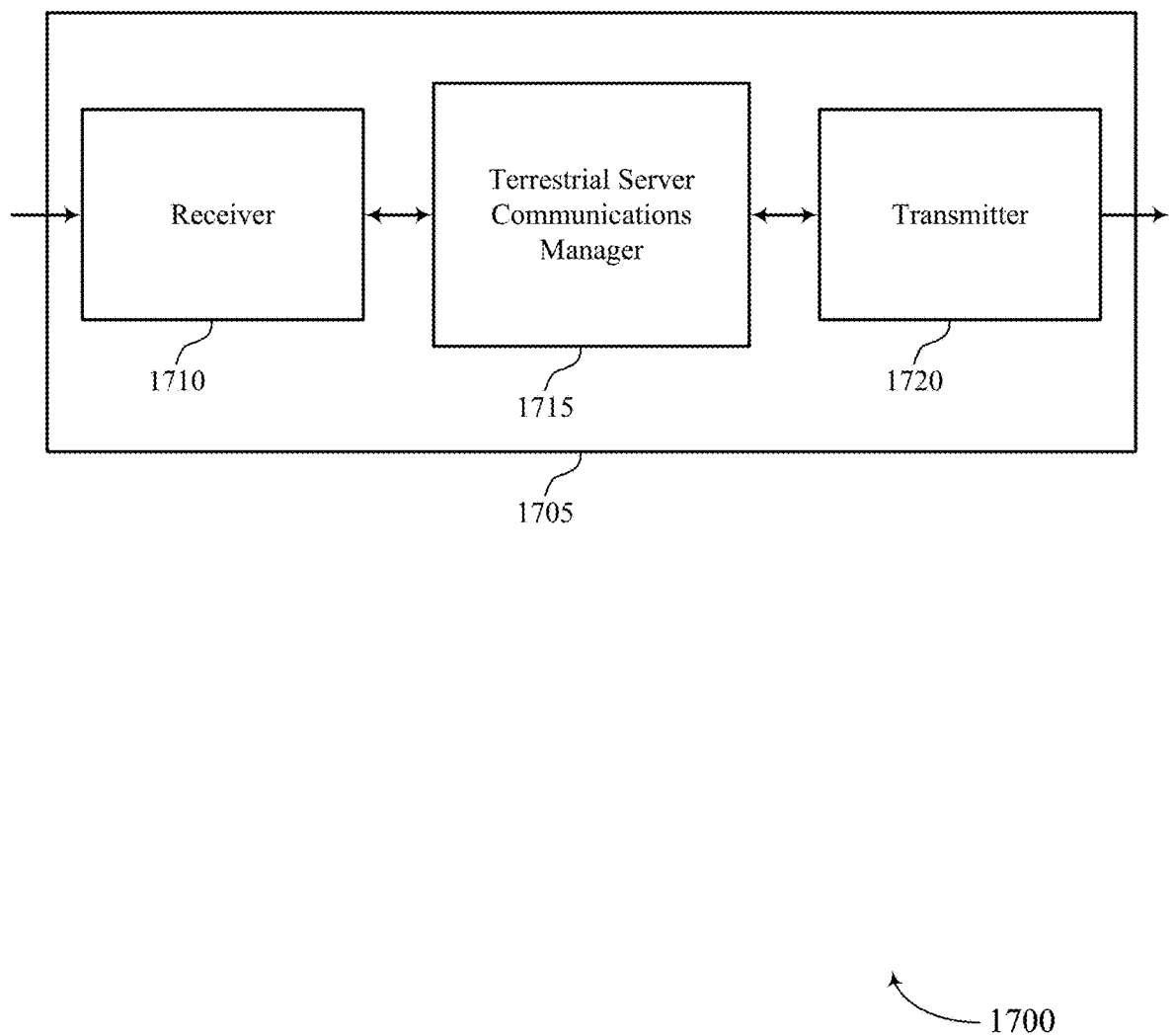
FIGS. 17 through 19 show block diagrams of a wireless device that supports directional beam mesh network for aircraft in accordance with aspects of the present disclosure.

FIG. 17 shows a block diagram 1700 of a wireless device 1705 that supports directional beam mesh network for aircraft in accordance with aspects of the present disclosure. Wireless device 1705 may be an example of aspects of a base station 105 or a UE 115 as described herein. Wireless device 1705 may be an example of aspects of a terrestrial server 210 as described herein. Wireless device 1705 may include receiver 1710, terrestrial server communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to directional beam mesh network for aircraft, etc.). Information may be passed on to other components of the device. The receiver 1710 may be an example of aspects of the transceiver 2035 described with reference to FIG. 20. The receiver 1710 may utilize a single antenna or a set of antennas.

Terrestrial server communications manager 1715 may be an example of aspects of the terrestrial server communications manager 2015 described with reference to FIG. 20. Terrestrial server communications manager 1715 and/or at least some of its various sub-components may be implemented in hardware, software executed by a processor, firmware, or any combination thereof. If implemented in software executed by a processor, the functions of the terrestrial server communications manager 1715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The terrestrial server communications manager 1715 and/or at least some of its various sub-components may be physically located at various positions, including being distributed such that portions of functions are implemented at different physical locations by one or more physical devices. In some examples, terrestrial server communications manager 1715 and/or at least some of its various sub-components may be a separate and distinct component in accordance with various aspects of the present disclosure. In other examples, terrestrial server communications manager 1715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Terrestrial server communications manager 1715 may receive air traffic information from a set of aircraft using a wireless network. Terrestrial server communications manager 1715 may identify a first aircraft from the set of aircraft as a node to establish one or more second communication links of a second wireless network directly with at least one of the set of aircraft. Terrestrial server communications manager 1715 may identify a second aircraft from the set of aircraft for the first aircraft to attempt to communicate with based on a position of the first aircraft and the second aircraft.

Transmitter 1720 may transmit signals generated by other components of the device. In some examples, the transmitter 1720 may be collocated with a receiver 1710 in a transceiver module. For example, the transmitter 1720 may be an example of aspects of the transceiver 2035 described with reference to FIG. 20. The transmitter 1720 may utilize a single antenna or a set of antennas. Transmitter 1720 may transmit flight data of the second aircraft to the first aircraft using a first communication link of the first wireless network.

Figure 18:
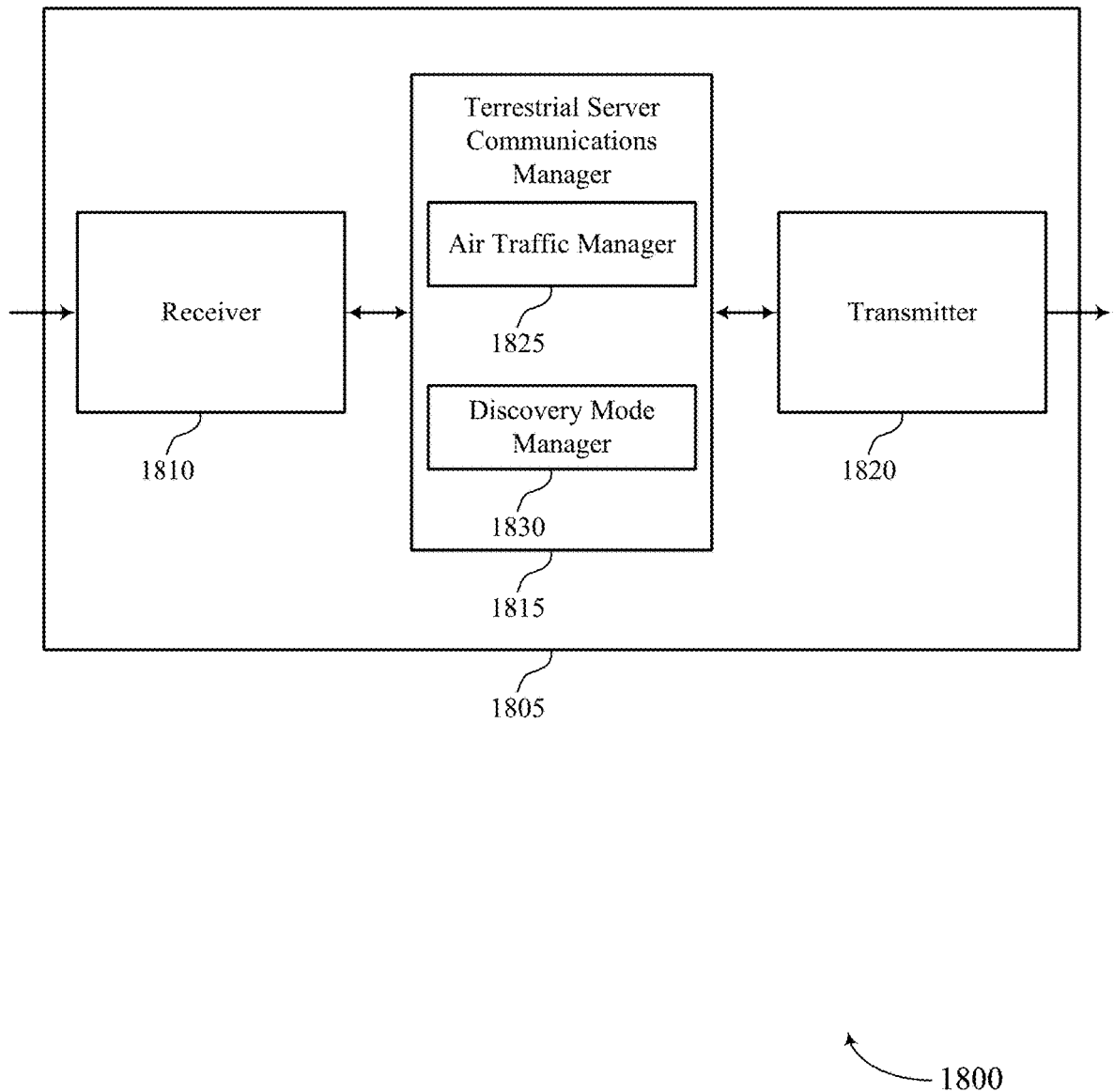

FIG. 18 shows a block diagram 1800 of a wireless device 1805 that supports directional beam mesh network for aircraft in accordance with aspects of the present disclosure. Wireless device 1805 may be an example of aspects of a wireless device 1705, a base station 105, a UE 115, or a terrestrial server 210. Wireless device 1805 may include receiver 1810, terrestrial server communications manager 1815, and transmitter 1820. Wireless device 1805 may also include a processor. Each of these components may be in communication with one another (e.g., via one or more buses).

Receiver 1810 may receive information such as packets, user data, or control information associated with various information channels (e.g., control channels, data channels, and information related to directional beam mesh network for aircraft, etc.). Information may be passed on to other components of the device. The receiver 1810 may be an example of aspects of the transceiver 2035 described with reference to FIG. 20. The receiver 1810 may utilize a single antenna or a set of antennas.

Terrestrial server communications manager 1815 may be an example of aspects of the terrestrial server communications manager 2015 described with reference to FIG. 20.

Terrestrial server communications manager 1815 may also include air traffic manager 1825 and discovery mode manager 1830.

Air traffic manager 1825 may receive air traffic information from a set of aircraft using a wireless network.

Discovery mode manager 1830 may identify a first aircraft from the set of aircraft as a node to establish one or more second communication links of a second wireless network directly with at least one of the set of aircraft. Discovery mode manager 1830 may identify a second aircraft from the set of aircraft for the first aircraft to attempt to communicate with based on a position of the first aircraft and the second aircraft.

Discovery mode manager 1830 may identify communication resources of the second wireless network for the first aircraft and the second aircraft to use to perform a beam discovery procedure. Discovery mode manager 1830 may transmit a message that indicates the identified communication resources to the first aircraft and the second aircraft using the first and second communication links of the first wireless network. In some cases, the second wireless network is a wireless mesh network. In some cases, a first radio frequency spectrum band used in the first wireless network is different from a second radio frequency spectrum band used in the second wireless network.

Transmitter 1820 may transmit signals generated by other components of the device. In some examples, the transmitter 1820 may be collocated with a receiver 1810 in a transceiver module. For example, the transmitter 1820 may be an example of aspects of the transceiver 2035 described with reference to FIG. 20. The transmitter 1820 may utilize a single antenna or a set of antennas.

Figure 19:
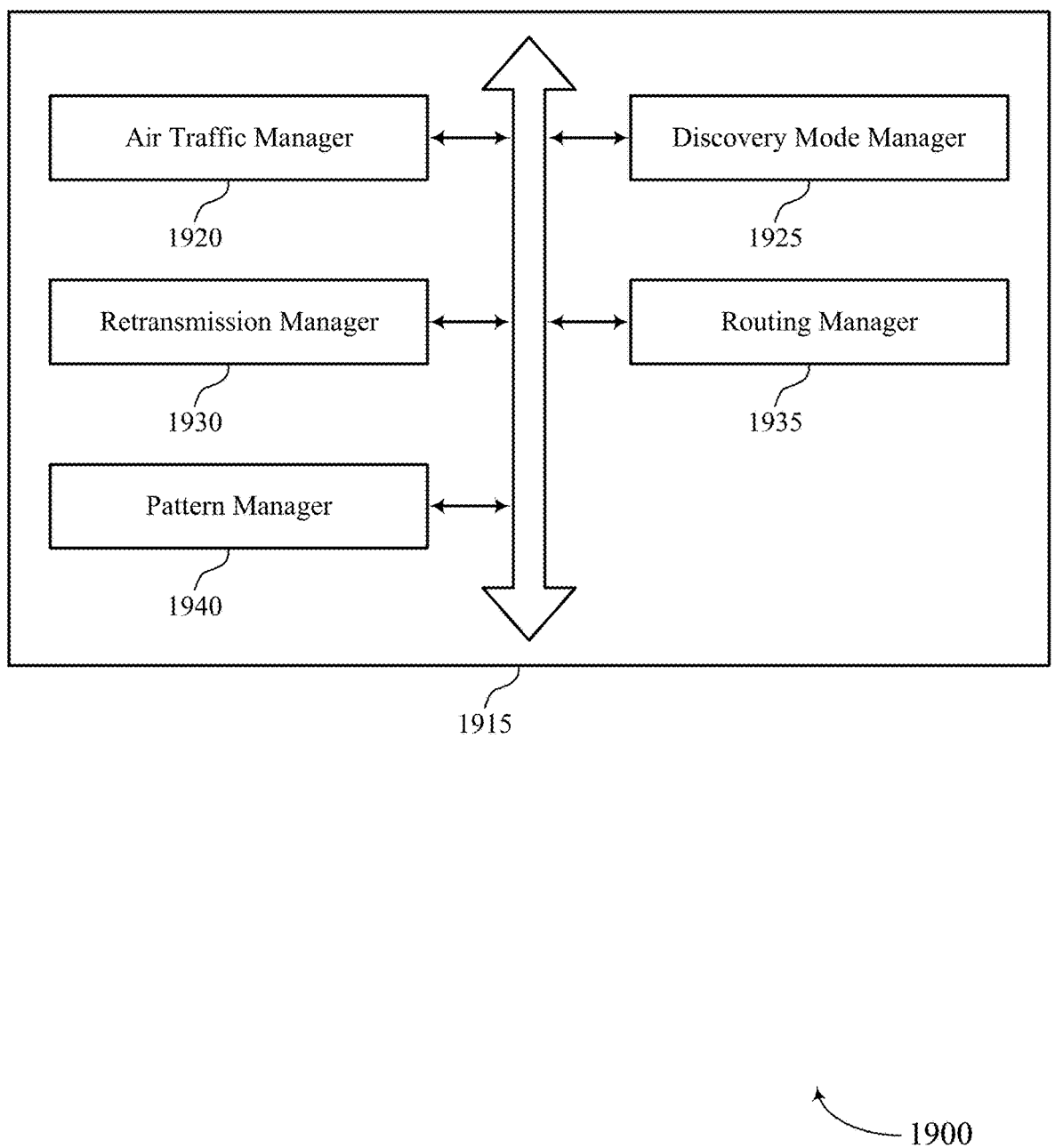

FIG. 19 shows a block diagram 1900 of a terrestrial server communications manager 1915 that supports directional beam mesh network for aircraft in accordance with aspects of the present disclosure. The terrestrial server communications manager 1915 may be an example of aspects of a terrestrial server communications manager 2015 described with reference to FIGS. 17, 18, and 20. The terrestrial server communications manager 1915 may include air traffic manager 1920, discovery mode manager 1925, retransmission manager 1930, routing manager 1935, and pattern manager 1940. Each of these modules may communicate, directly or indirectly, with one another (e.g., via one or more buses).

Air traffic manager 1920 may receive air traffic information from a set of aircraft using a wireless network.

Discovery mode manager 1925 may identify a first aircraft from the set of aircraft as a node to establish one or more second communication links of a second wireless network directly with at least one of the set of aircraft. Discovery mode manager 1925 may identify a second aircraft from the set of aircraft for the first aircraft to attempt to communicate with based on a position of the first aircraft and the second aircraft. Discovery mode manager 1925 may identify communication resources of the second wireless network for the first aircraft and the second aircraft to use to perform a beam discovery procedure. Discovery mode manager 1925 may transmit a message that indicates the identified communication resources to the first aircraft and the second aircraft using the first and second communication links of the first wireless network. In some cases, the second wireless network is a wireless mesh network. In some cases, a first radio frequency spectrum band used in the first wireless network is different from a second radio frequency spectrum band used in the second wireless network.

Retransmission manager 1930 may receive a message from the first aircraft that includes data originating from the second aircraft, where the data originating from the second aircraft was transmitted to the first aircraft using a second communication link.

Routing manager 1935 may transmit routing information to the first aircraft using the first communication link of the first wireless network, the routing information configured to be used by the first aircraft to communicate with other aircraft that are outside of a coverage area of the second wireless network for the first aircraft.

Pattern manager 1940 may determine a discovery pattern for the first aircraft having a first set of beam directions based on the flight data for the first aircraft and the second aircraft. Pattern manager 1940 may transmit a message that indicates the discovery pattern to the first aircraft using the first communication link of the first wireless network. Pattern manager 1940 may determine a listening pattern for the first aircraft having a second set of beam directions based on the flight data for the first aircraft and the second aircraft, where the message indicates the listening pattern to the first aircraft using the first communication link of the first wireless network. Pattern manager 1940 may determine a listening pattern having a first set of beam directions based on the flight data for the first aircraft and the second aircraft. Pattern manager 1940 may transmit a message that indicates the listening pattern to the second aircraft using a second communication link of the first wireless network. Pattern manager 1940 may determine a discovery pattern for the second aircraft having a second set of beam directions based on the flight data for the first aircraft and the second aircraft, where the message indicates the discovery pattern to the second aircraft using the second communication link of the first wireless network.

Figure 20:
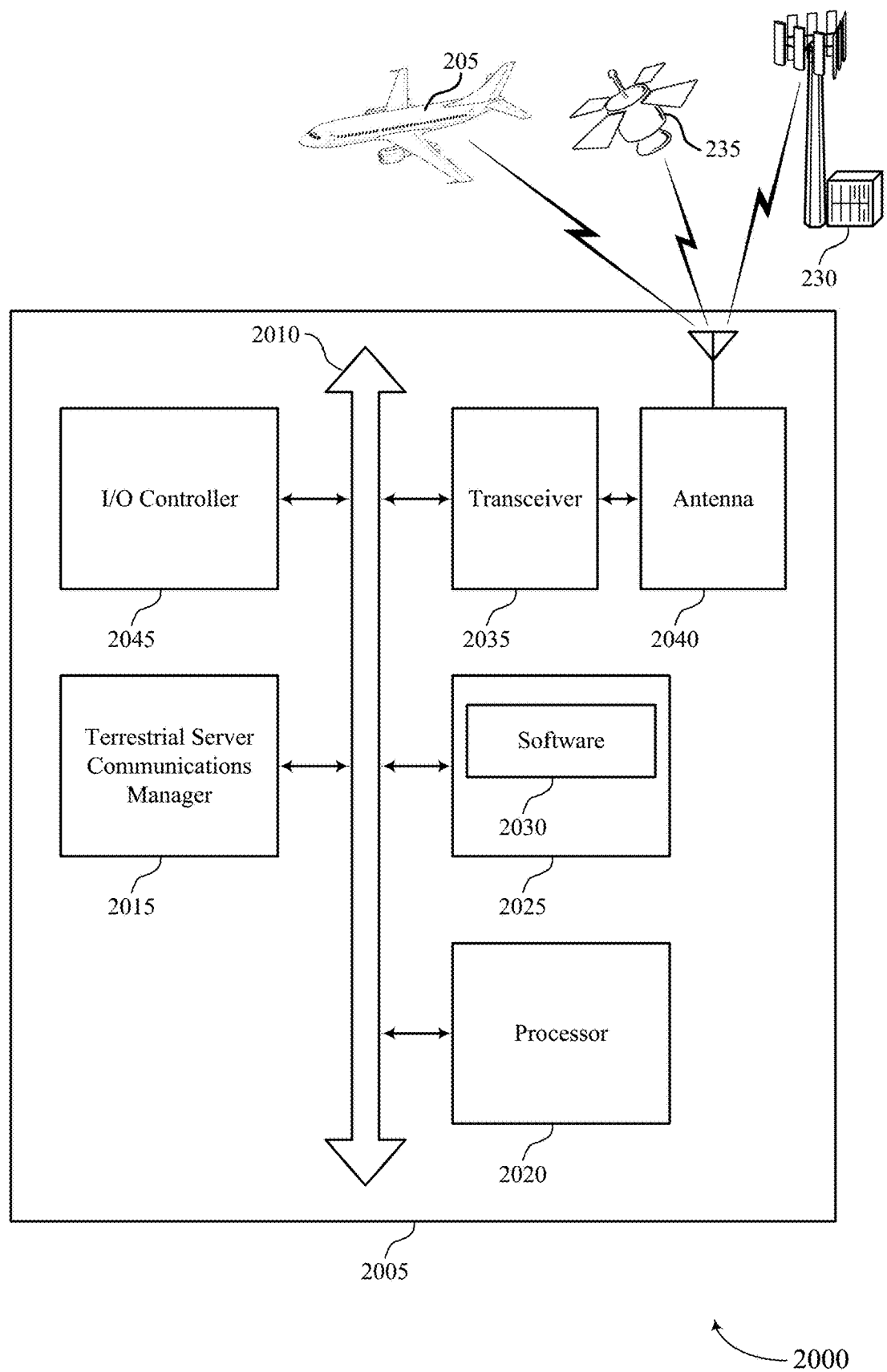
FIG. 20 illustrates a block diagram of a system including a device that supports directional beam mesh network for aircraft in accordance with aspects of the present disclosure.

FIG. 20 shows a diagram of a system 2000 including a device 2005 that supports directional beam mesh network for aircraft in accordance with aspects of the present disclosure. Device 2005 may be an example of or include the components of terrestrial server 210 as described above. Device 2005 may be an example of or include the components of base station 105 or a UE 115 as described above, e.g., with reference to FIG. 1. Device 2005 may include components for bi-directional voice and data communications including components for transmitting and receiving communications, including terrestrial server communications manager 2015, processor 2020, memory 2025, software 2030, transceiver 2035, antenna 2040, and I/O controller 2045. These components may be in electronic communication via one or more buses (e.g., bus 2010). Device 2005 may communicate wirelessly with one or more aircraft 205, one or more base stations 230, and/or one or more satellites 235.

Processor 2020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2020 may be configured to operate a memory array using a memory controller. In other cases, a memory controller may be integrated into processor 2020. Processor 2020 may be configured to execute computer-readable instructions stored in a memory to perform various functions (e.g., functions or tasks supporting directional beam mesh network for aircraft).

Memory 2025 may include RAM and ROM. The memory 2025 may store computer-readable, computer-executable software 2030 including instructions that, when executed, cause the processor to perform various functions described herein. In some cases, the memory 2025 may contain, among other things, a BIOS which may control basic hardware or software operation such as the interaction with peripheral components or devices.

Software 2030 may include code to implement aspects of the present disclosure, including code to support directional beam mesh network for aircraft. Software 2030 may be stored in a non-transitory computer-readable medium such as system memory or other memory. In some cases, the software 2030 may not be directly executable by the processor but may cause a computer (e.g., when compiled and executed) to perform functions described herein.

Transceiver 2035 may communicate bi-directionally, via one or more antennas, wired, or wireless links as described above. For example, the transceiver 2035 may represent a wireless transceiver and may communicate bi-directionally with another wireless transceiver. The transceiver 2035 may also include a modem to modulate the packets and provide the modulated packets to the antennas for transmission, and to demodulate packets received from the antennas.

In some cases, the wireless device may include a single antenna 2040. However, in some cases the device may have more than one antenna 2040, which may be capable of concurrently transmitting or receiving multiple wireless transmissions.

I/O controller 2045 may manage input and output signals for device 2005. I/O controller 2045 may also manage peripherals not integrated into device 2005. In some cases, I/O controller 2045 may represent a physical connection or port to an external peripheral. In some cases, I/O controller 2045 may utilize an operating system such as iOS®, ANDROID®, MS-DOS®, MS-WINDOWS®, OS/2®, UNIX®, LINUX®, or another known operating system. In other cases, I/O controller 2045 may represent or interact with a modem, a keyboard, a mouse, a touchscreen, or a similar device. In some cases, I/O controller 2045 may be implemented as part of a processor. In some cases, a user may interact with device 2005 via I/O controller 2045 or via hardware components controlled by I/O controller 2045.

Figure 21:
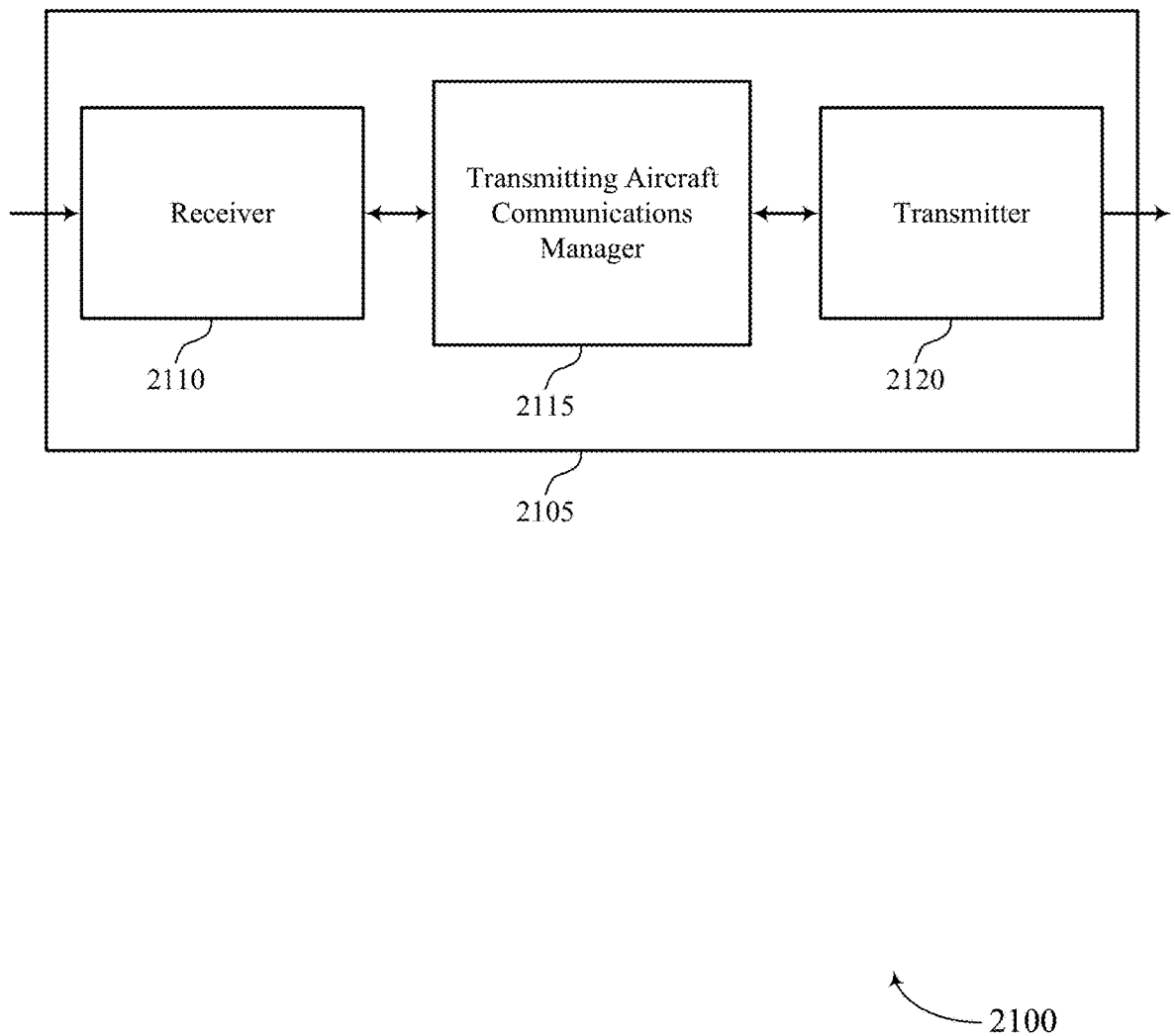
FIGS. 21 through 23 show block diagrams of a wireless device that supports directional beam mesh network for aircraft in accordance with aspects of the present disclosure.

FIG. 21 shows a block diagram 2100 of a wireless device 2105 that supports directional beam mesh network for aircraft in accordance with aspects of the present disclosure. Wireless device 2105 may be an example of aspects of a UE 115 as described herein. Wireless device 2105 may be an example of aspects of a transmitting aircraft 705 as described herein. In some cases, the wireless device 2105 may be integrated with an aircraft 205. Wireless device 2105 may include receiver 2110, transmitting aircraft communications manager 2115, and transmitter 2120. Wireless device 2105 may also include a processor. Each of these components may be in communication with one another (e.g., via one or more buses).

Receiver 2110 may receive information such as packets, user data, or control information associated with various information channels (e.g., control channels, data channels, and information related to directional beam mesh network for aircraft, etc.). Information may be passed on to other components of the device. The receiver 2110 may be an example of aspects of the transceiver 2435 described with reference to FIG. 24. The receiver 2110 may utilize a single antenna or a set of antennas.

Transmitting aircraft communications manager 2115 and/or at least some of its various sub-components may be implemented in hardware, software executed by a processor, firmware, or any combination thereof. If implemented in software executed by a processor, the functions of the transmitting aircraft communications manager 2115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. Transmitting aircraft communications manager 2115 may be an example of aspects of the transmitting aircraft communications manager 2415 described with reference to FIG. 24.

The transmitting aircraft communications manager 2115 and/or at least some of its various sub-components may be physically located at various positions, including being distributed such that portions of functions are implemented at different physical locations by one or more physical devices. In some examples, transmitting aircraft communications manager 2115 and/or at least some of its various sub-components may be a separate and distinct component in accordance with various aspects of the present disclosure. In other examples, transmitting aircraft communications manager 2115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitting aircraft communications manager 2115 may be part of a first aircraft and may establish a wireless communication link directly with a second aircraft. Transmitting aircraft communications manager 2115 may identify a first set of critical flight information to transmit to the second aircraft during a flight of the first aircraft.

Transmitter 2120 may transmit signals generated by other components of the device. In some examples, the transmitter 2120 may be collocated with a receiver 2110 in a transceiver module. For example, the transmitter 2120 may be an example of aspects of the transceiver 2435 described with reference to FIG. 24. The transmitter 2120 may utilize a single antenna or a set of antennas. Transmitter 2120 may transmit the first set of critical flight information to the second aircraft using the wireless communication link.

Figure 22:
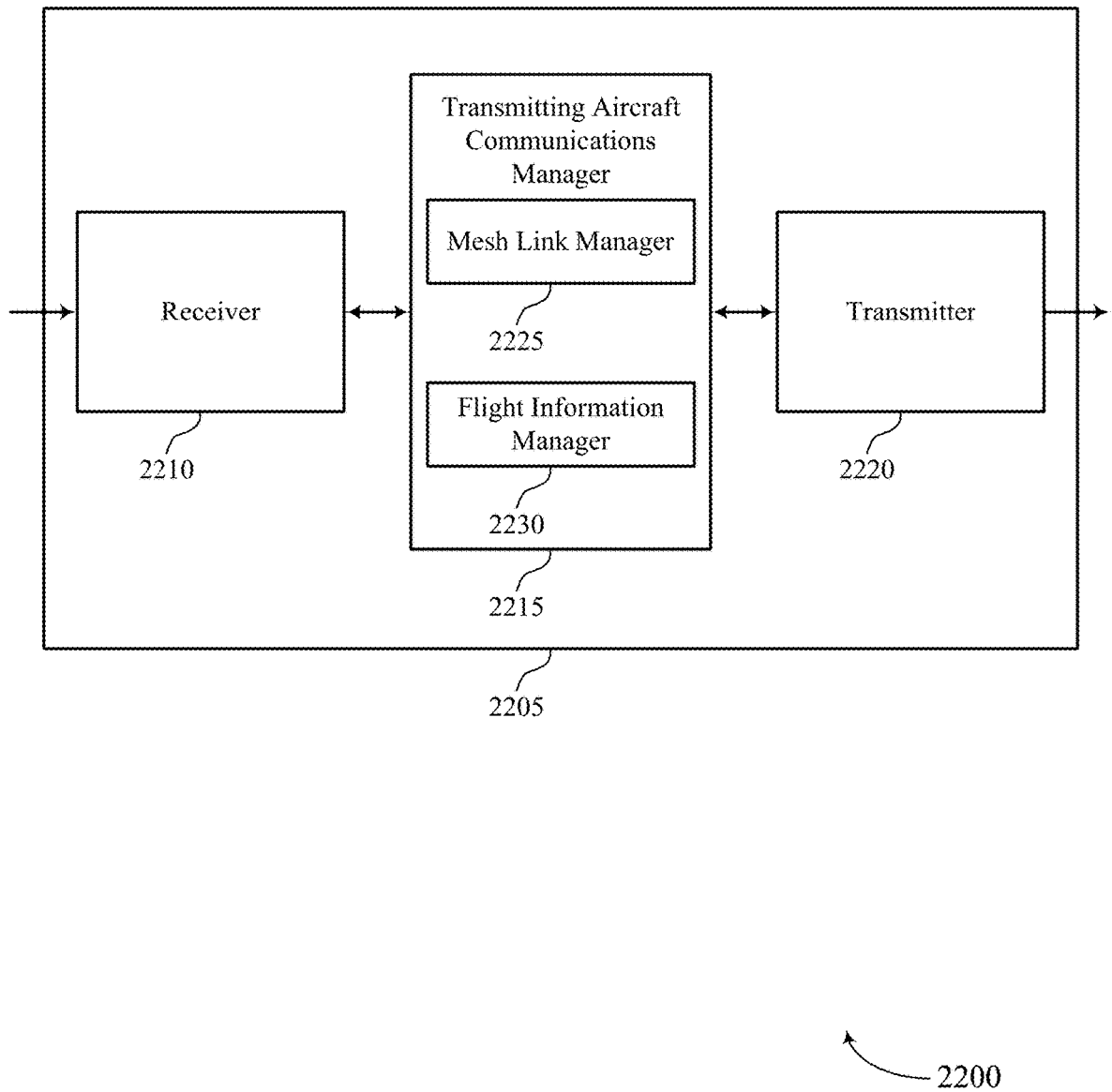

FIG. 22 shows a block diagram 2200 of a wireless device 2205 that supports directional beam mesh network for aircraft in accordance with aspects of the present disclosure. Wireless device 2205 may be an example of aspects of a wireless device 2105, a transmitting aircraft 705, an aircraft 205, or a UE 115. Wireless device 2205 may include receiver 2210, transmitting aircraft communications manager 2215, and transmitter 2220. Wireless device 2205 may also include a processor. Each of these components may be in communication with one another (e.g., via one or more buses).

Receiver 2210 may receive information such as packets, user data, or control information associated with various information channels (e.g., control channels, data channels, and information related to directional beam mesh network for aircraft, etc.). Information may be passed on to other components of the device. The receiver 2210 may be an example of aspects of the transceiver 2435 described with reference to FIG. 24. The receiver 2210 may utilize a single antenna or a set of antennas.

Transmitting aircraft communications manager 2215 may be an example of aspects of the transmitting aircraft communications manager 2415 described with reference to FIG. 24. Transmitting aircraft communications manager 2215 may also include mesh link manager 2225 and flight information manager 2230.

Mesh link manager 2225 may be part of a first aircraft and may establish a wireless communication link directly with a second aircraft. In some cases, the wireless communication link is a wireless mesh network communication link of an aircraft-to-aircraft mesh network. In some cases, the wireless mesh network communication link includes at least one directional transmission beam and the first set of critical flight information is transmitted to the second aircraft using the at least one directional transmission beam of the wireless mesh network communication link.

Flight information manager 2230 may identify a first set of critical flight information to transmit to the second aircraft during a flight of the first aircraft. In some cases, the critical flight information includes flight recorder data, cockpit voice recorder data, aircraft operation data indicative of operations of the first aircraft, or a combination thereof.

Transmitter 2220 may transmit signals generated by other components of the device. In some examples, the transmitter 2220 may be collocated with a receiver 2210 in a transceiver module. For example, the transmitter 2220 may be an example of aspects of the transceiver 2435 described with reference to FIG. 24. The transmitter 2220 may utilize a single antenna or a set of antennas.

Figure 23:
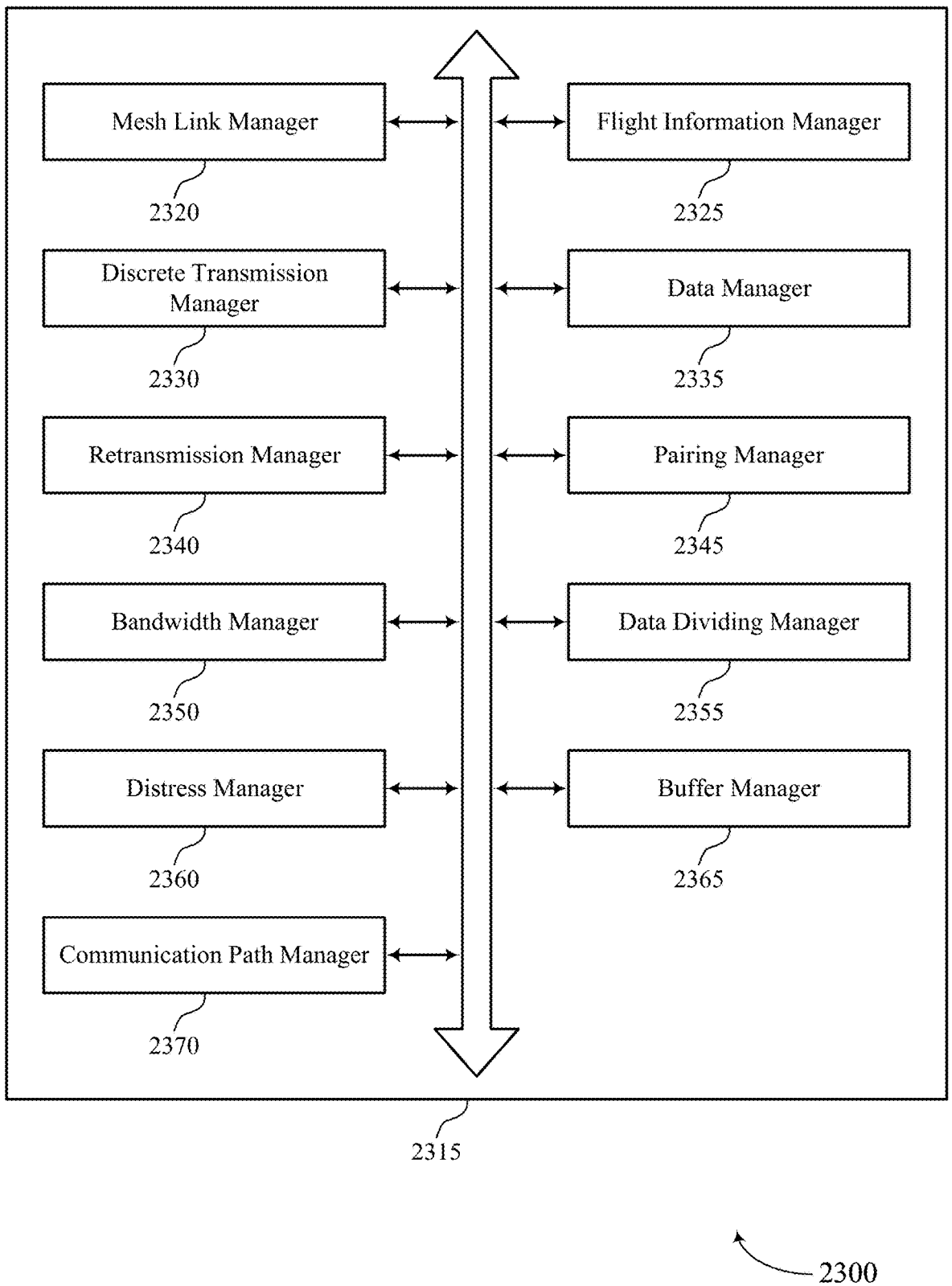

FIG. 23 shows a block diagram 2300 of a transmitting aircraft communications manager 2315 that supports directional beam mesh network for aircraft in accordance with aspects of the present disclosure. The transmitting aircraft communications manager 2315 may be an example of aspects of a transmitting aircraft communications manager 2415 described with reference to FIGS. 21, 22, and 24. The transmitting aircraft communications manager 2315 may include mesh link manager 2320, flight information manager 2325, discrete transmission manager 2330, data manager 2335, retransmission manager 2340, pairing manager 2345, bandwidth manager 2350, data dividing manager 2355, distress manager 2360, buffer manager 2365, and communication path manager 2370. Each of these modules may communicate, directly or indirectly, with one another (e.g., via one or more buses).

Mesh link manager 2320 may be part of a first aircraft and may establish a wireless communication link directly with a second aircraft. In some cases, the wireless communication link is a wireless mesh network communication link of an aircraft-to-aircraft mesh network. In some cases, the wireless mesh network communication link includes at least one directional transmission beam and the first set of critical flight information is transmitted to the second aircraft using the at least one directional transmission beam of the wireless mesh network communication link.

Flight information manager 2325 may identify a first set of critical flight information to transmit to the second aircraft during a flight of the first aircraft. In some cases, the critical flight information includes flight recorder data, cockpit voice recorder data, aircraft operation data indicative of operations of the first aircraft, or a combination thereof.

Discrete transmission manager 2330 may transmit the first set of critical flight information to the second aircraft. Transmitting the first set of critical flight information may include transmitting discrete subsets of the first set of critical flight recorder information at discrete times.

Data manager 2335 may store the first set of critical flight information in a local storage space including a flight recorder.

Retransmission manager 2340 may retrieve the first set of critical flight information from the local storage space to transmit it to the second aircraft using the wireless communication link.

Pairing manager 2345 may identify a set of connected aircraft that have established wireless communication links with the first aircraft. Pairing manager 2345 may select a set of aircraft from the set of connected aircraft with which to share the critical flight information. Pairing manager 2345 may transmit a query to the set of aircraft inquiring whether each aircraft of the set of aircraft is capable of storing the critical flight information of the first aircraft. In some cases, the set of aircraft are selected based on a number of aircraft connected to each aircraft of the set of connected aircraft, a storage capacity of each aircraft of the set of connected aircraft, a destination of each aircraft of the set of connected aircraft, a flight path of each aircraft of the set of connected aircraft, a direction of travel relative to the first aircraft of each aircraft of the set of connected aircraft, a predicated contact time between the first aircraft and each aircraft of the set of connected aircraft, or a combination thereof.

Bandwidth manager 2350 may identify an available bandwidth of each of the established wireless communication links of the set of connected aircraft. When bandwidth manager 2350 identifies the available bandwidth of each of the established wireless communication links of the set of connected aircraft, selecting the set of aircraft may be based on the available bandwidth of each established wireless communication link. Bandwidth manager 2350 may identify an available bandwidth of each of the set of connected aircraft with a terrestrial server. When bandwidth manager 2350 identifies the available bandwidth of each of the set of connected aircraft with a terrestrial server, selecting the set of aircraft may be based on the available bandwidth with the terrestrial server.

Data dividing manager 2355 may divide the first set of critical flight information into different portions and transmit each portion of the first set of critical flight information to a different aircraft communicatively coupled with the first aircraft using a set of wireless communication links. The second aircraft may be one of the different aircraft that receives a portion of the first set of critical flight information.

Distress manager 2360 may identify a distress condition of the first aircraft using the wireless communication link. Distress manager 2360 may transmit an indication of the distress condition to a set of connected aircraft with established wireless communication links with the first aircraft. Distress manager 2360 may identify a second set of critical flight information different than the first set of critical flight information to transmit to the second aircraft during the flight of the first aircraft based on identifying the distress condition. Distress manager 2360 may transmit the second set of critical flight information to the second aircraft using the wireless communication link, and establish one or more additional wireless communication links directly with one or more additional aircrafts based on identifying the distress condition. In some cases, the second set of critical flight information includes instructions to transmit the second set of critical flight information to another aircraft not connected with the first aircraft through the wireless communication link based on identifying the distress condition. In some cases, the indication is included with a transmission of the critical flight information.

Buffer manager 2365 may transmit buffered critical flight information to the second aircraft using the wireless communication link based on identifying the distress condition.

Communication path manager 2370 may include information about other nodes of the mesh network that are not directly connected with the transmitting aircraft. In some cases, the first set of critical flight information includes instructions to store the first set of critical flight information and transmit the first set of critical flight information to another aircraft not connected with the first aircraft using a second wireless communication link.

Figure 24:
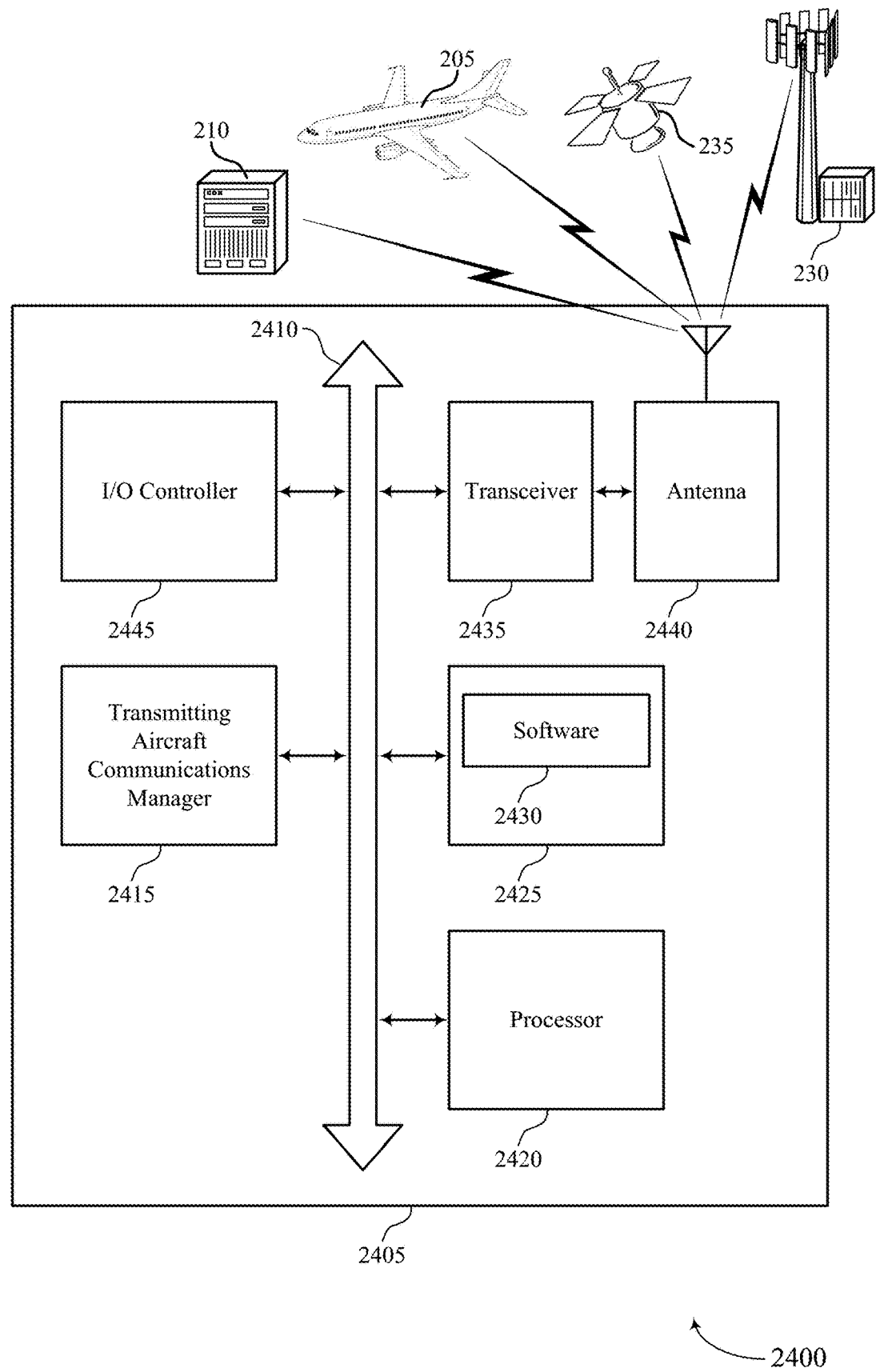
FIG. 24 illustrates a block diagram of a system including a device that supports directional beam mesh network for aircraft in accordance with aspects of the present disclosure.

FIG. 24 shows a diagram of a system 2400 including a device 2405 that supports directional beam mesh network for aircraft in accordance with aspects of the present disclosure. Device 2405 may be an example of or include the components of transmitting aircraft 705 or a UE 115 as described above. Device 2405 may include components for bi-directional voice and data communications including components for transmitting and receiving communications, including transmitting aircraft communications manager 2415, processor 2420, memory 2425, software 2430, transceiver 2435, and I/O controller 2440. These components may be in electronic communication via one or more buses (e.g., bus 2410). Device 2405 may communicate wirelessly with one or more aircraft 205, one or more terrestrial servers 210, one or more base stations 230, and/or one or more satellites 235.

Processor 2420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2420 may be configured to operate a memory array using a memory controller. In other cases, a memory controller may be integrated into processor 2420. Processor 2420 may be configured to execute computer-readable instructions stored in a memory to perform various functions (e.g., functions or tasks supporting directional beam mesh network for aircraft).

Memory 2425 may include RAM and ROM. The memory 2425 may store computer-readable, computer-executable software 2430 including instructions that, when executed, cause the processor to perform various functions described herein. In some cases, the memory 2425 may contain, among other things, a BIOS which may control basic hardware or software operation such as the interaction with peripheral components or devices.

Software 2430 may include code to implement aspects of the present disclosure, including code to support directional beam mesh network for aircraft. Software 2430 may be stored in a non-transitory computer-readable medium such as system memory or other memory. In some cases, the software 2430 may not be directly executable by the processor but may cause a computer (e.g., when compiled and executed) to perform functions described herein.

Transceiver 2435 may communicate bi-directionally, via one or more antennas, wired, or wireless links as described above. For example, the transceiver 2435 may represent a wireless transceiver and may communicate bi-directionally with another wireless transceiver. The transceiver 2435 may also include a modem to modulate the packets and provide the modulated packets to the antennas for transmission, and to demodulate packets received from the antennas.

In some cases, the wireless device may include a single antenna 2440. However, in some cases the device may have more than one antenna 2440, which may be capable of concurrently transmitting or receiving multiple wireless transmissions.

I/O controller 2445 may manage input and output signals for device 2405. I/O controller 2445 may also manage peripherals not integrated into device 2405. In some cases, I/O controller 2445 may represent a physical connection or port to an external peripheral. In some cases, I/O controller 2445 may utilize an operating system such as iOS®, ANDROID®, MS-DOS®, MS-WINDOWS®, OS/2®, UNIX®, LINUX®, or another known operating system. In other cases, I/O controller 2445 may represent or interact with a modem, a keyboard, a mouse, a touchscreen, or a similar device. In some cases, I/O controller 2445 may be implemented as part of a processor. In some cases, a user may interact with device 2405 via I/O controller 2445 or via hardware components controlled by I/O controller 2445.

Figure 25:
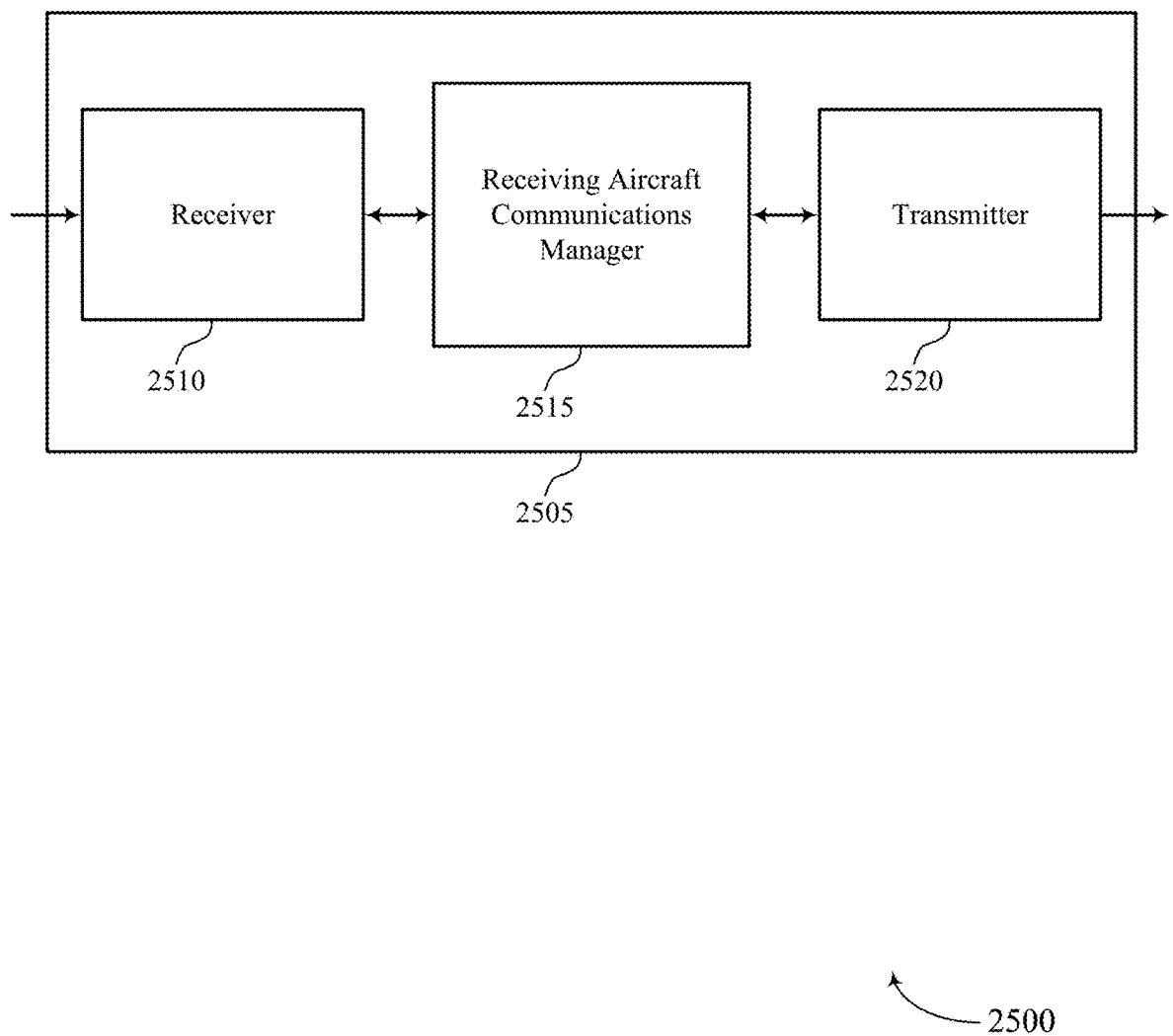
FIGS. 25 through 27 show block diagrams of a wireless device that supports directional beam mesh network for aircraft in accordance with aspects of the present disclosure.

FIG. 25 shows a block diagram 2500 of a wireless device 2505 that supports directional beam mesh network for aircraft in accordance with aspects of the present disclosure. Wireless device 2505 may be an example of aspects of a UE 115 as described herein. Wireless device 2505 may be an example of aspects of a receiving aircraft 710 as described herein. In some cases, the wireless device 2505 may be integrated with an aircraft 205. Wireless device 2505 may include receiver 2510, receiving aircraft communications manager 2515, and transmitter 2520. Wireless device 2505 may also include a processor. Each of these components may be in communication with one another (e.g., via one or more buses).

Receiver 2510 may receive information such as packets, user data, or control information associated with various information channels (e.g., control channels, data channels, and information related to directional beam mesh network for aircraft, etc.). Information may be passed on to other components of the device. The receiver 2510 may be an example of aspects of the transceiver 2835 described with reference to FIG. 28. The receiver 2510 may utilize a single antenna or a set of antennas. Receiver 2510 may receive critical flight information from the second aircraft using the wireless communication link during a flight of the first aircraft.

Receiving aircraft communications manager 2515 may be an example of aspects of the receiving aircraft communications manager 2815 described with reference to FIG. 28. Receiving aircraft communications manager 2515 and/or at least some of its various sub-components may be implemented in hardware, software executed by a processor, firmware, or any combination thereof. If implemented in software executed by a processor, the functions of the receiving aircraft communications manager 2515 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The receiving aircraft communications manager 2515 and/or at least some of its various sub-components may be physically located at various positions, including being distributed such that portions of functions are implemented at different physical locations by one or more physical devices.

In some examples, receiving aircraft communications manager 2515 and/or at least some of its various sub-components may be a separate and distinct component in accordance with various aspects of the present disclosure. In other examples, receiving aircraft communications manager 2515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Receiving aircraft communications manager 2515 may be part of a first aircraft and may establish a wireless communication link directly with a second aircraft and store the critical flight information to a memory of the first aircraft.

Transmitter 2520 may transmit signals generated by other components of the device. In some examples, the transmitter 2520 may be collocated with a receiver 2510 in a transceiver module. For example, the transmitter 2520 may be an example of aspects of the transceiver 2835 described with reference to FIG. 28. The transmitter 2520 may utilize a single antenna or a set of antennas.

Figure 26:
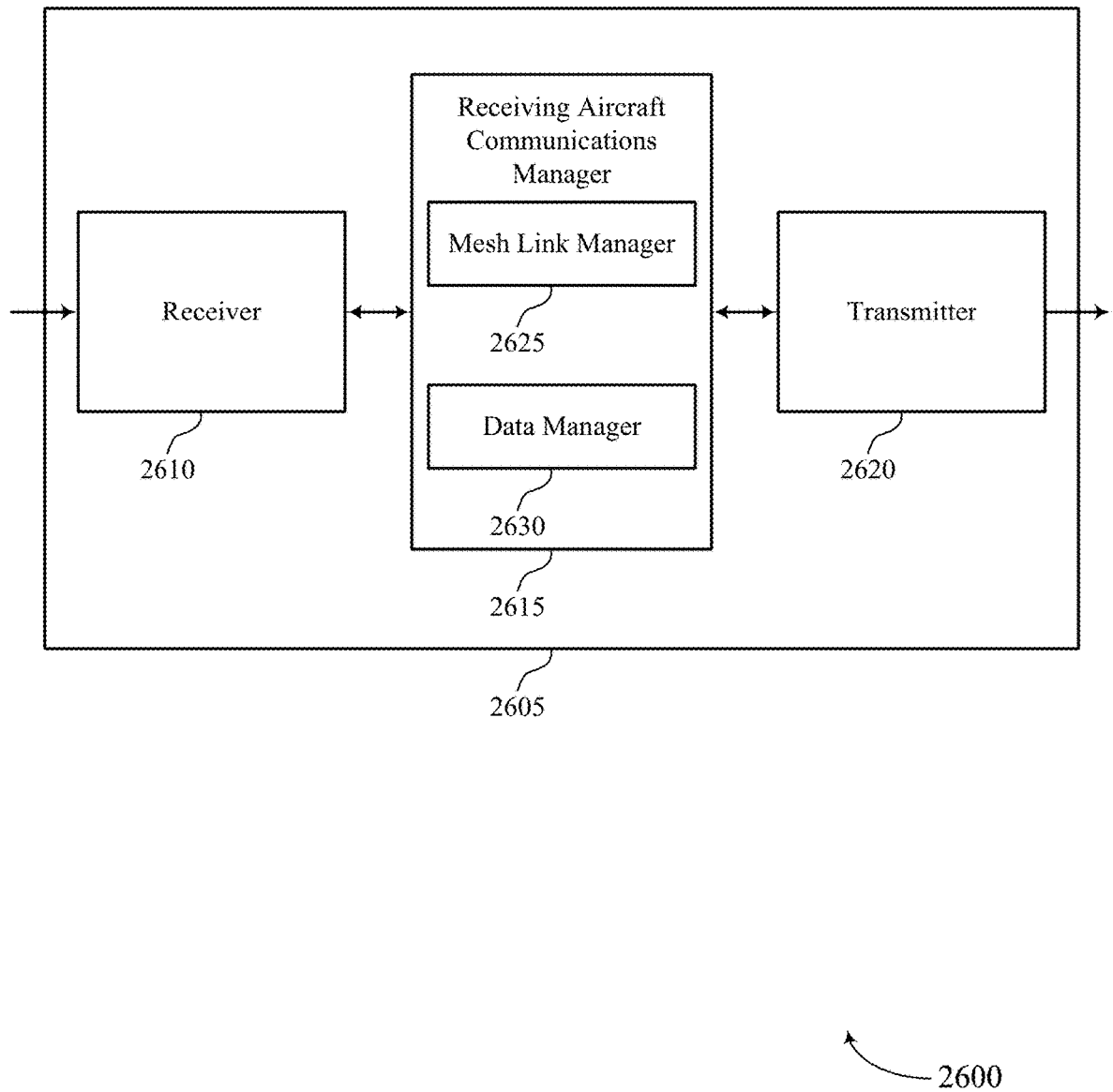

FIG. 26 shows a block diagram 2600 of a wireless device 2605 that supports directional beam mesh network for aircraft in accordance with aspects of the present disclosure. Wireless device 2605 may be an example of aspects of a wireless device 2505, a receiving aircraft 710, an aircraft 205, or a UE 115 as described with reference to FIG. 25. Wireless device 2605 may include receiver 2610, receiving aircraft communications manager 2615, and transmitter 2620. Wireless device 2605 may also include a processor. Each of these components may be in communication with one another (e.g., via one or more buses).

Receiver 2610 may receive information such as packets, user data, or control information associated with various information channels (e.g., control channels, data channels, and information related to directional beam mesh network for aircraft, etc.). Information may be passed on to other components of the device. The receiver 2610 may be an example of aspects of the transceiver 2835 described with reference to FIG. 28. The receiver 2610 may utilize a single antenna or a set of antennas.

Receiving aircraft communications manager 2615 may be an example of aspects of the receiving aircraft communications manager 2815 described with reference to FIG. 28. Receiving aircraft communications manager 2615 may also include mesh link manager 2625 and data manager 2630.

Mesh link manager 2625 may establish, by a first aircraft, a wireless communication link directly with a second aircraft. Data manager 2630 may store the critical flight information to a memory of the first aircraft.

Transmitter 2620 may transmit signals generated by other components of the device. In some examples, the transmitter 2620 may be collocated with a receiver 2610 in a transceiver module. For example, the transmitter 2620 may be an example of aspects of the transceiver 2835 described with reference to FIG. 28. The transmitter 2620 may utilize a single antenna or a set of antennas.

Figure 27:
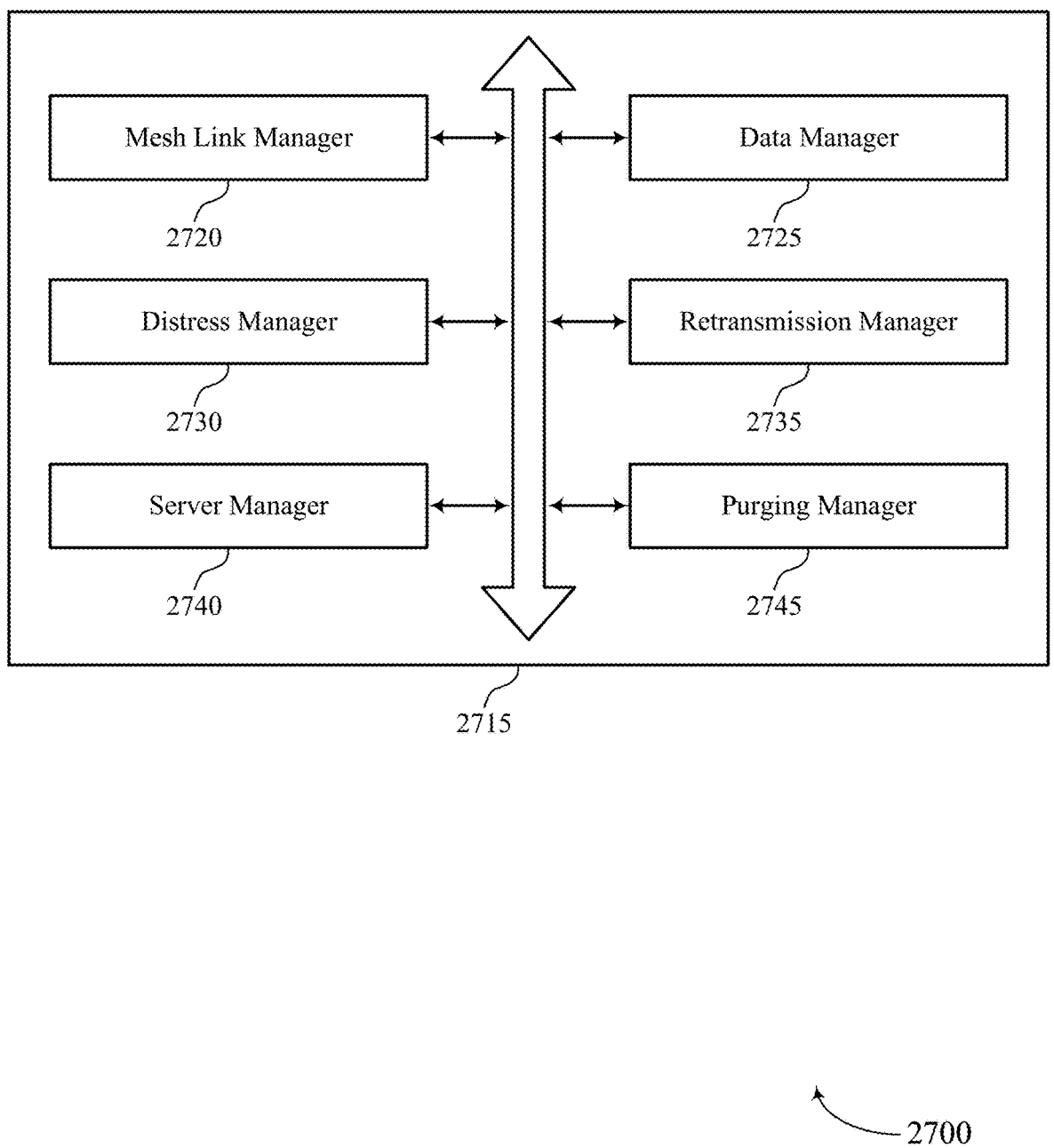

FIG. 27 shows a block diagram 2700 of a receiving aircraft communications manager 2715 that supports directional beam mesh network for aircraft in accordance with aspects of the present disclosure. The receiving aircraft communications manager 2715 may be an example of aspects of a receiving aircraft communications manager 2815 described with reference to FIGS. 25, 26, and 28. The receiving aircraft communications manager 2715 may include mesh link manager 2720, data manager 2725, distress manager 2730, retransmission manager 2735, server manager 2740, and purging manager 2745. Each of these modules may communicate, directly or indirectly, with one another (e.g., via one or more buses).

Mesh link manager 2720 may be part of a first aircraft and may establish a wireless communication link directly with a second aircraft. Data manager 2725 may store the critical flight information to a memory of the first aircraft. Distress manager 2730 may receive an indication of a distress condition of the second aircraft using the wireless communication link.

Retransmission manager 2735 may transmit the critical flight information to a third aircraft different from the second aircraft using a second wireless communication link based on receiving the indication. Server manager 2740 may transmit the critical flight information of the second aircraft to a terrestrial server after completing the flight.

Purging manager 2745 may identify that the second aircraft completed its flight without a distress condition and purge the critical flight information from the memory of the first aircraft based on identifying that the second aircraft completed its flight without the distress condition.

Figure 28:
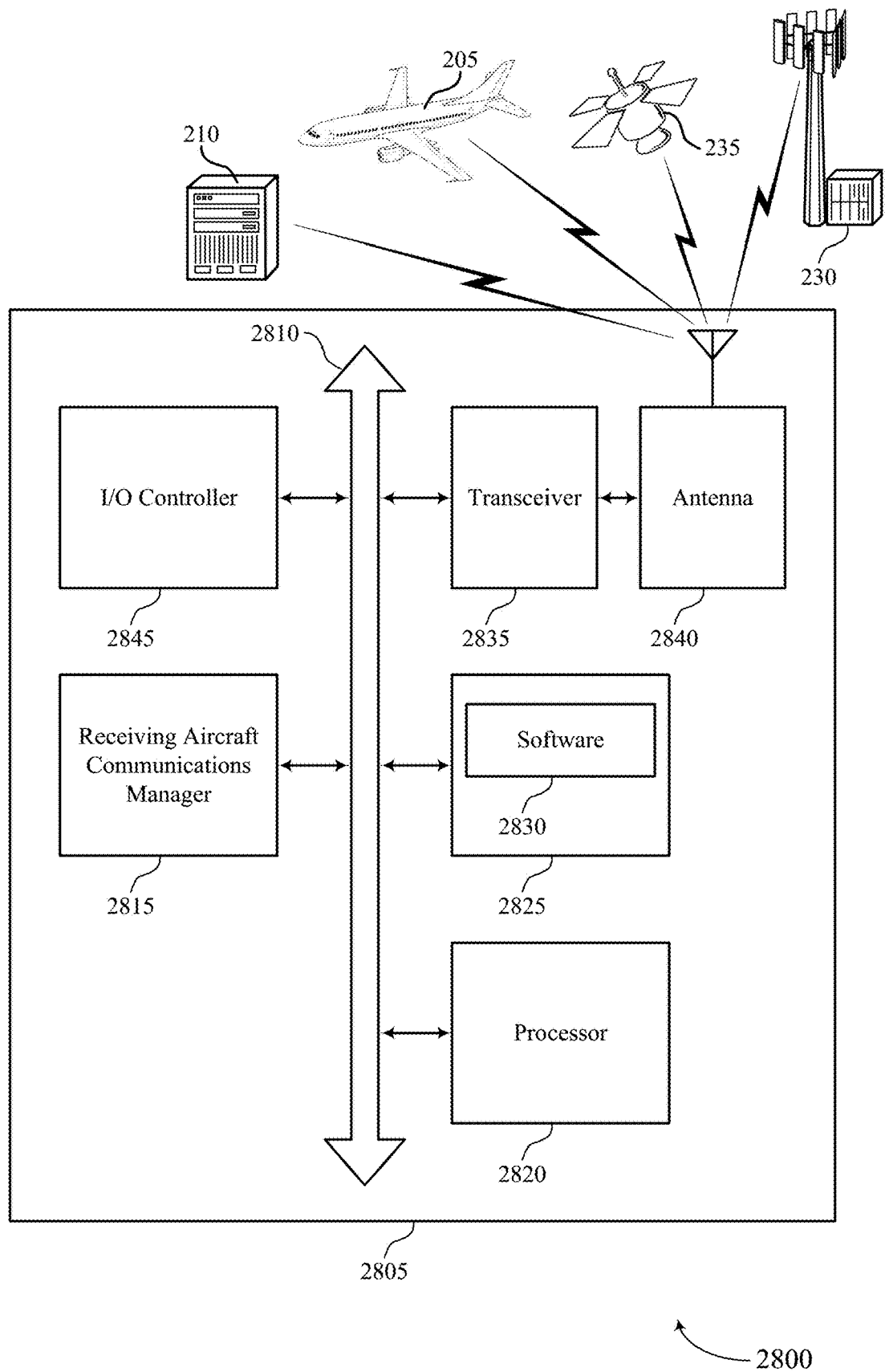
FIG. 28 illustrates a block diagram of a system including a device that supports directional beam mesh network for aircraft in accordance with aspects of the present disclosure.

FIG. 28 shows a diagram of a system 2800 including a device 2805 that supports directional beam mesh network for aircraft in accordance with aspects of the present disclosure. Device 2805 may be an example of or include the components of receiving aircraft 710 or a UE 115 as described above. Device 2805 may include components for bi-directional voice and data communications including components for transmitting and receiving communications, including receiving aircraft communications manager 2815, processor 2820, memory 2825, software 2830, transceiver 2835, and I/O controller 2840. These components may be in electronic communication via one or more buses (e.g., bus 2810). Device 2805 may communicate wirelessly with one or more aircraft 205, one or more terrestrial servers 210, one or more base stations 230, and/or one or more satellites 235.

Processor 2820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2820 may be configured to operate a memory array using a memory controller. In other cases, a memory controller may be integrated into processor 2820. Processor 2820 may be configured to execute computer-readable instructions stored in a memory to perform various functions (e.g., functions or tasks supporting directional beam mesh network for aircraft).

Memory 2825 may include RAM and ROM. The memory 2825 may store computer-readable, computer-executable software 2830 including instructions that, when executed, cause the processor to perform various functions described herein. In some cases, the memory 2825 may contain, among other things, a BIOS which may control basic hardware or software operation such as the interaction with peripheral components or devices.

Software 2830 may include code to implement aspects of the present disclosure, including code to support directional beam mesh network for aircraft. Software 2830 may be stored in a non-transitory computer-readable medium such as system memory or other memory. In some cases, the software 2830 may not be directly executable by the processor but may cause a computer (e.g., when compiled and executed) to perform functions described herein.

Transceiver 2835 may communicate bi-directionally, via one or more antennas, wired, or wireless links as described above. For example, the transceiver 2835 may represent a wireless transceiver and may communicate bi-directionally with another wireless transceiver. The transceiver 2835 may also include a modem to modulate the packets and provide the modulated packets to the antennas for transmission, and to demodulate packets received from the antennas.

In some cases, the wireless device may include a single antenna 2840. However, in some cases the device may have more than one antenna 2840, which may be capable of concurrently transmitting or receiving multiple wireless transmissions.

I/O controller 2845 may manage input and output signals for device 2805. I/O controller 2845 may also manage peripherals not integrated into device 2805. In some cases, I/O controller 2845 may represent a physical connection or port to an external peripheral. In some cases, I/O controller 2845 may utilize an operating system such as iOS®, ANDROID®, MS-DOS®, MS-WINDOWS®, OS/2®, UNIX®, LINUX®, or another known operating system. In other cases, I/O controller 2845 may represent or interact with a modem, a keyboard, a mouse, a touchscreen, or a similar device. In some cases, I/O controller 2845 may be implemented as part of a processor. In some cases, a user may interact with device 2805 via I/O controller 2845 or via hardware components controlled by I/O controller 2845.

Figure 29:
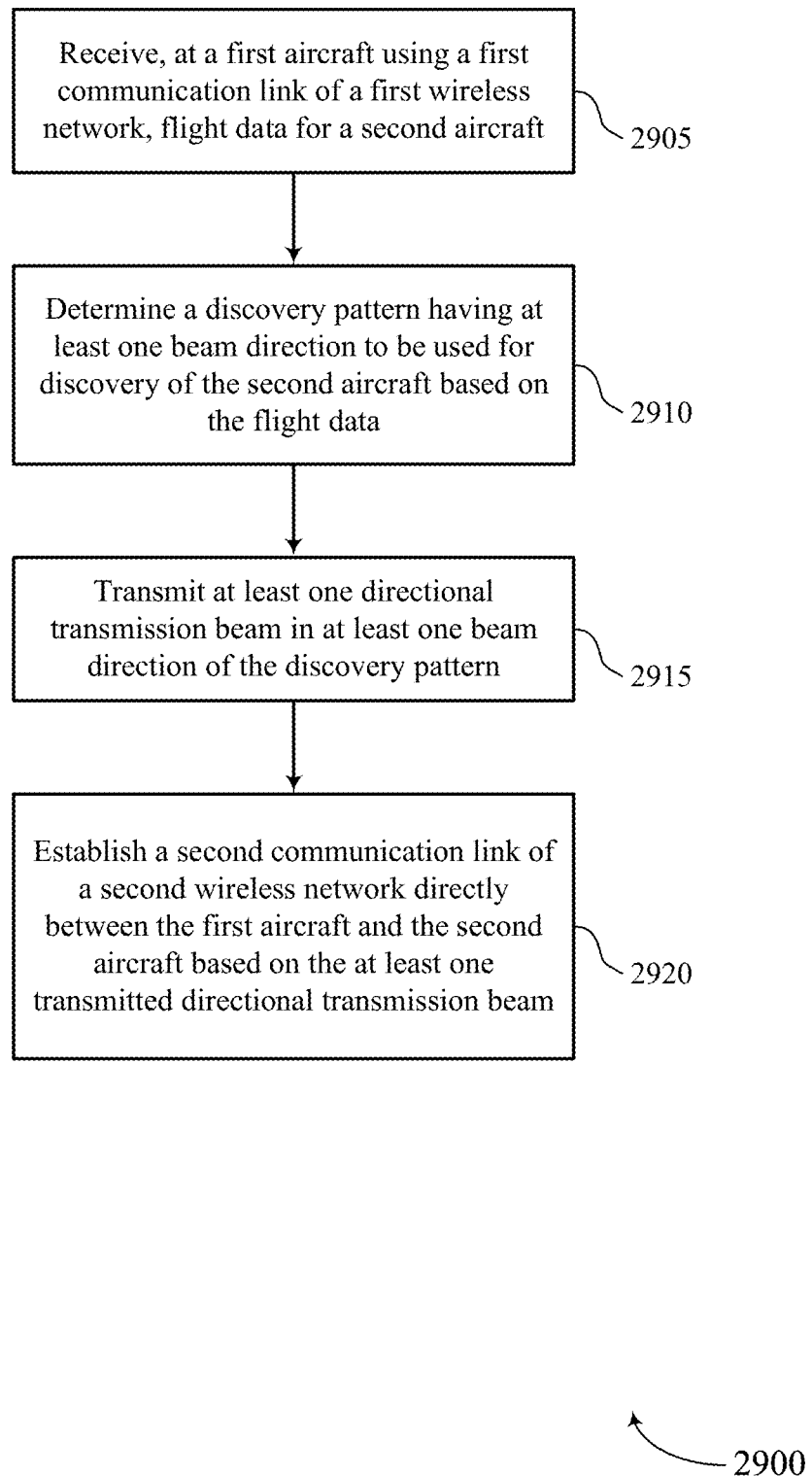
FIGS. 29 through 33 illustrate methods for directional beam mesh network for aircraft in accordance with aspects of the present disclosure.

FIG. 29 shows a flowchart illustrating a method 2900 for directional beam mesh network for aircraft in accordance with aspects of the present disclosure. The operations of method 2900 may be implemented by a discovering aircraft 405, 505 or its components as described herein. For example, the operations of method 2900 may be performed by a discovering aircraft communications manager as described with reference to FIGS. 9 through 12. In some examples, a discovering aircraft 405, 505 may execute a set of codes to control the functional elements of the device to perform the functions described below. Additionally or alternatively, the discovering aircraft 405, 505 may perform aspects of the functions described below using special-purpose hardware.

At block 2905 the method may include receiving, at a first aircraft using a first communication link of a first wireless network, flight data for a second aircraft. The operations of block 2905 may be performed according to the methods described herein. In certain examples, aspects of the operations of block 2905 may be performed by a flight data manager as described with reference to FIGS. 9 through 12.

At block 2910 the method may include determining a discovery pattern having at least one beam direction to be used for discovery of the second aircraft based at least in part on the flight data. The operations of block 2910 may be performed according to the methods described herein. In certain examples, aspects of the operations of block 2910 may be performed by a pattern manager as described with reference to FIGS. 9 through 12.

At block 2915 the method may include transmitting at least one directional transmission beam in at least one beam direction of the discovery pattern. The operations of block 2915 may be performed according to the methods described herein. In certain examples, aspects of the operations of block 2915 may be performed by a transmitter as described with reference to FIGS. 9 through 12.

At block 2920 the method may include establishing a second communication link of a second wireless network directly between the first aircraft and the second aircraft based at least in part on the at least one transmitted directional transmission beam. The operations of block 2920 may be performed according to the methods described herein. In certain examples, aspects of the operations of block 2920 may be performed by a mesh link manager as described with reference to FIGS. 9 through 12.

Figure 30:
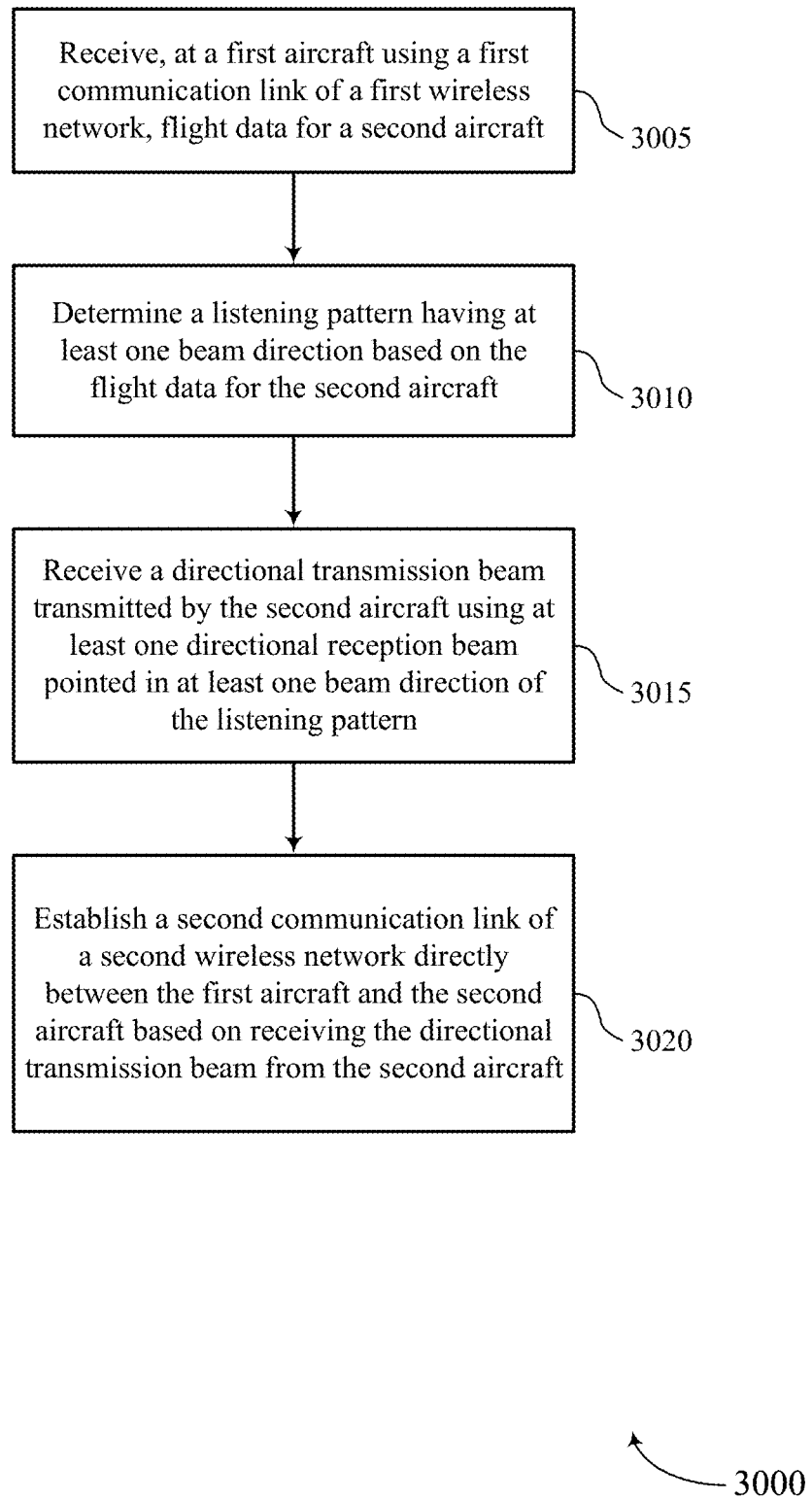

FIG. 30 shows a flowchart illustrating a method 3000 for directional beam mesh network for aircraft in accordance with aspects of the present disclosure. The operations of method 3000 may be implemented by a target aircraft 405, 510 or its components as described herein. For example, the operations of method 3000 may be performed by a target aircraft communications manager as described with reference to FIGS. 13 through 16. In some examples, a target aircraft 405, 510 may execute a set of codes to control the functional elements of the device to perform the functions described below. Additionally or alternatively, the target aircraft 405, 510 may perform aspects of the functions described below using special-purpose hardware.

At block 3005 the method may include receiving, at a first aircraft using a first communication link of a first wireless network, flight data for a second aircraft. The operations of block 3005 may be performed according to the methods described herein. In certain examples, aspects of the operations of block 3005 may be performed by a flight data manager as described with reference to FIGS. 13 through 16.

At block 3010 the method may include determining a listening pattern having at least one beam direction based at least in part on the flight data for the second aircraft. The operations of block 3010 may be performed according to the methods described herein. In certain examples, aspects of the operations of block 3010 may be performed by a pattern manager as described with reference to FIGS. 13 through 16.

At block 3015 the method may include receiving a directional transmission beam transmitted by the second aircraft using at least one directional reception beam pointed in at least one beam direction of the listening pattern. The operations of block 3015 may be performed according to the methods described herein. In certain examples, aspects of the operations of block 3015 may be performed by a receiver as described with reference to FIGS. 13 through 16.

At block 3020 the method may include establishing a second communication link of a second wireless network directly between the first aircraft and the second aircraft based at least in part on receiving the directional transmission beam from the second aircraft. The operations of block 3020 may be performed according to the methods described herein. In certain examples, aspects of the operations of block 3020 may be performed by a mesh link manager as described with reference to FIGS. 13 through 16.

Figure 31:
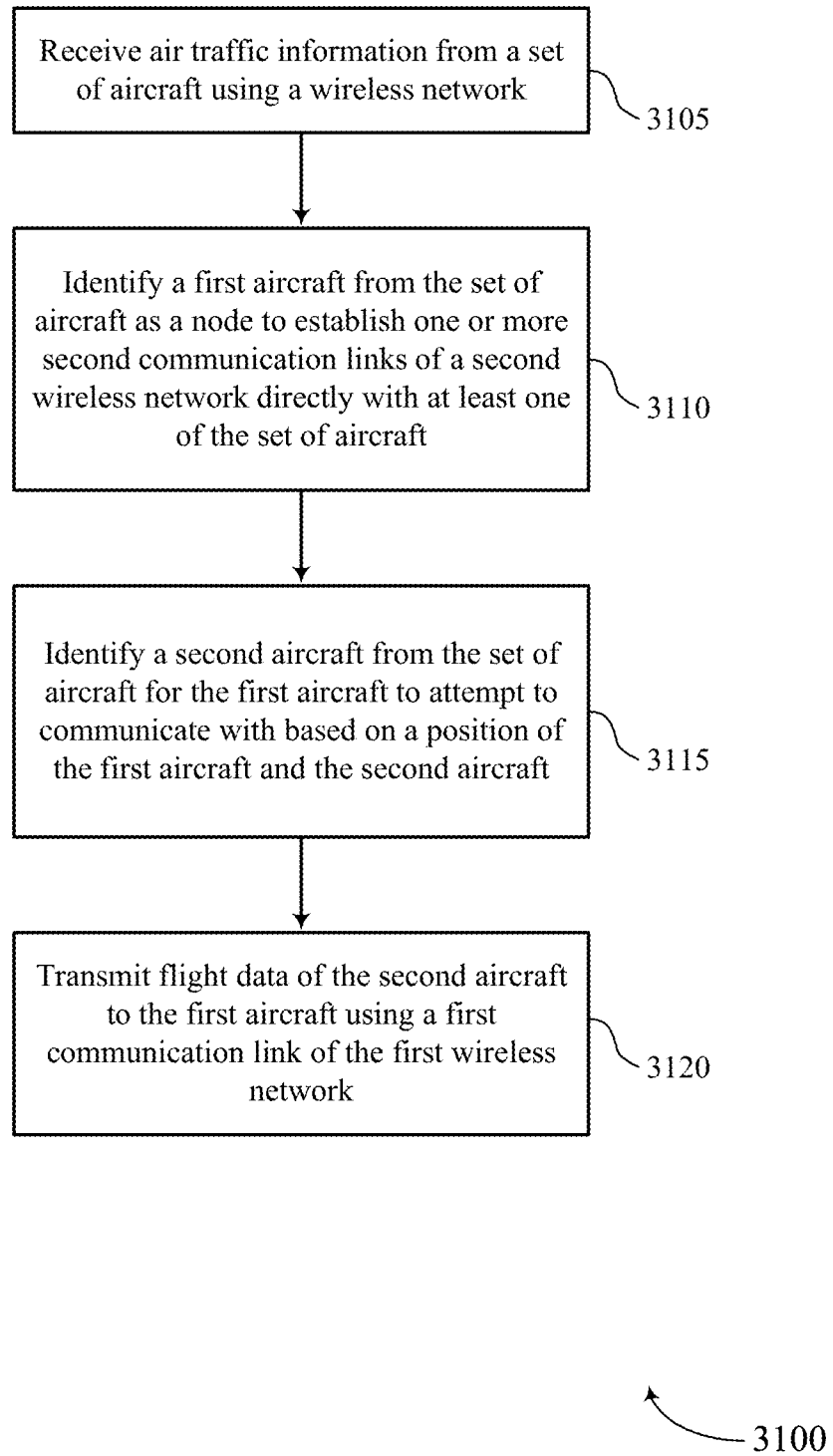

FIG. 31 shows a flowchart illustrating a method 3100 for directional beam mesh network for aircraft in accordance with aspects of the present disclosure. The operations of method 3100 may be implemented by a terrestrial server 210 or its components as described herein. For example, the operations of method 3100 may be performed by a terrestrial server communications manager as described with reference to FIGS. 17 through 20. In some examples, a terrestrial server 210 may execute a set of codes to control the functional elements of the device to perform the functions described below. Additionally or alternatively, the terrestrial server 210 may perform aspects of the functions described below using special-purpose hardware.

At block 3105 the method may include receiving air traffic information from a plurality of aircraft using a wireless network. The operations of block 3105 may be performed according to the methods described herein. In certain examples, aspects of the operations of block 3105 may be performed by an air traffic manager as described with reference to FIGS. 17 through 20.

At block 3110 the method may include identifying a first aircraft from the plurality of aircraft as a node to establish one or more second communication links of a second wireless network directly with at least one of the plurality of aircraft. The operations of block 3110 may be performed according to the methods described herein. In certain examples, aspects of the operations of block 3110 may be performed by a discovery mode manager as described with reference to FIGS. 17 through 20.

At block 3115 the method may include identifying a second aircraft from the plurality of aircraft for the first aircraft to attempt to communicate with based at least in part on a position of the first aircraft and the second aircraft. The operations of block 3115 may be performed according to the methods described herein. In certain examples, aspects of the operations of block 3115 may be performed by a discovery mode manager as described with reference to FIGS. 17 through 20.

At block 3120 the method may include transmitting flight data of the second aircraft to the first aircraft using a first communication link of the first wireless network. The operations of block 3120 may be performed according to the methods described herein. In certain examples, aspects of the operations of block 3120 may be performed by a transmitter as described with reference to FIGS. 17 through 20.

Figure 32:
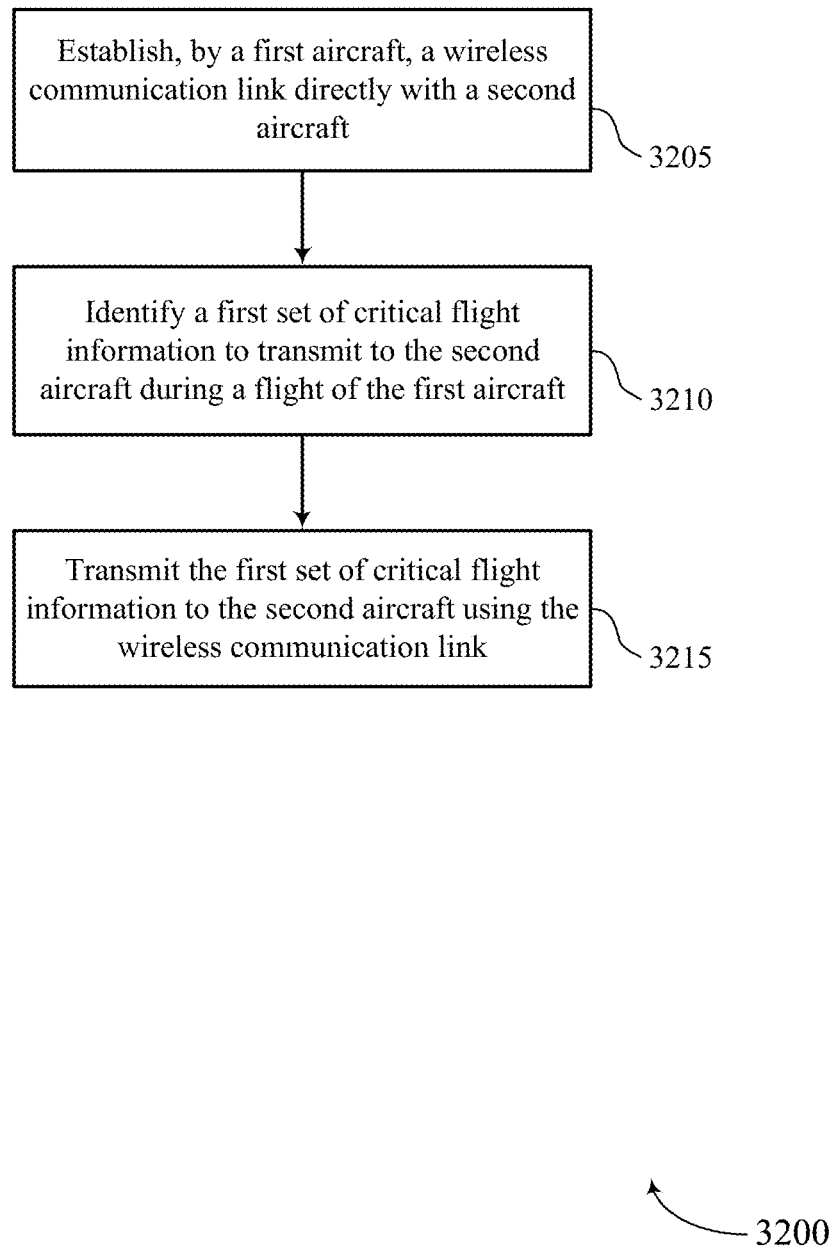

FIG. 32 shows a flowchart illustrating a method 3200 for directional beam mesh network for aircraft in accordance with aspects of the present disclosure. The operations of method 3200 may be implemented by a transmitting aircraft 705 or its components as described herein. For example, the operations of method 3200 may be performed by a transmitting aircraft communications manager as described with reference to FIGS. 21 through 24. In some examples, a transmitting aircraft 705 may execute a set of codes to control the functional elements of the device to perform the functions described below. Additionally or alternatively, the transmitting aircraft 705 may perform aspects of the functions described below using special-purpose hardware.

At block 3205 the method may include establishing, by a first aircraft, a wireless communication link directly with a second aircraft. The operations of block 3205 may be performed according to the methods described herein. In certain examples, aspects of the operations of block 3205 may be performed by a mesh link manager as described with reference to FIGS. 21 through 24.

At block 3210 the method may include identifying a first set of critical flight information to transmit to the second aircraft during a flight of the first aircraft. The operations of block 3210 may be performed according to the methods described herein. In certain examples, aspects of the operations of block 3210 may be performed by a flight information manager as described with reference to FIGS. 21 through 24.

At block 3215 the method may include transmitting the first set of critical flight information to the second aircraft using the wireless communication link. The operations of block 3215 may be performed according to the methods described herein. In certain examples, aspects of the operations of block 3215 may be performed by a transmitter as described with reference to FIGS. 21 through 24.

Figure 33:
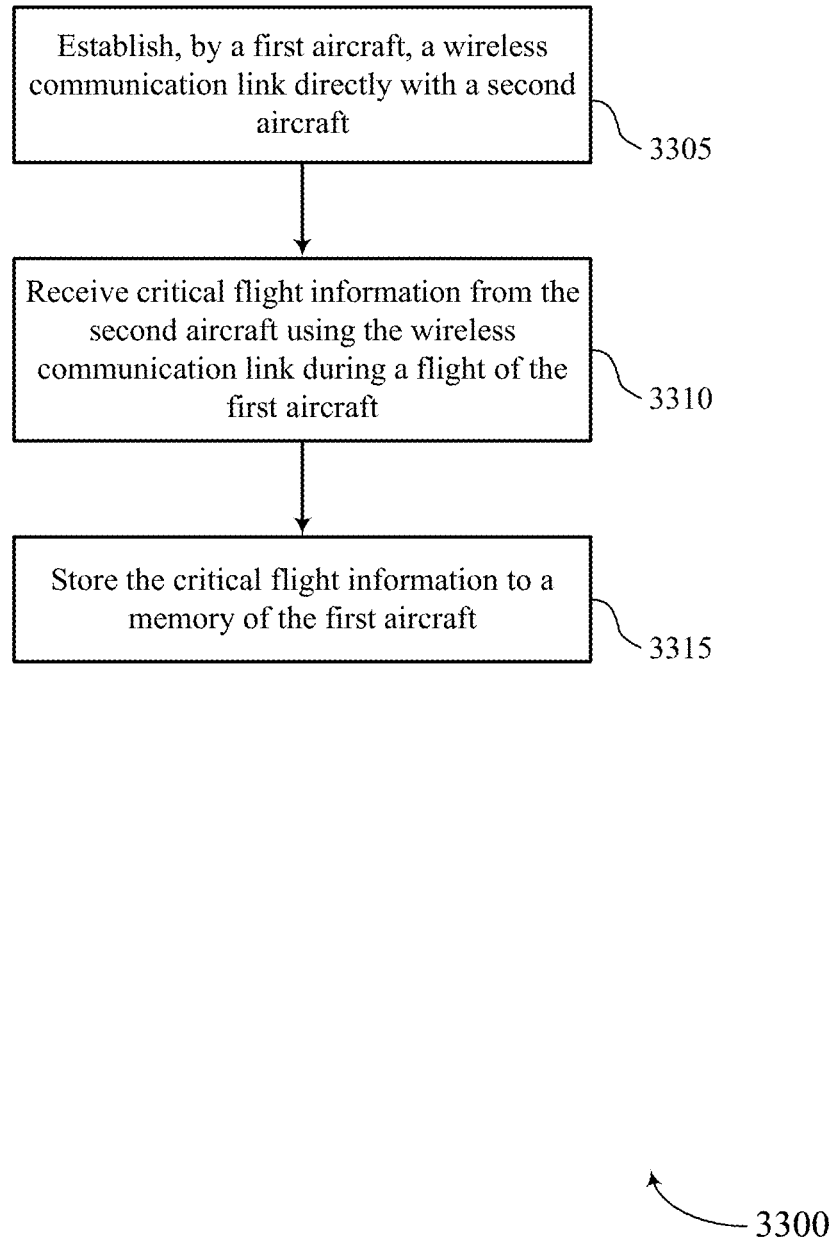

FIG. 33 shows a flowchart illustrating a method 3300 for directional beam mesh network for aircraft in accordance with aspects of the present disclosure. The operations of method 3300 may be implemented by a receiving aircraft 710 or its components as described herein. For example, the operations of method 3300 may be performed by a receiving aircraft communications manager as described with reference to FIGS. 25 through 28. In some examples, a receiving aircraft 710 may execute a set of codes to control the functional elements of the device to perform the functions described below. Additionally or alternatively, the receiving aircraft 710 may perform aspects of the functions described below using special-purpose hardware.

At block 3305 the method may include establishing, by a first aircraft, a wireless communication link directly with a second aircraft. The operations of block 3305 may be performed according to the methods described herein. In certain examples, aspects of the operations of block 3305 may be performed by a mesh link manager as described with reference to FIGS. 25 through 28.

At block 3310 the method may include receiving critical flight information from the second aircraft using the wireless communication link during a flight of the first aircraft. The operations of block 3310 may be performed according to the methods described herein. In certain examples, aspects of the operations of block 3310 may be performed by a receiver as described with reference to FIGS. 25 through 28.

At block 3315 the method may include storing the critical flight information to a memory of the first aircraft. The operations of block 3315 may be performed according to the methods described herein. In certain examples, aspects of the operations of block 3315 may be performed by a data manager as described with reference to FIGS. 25 through 28.

It should be noted that the methods described above describe possible implementations, and that the operations and the steps may be rearranged or otherwise modified and that other implementations are possible. Further, aspects from two or more of the methods may be combined. For example, aspects from two or more of the methods 2900, 3000, 3100, 3200, or 3300 described with reference to FIG. 29, 30, 31, 32, or 33 may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a first aircraft using a first communication link of a first wireless network, flight data for a second aircraft, wherein the flight data is received from a terrestrial server or a satellite;
   determining, based at least in part on the flight data for the second aircraft, a transmission beam pattern indicating a plurality of beam directions that are arranged to detect the second aircraft and a quantity of times a beam is to be transmitted in each of the plurality of beam directions, wherein the quantity of times is more than one for at least one beam direction;
   transmitting, in each beam direction of the plurality of beam directions, a directional transmission beam the quantity of times indicated for that beam direction by the transmission beam pattern; and
   establishing a second communication link of a second wireless network directly between the first aircraft and the second aircraft in response to receiving, from the second aircraft, signaling responsive to at least one of the transmitted directional transmission beams.

2. The method of claim 1, wherein
   the second wireless network is a wireless mesh network.

3. The method of claim 2, wherein
   a first radio frequency spectrum band used in the first wireless network is different from a second radio frequency spectrum band used in the second wireless network.

4. The method of claim 1, further comprising:
   determining a plurality of predicted locations for the second aircraft based at least in part on the flight data of the second aircraft, wherein determining the transmission beam pattern is based at least in part determining the plurality of predicted locations.

5. The method of claim 1, further comprising:
   determining a current position and a current vector for the first aircraft, wherein determining the transmission beam pattern is based at least in part on the current position and the current vector of the first aircraft.

6. The method of claim 1, further comprising:
   receiving environmental condition information associated with the second aircraft, wherein determining the transmission beam pattern is based at least in part on the environmental condition information.

7. The method of claim 1, wherein the flight data includes position information and vector information for the second aircraft, wherein determining the transmission beam pattern is based at least in part on the position information and the vector information.

8. The method of claim 1, wherein the flight data includes future flight path information for the second aircraft, wherein determining the transmission beam pattern is based at least in part on the future flight path information.

9. The method of claim 1, further comprising:
   receiving data from a third aircraft using a third communication link, the third communication link being part of a wireless mesh network;
   identifying the second aircraft as an intended recipient of the data; and
   transmitting the data to the second aircraft using the second communication link based at least in part on identifying the second aircraft as the intended recipient of the data.

10. The method of claim 1, further comprising:
    transmitting a message to the second aircraft indicating that the first aircraft is a node in a communication path of the second wireless network.

11. The method of claim 1, further comprising:
    receiving routing information from the terrestrial server or the satellite using the first communication link of the first wireless network, the routing information indicating one or more communication paths using the second wireless network between the first aircraft and other aircraft that are outside of a coverage area of the first aircraft; and
    transmitting data to one of the other aircraft based at least in part on the routing information.

12. The method of claim 1, further comprising:
    receiving updated flight data for the second aircraft from the second aircraft using the second communication link; and
    initiating a beam refinement procedure based at least in part on the updated flight data received from the second aircraft.

13. The method of claim 1, further comprising:
    receiving a directional transmission beam transmitted by the second aircraft using at least one directional reception beam pointed in at least one beam direction of a listening pattern having at least one beam direction, wherein establishing the second communication link directly between the first aircraft and the second aircraft is based at least in part on receiving the directional transmission beam from the second aircraft.

14. The method of claim 13, further comprising:
    determining the listening pattern based at least in part on the flight data for the second aircraft, wherein receiving the directional transmission beam from the second aircraft is based at least in part on the listening pattern.

15. The method of claim 1, further comprising:
identifying a plurality of communication resources of the second wireless network to use during a discovery procedure, wherein a first set of the plurality of communication resources are used to transmit directional transmission beams and a second set of the plurality of communication resources are used to listen for transmission beams, and wherein transmitting the directional transmission beams is done during the first set of the plurality of communication resources.

16. The method of claim 15, further comprising:
receiving an indication of the plurality of communication resources from the terrestrial server or the satellite using the first communication link, wherein identifying the plurality of communication resources is based at least in part on receiving the indication.

17. The method of claim 1, wherein transmitting comprises:
transmitting, as part of a discovery procedure, the directional transmission beams in one or more bursts towards the second aircraft.

18. The method of claim 17,
wherein establishing the second communication link directly is based at least in part on the one or more bursts of the directional transmission beams.

19. The method of claim 1, further comprising:
receiving a distress signal from the second aircraft using the second communication link; and
prioritizing a receipt of critical flight information from the second aircraft above communications with other aircraft through the second wireless network based at least in part on receiving the distress signal.

20. The method of claim 1, further comprising:
receiving flight data for a plurality of aircrafts using the first communication link; and
selecting a subset of the plurality of aircrafts to attempt to communicate with using the second communication link based at least in part on a proximity of the first aircraft to each of the plurality of aircrafts.

21. The method of claim 1, further comprising:
transmitting a current position and a current vector for the first aircraft to the terrestrial server or the satellite using the first communication link.

22. The method of claim 1, wherein
the first communication link of the first aircraft is a ground-aircraft communication link with the terrestrial server; or
the first communication link of the first aircraft is a satellite-aircraft communication link with the satellite.

23. A method for wireless communication, comprising:
receiving, at a first aircraft using a first communication link of a first wireless network, flight data for a second aircraft, wherein the flight data is received from a terrestrial server or a satellite;
determining, based at least in part on the flight data for the second aircraft, a reception beam pattern indicating a plurality of beam directions that are arranged to detect a transmission from the second aircraft and a quantity of times a reception beam is to be activated in each of the plurality of beam directions, wherein the quantity of times is more than one for at least one beam direction;
receiving a directional transmission beam transmitted by the second aircraft using at least one directional reception beam of a plurality of directional reception beams, wherein each directional reception beam of the plurality of directional reception beams is activated in a beam direction of the plurality of beam directions the quantity of times indicated for that beam direction by the reception beam pattern and wherein the directional transmission beam conveys information about a beam discovery procedure performed by the second aircraft to find the first aircraft; and
establishing a second communication link of a second wireless network directly between the first aircraft and the second aircraft in response to receiving the directional transmission beam from the second aircraft.

24. The method of claim 23, wherein:
the second wireless network is a wireless mesh network.

25. The method of claim 24, wherein:
a first radio frequency spectrum band used in the first wireless network is different from a second radio frequency spectrum band used in the second wireless network.

26. The method of claim 23, further comprising:
determining a beam characteristic of at least one directional reception beam of the plurality of directional reception beams based at least in part on the reception beam pattern.

27. The method of claim 23, further comprising:
determining a plurality of predicted locations for the second aircraft based at least in part on the flight data of the second aircraft, wherein determining the reception beam pattern is based at least in part determining the plurality of predicted locations.

28. The method of claim 23, further comprising:
determining a current position and a current vector for the first aircraft, wherein determining the reception beam pattern is based at least in part on the current position and the current vector of the first aircraft.

29. A method for wireless communication, comprising:
receiving air traffic information from a plurality of aircraft using a wireless network;
identifying a first aircraft from the plurality of aircraft as a node to establish one or more second communication links of a second wireless network directly with at least one of the plurality of aircraft;
identifying a second aircraft from the plurality of aircraft for the first aircraft to attempt to communicate with based at least in part on a position of the first aircraft and the second aircraft;
determining, for the first aircraft and based at least in part on aft traffic information for the second aircraft, a transmission beam pattern indicating a plurality of beam directions that are arranged to detect the second aircraft and a quantity of times a beam is to be transmitted in each of the plurality of beam directions, wherein the quantity of times is more than one for at least one beam direction;
and transmitting flight data of the second aircraft and an indication of the transmission beam pattern to the first aircraft using a first communication link of the wireless network.

30. An apparatus for wireless communication, comprising:
a processor;
memory in electronic communication with the processor; and
instructions stored in the memory and executable by the processor to cause the apparatus to:
receive, at a first aircraft using a first communication link of a first wireless network, flight data for a second aircraft, wherein the flight data is received from a terrestrial server or a satellite;

determine, based at least in part on the flight data for the second aircraft, a transmission beam pattern indicating a plurality of beam directions that are arranged to detect the second aircraft and a quantity of times a beam is to be transmitted in each of the plurality of beam directions, wherein the quantity of times is more than one for at least one beam direction;

transmit, in each beam direction of the plurality of beam directions, a directional transmission beam the quantity of times indicated for that beam direction by the transmission beam pattern; and establish a second communication link of a second wireless network directly between the first aircraft and the second aircraft in response to receiving, from the second aircraft, signaling responsive to at least one of the transmitted directional transmission beams.

\* \* \* \* \*